US012547099B2

(12) United States Patent
Suzuki et al.

(10) Patent No.: US 12,547,099 B2
(45) Date of Patent: Feb. 10, 2026

(54) IMAGE FORMING APPARATUS

(71) Applicant: CANON KABUSHIKI KAISHA, Tokyo (JP)

(72) Inventors: Ai Suzuki, Tokyo (JP); Masahiro Suetsugu, Kanagawa (JP); Shinichi Nishida, Kanagawa (JP); Shingo Ito, Tokyo (JP); Shimpei Ishikawa, Kanagawa (JP); Nobuyuki Kobayashi, Kanagawa (JP); Shinsuke Kobayashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/811,927

(22) Filed: Aug. 22, 2024

(65) Prior Publication Data

US 2025/0076787 A1 Mar. 6, 2025

(51) Int. Cl.

*G03G 15/08* (2006.01)
*B41J 2/44* (2006.01)
(Continued)

(52) U.S. Cl.

CPC .......... *G03G 15/0889* (2013.01); *B41J 2/442* (2013.01); *G03G 15/04036* (2013.01); (Continued)

(58) Field of Classification Search

CPC ......... G03G 15/0889; G03G 15/04036; G03G 15/065; G03G 15/0865; G03G 15/0886; (Continued)

(56) References Cited

U.S. PATENT DOCUMENTS

| | | | |
|---|---|---|---|
| 9,063,501 | B2 | 6/2015 | Hirukawa et al. |
| 10,474,058 | B2 | 11/2019 | Hasegawa |

(Continued)

FOREIGN PATENT DOCUMENTS

| | | |
|---|---|---|
| JP | 2003-114571 A | 4/2003 |
| JP | 2013-222017 A | 10/2013 |

(Continued)

OTHER PUBLICATIONS

Co-pending U.S. Appl. No. 18/796,495, filed Aug. 7, 2024.

*Primary Examiner* — Sandra Brase
(74) *Attorney, Agent, or Firm* — VENABLE LLP

(57) ABSTRACT

In an image forming apparatus that includes a replenishing port of toner and an introduction port that is able to communicate with the replenishing port, at least a part of the introduction port is located in a first quadrant or a second quadrant in a two-dimensional coordinate system configured of a first virtual line that extends in a horizontal direction and a second virtual line that and extends in a gravity direction, and a control portion controls a stirring member to stop rotating in a state where at least a part of a second end portion of a sheet is located in a quadrant that is different from a quadrant in which the introduction port is disposed in the coordinate system by a timing at which toner passes through the introduction port when the toner is replenished from a toner container to an accommodating chamber.

61 Claims, 50 Drawing Sheets

(51) Int. Cl.
*G03G 15/00* (2006.01)
*G03G 15/04* (2006.01)
*G03G 15/06* (2006.01)

(52) U.S. Cl.
CPC ....... *G03G 15/065* (2013.01); *G03G 15/0865* (2013.01); *G03G 15/0886* (2013.01); *G03G 15/50* (2013.01); *G03G 15/556* (2013.01); *G03G 15/757* (2013.01)

(58) Field of Classification Search
CPC .... G03G 15/50; G03G 15/556; G03G 15/757; B41J 2/442
See application file for complete search history.

(56) References Cited

U.S. PATENT DOCUMENTS

| | | | | |
|---|---|---|---|---|
| 12,092,973 | B2 | 9/2024 | Ozaki et al. | |
| 2012/0219307 | A1* | 8/2012 | Suzuki ............... | G03G 15/0889 399/27 |
| 2017/0185002 | A1* | 6/2017 | Jang ................... | G03G 15/0889 |
| 2018/0120738 | A1* | 5/2018 | Fujiwara ............ | G03G 15/0889 |
| 2023/0161282 | A1 | 5/2023 | Ogawa et al. | |

FOREIGN PATENT DOCUMENTS

| | | | |
|---|---|---|---|
| JP | 2014-106434 | A | 6/2014 |
| JP | 2019-132884 | A | 8/2019 |
| JP | 2020-154301 | A | 9/2020 |
| JP | 2021-026218 | A | 2/2021 |
| JP | 2022-027631 | A | 2/2022 |
| JP | 2023-004386 | A | 1/2023 |

* cited by examiner

IMMEDIATELY AFTER REPLENISHMENT
(IN MOTOR STOPPED STATE)

5 SECONDS LATER
(AFTER 5 ROTATIONS OF STIRRING MEMBER)

20 SECONDS LATER
(AFTER 20 ROTATIONS OF STIRRING MEMBER)

TONER LEVEL
FULL

TONER LEVEL
LOW
31
33
35
39
32
34a
34b
34f
50/600
38
32a
ON
OFF
F
F
Tf 1
Ta
SECONDS
Tlow1
Tlow2
Tlow3

TONER LEVEL FULL

TONER LEVEL HALFFULL

TONER LEVEL LOW

TONER LEVEL OUT

IMMEDIATELY AFTER REPLENISHMENT
(MOTOR STOPPED STATE)

IMMEDIATELY AFTER REPLENISHMENT
(MOTOR STOPPED STATE)

5 SECONDS LATER
(AFTER 5 ROTATIONS OF STIRRING MEMBER)

20 SECONDS LATER
(AFTER 20 ROTATIONS OF STIRRING MEMBER)

IMMEDIATELY AFTER REPLENISHMENT (MOTOR STOPPED STATE)

5 SECONDS LATER (AFTER 5 ROTATIONS OF STIRRING MEMBER)

20 SECOND LATER (AFTER 20 ROTATIONS OF STIRRING MEMBER)

VOLTAGE WAVEFORM OF SECOND EMBODIMENT

VOLTAGE WAVEFORM OF FIRST EMBODIMENT

VOLTAGE WAVEFORM OF THIRD EMBODIMENT

EXAMPLE OF VOLTAGE WAVEFORM OF COMPARATIVE EXAMPLE CONFIGURATION

EXAMPLE OF VOLTAGE WAVEFORM OF COMPARATIVE EXAMPLE CONFIGURATION

IMAGE FORMING APPARATUS

BACKGROUND OF THE INVENTION

Field of the Invention

The present invention relates to an image forming apparatus that forms an image on a recording material.

Description of the Related Art

Typically, image forming apparatuses of an electrophotographic system form images on recording materials by transferring toner images formed on surfaces of photosensitive drums to the recording materials. As methods of replenishing developer consumed through image formation, a process cartridge scheme and a toner replenishing scheme, for example, are known. The process cartridge scheme is a scheme in which a photosensitive drum and a developer container are integrated as a process cartridge and the process cartridge is replaced with a new product when a developer runs out. On the other hand, the toner replenishing scheme is a scheme in which once a toner runs out, a toner is newly replenished to a developer container without replacing a component as in the process cartridge scheme. Japanese Patent Application Laid-open No. 2022-27631 discloses a configuration of a toner replenishing scheme (hereinafter, referred to as a direct toner replenishing scheme) in which a toner pack is attached to a developer container such that a part of a toner container is exposed to outside and a toner accommodated in the toner pack is replenished at once into the developer container instead of replacement of a process cartridge. The configuration in Japanese Patent Application Laid-open No. 2022-27631 can detect a remaining amount of toner that is being consumed and a remaining amount of toner after replenishment with an optical toner remaining amount detecting unit and notify a user of the amounts. The optical toner remaining amount detecting unit is installed in the same chamber as the toner in the developer container to recognize the amount of toner in the developer container in accordance with a time during which an optical path is blocked with the toner in the developer container and a time during which the optical path is not blocked.

SUMMARY OF THE INVENTION

An object of the present invention is to provide a new aspect of an image forming apparatus of the toner replenishing scheme in Japanese Patent Application Laid-open No. 2022-27631.

In order to achieve the above object, an image forming apparatus on which a toner container is able to be mounted according to the present invention includes: a photosensitive drum;

- a developing roller that supplies toner to the photosensitive drum;
- a mounting portion on which the toner container is able to be mounted such that a part of the toner container is exposed to outside of the image forming apparatus, the mounting portion being provided with a replenishing port for replenishment of the toner in the toner container;
- a frame member that includes a developing chamber in which the developing roller is disposed and an accommodating chamber that communicates with the developing chamber and accommodates the toner, the accommodating chamber being provided with an accommodating chamber opening capable of communicating with the replenishing port;
- a stirring member that is provided in the accommodating chamber, the stirring member including a rotation shaft that rotates about a rotation axis and a sheet having a first end portion that is one end portion in a direction perpendicularly intersecting the rotation axis and is fixed to the rotation shaft and a second end portion that is the other end portion and is able to come into contact with an inner wall of the accommodating chamber, the stirring member being configured to stir the toner accommodated in the accommodating chamber while rotating; and
- a control portion that controls rotation of the stirring member,
- wherein a two-dimensional coordinate system is configured of a first virtual line that passes through the rotation axis and extends in a horizontal direction and a second virtual line that passes through the rotation axis and extends in a gravity direction in a case of being seen in a direction of the rotation axis, and in the two-dimensional coordinate system, at least a part of the accommodating chamber opening is disposed in a first quadrant or a second quadrant, and
- wherein the control portion controls the stirring member to stop rotating in a state where at least a part of the second end portion of the sheet is located in a quadrant that is different from a quadrant in which the accommodating chamber opening is disposed in the coordinate system by a timing at which the toner passes through the accommodating chamber opening in a case where the toner is replenished from the toner container to the accommodating chamber.

Also, in order to achieve the above object, an image forming apparatus on which a toner container is able to be mounted according to the present invention includes:

- a photosensitive drum;
- a developing roller that supplies a toner to the photosensitive drum;
- a mounting portion on which the toner container is able to be mounted such that a part of the toner container is exposed to outside of the image forming apparatus, the mounting portion being provided with a replenishing port for replenishment of the toner in the toner container;
- a frame member that includes a developing chamber in which the developing roller is disposed and an accommodating chamber that communicates with the developing chamber and accommodates the toner, the accommodating chamber being provided with an accommodating chamber opening capable of communicating with the replenishing port;
- a stirring member that is provided in the accommodating chamber, the stirring member including a rotation shaft that rotates about a rotation axis and a sheet having a first end portion that is one end portion in a direction perpendicularly intersecting the rotation axis and is fixed to the rotation shaft and a second end portion that is the other end portion and is able to come into contact with an inner wall of the accommodating chamber, the stirring member being configured to stir the toner accommodated in the accommodating chamber while rotating;
- a control portion that controls rotation of the stirring member;

an opening/closing member that is able to be located at an open position at which the mounting portion is exposed to outside of the image forming apparatus and a closed position at which the mounting portion is not exposed; and a sensor that detects an opening/closing state of the opening/closing member, wherein the control portion controls the stirring member to stop rotating in a state where the second end portion of the sheet is at a predetermined position by a timing at which the toner passes through the accommodating chamber opening when the toner is replenished from the toner container to the accommodating chamber in response to the sensor detecting that the opening/closing member is at the open position.

Also, in order to achieve the above object, an image forming apparatus on which a toner container is able to be mounted according to the present invention includes:

a photosensitive drum;

a developing roller that supplies toner to the photosensitive drum;

a mounting portion on which the toner container is able to be mounted such that a part of the toner container is exposed to outside of the image forming apparatus, the mounting portion being provided with a replenishing port for replenishment of the toner in the toner container;

a frame member that includes a developing chamber in which the developing roller is disposed and an accommodating chamber that communicates with the developing chamber and accommodates the toner, the accommodating chamber being provided with an accommodating chamber opening capable of communicating with the replenishing port;

a stirring member that is provided in the accommodating chamber, the stirring member including a rotation shaft that rotates about a rotation axis and a sheet having a first end portion that is one end portion in a direction perpendicularly intersecting the rotation axis and is fixed to the rotation shaft and a second end portion that is the other end portion and is able to come into contact with an inner wall of the accommodating chamber, the stirring member being configured to stir the toner accommodated in the accommodating chamber while rotating;

a sensor that detects whether or not the toner container has been mounted on the replenishing port; and a control portion that controls rotation of the stirring member;

wherein the control portion controls the stirring member to stop rotating in a state where the second end portion of the sheet is at a predetermined position by a timing at which the toner passes through the accommodating chamber opening in a case where the toner is replenished from the toner container to the accommodating chamber in response to the sensor detecting that the toner container has been mounted on the replenishing port.

Also, in order to achieve the above object, an image forming apparatus on which a toner container is able to be mounted according to the present invention includes:

a photosensitive drum that rotates;

a charging roller that comes into contact with a surface of the photosensitive drum and rotates;

a charging bias application portion that applies a charging bias to the charging roller;

a developing roller that bears a developer and rotates and supplies toner to the photosensitive drum;

a developing bias application portion that applies a developing bias to the developing roller;

a mounting portion on which the toner container is able to be mounted such that a part of the toner container is exposed to outside of the image forming apparatus, the mounting portion being provided with a replenishing port for replenishment of toner in the toner container;

a frame member that includes a developing chamber in which the developing roller is disposed and an accommodating chamber that communicates with the developing chamber and accommodates the toner, the accommodating chamber being provided with an accommodating chamber opening capable of communicating with the replenishing port;

a stirring member that is provided in the accommodating chamber, the stirring member including a rotation shaft that rotates about a rotation axis and a sheet having a first end portion that is one end portion in a direction perpendicularly intersecting the rotation axis and is fixed to the rotation shaft and a second end portion that is the other end portion and is able to come into contact with an inner wall of the accommodating chamber, the stirring member being adapted to stir the toner accommodated in the accommodating chamber while rotating;

a phase detecting unit that detects a rotation phase of the stirring member;

a single motor that supplies a drive force to cause each of the photosensitive drum, the charging roller, the developing roller, and the stirring member to rotate; and a control portion that controls each of the charging bias application portion, the developing bias application portion, and the motor, wherein the image forming apparatus executes first stop control of causing the motor to stop rotating after an image forming operation ends and second stop control of causing each of the charging bias application portion and the developing bias application portion to stop bias application in accordance with a stop timing at which the motor stops rotating through the first stop control, and wherein the control portion starts the second stop control after a standby time elapses from a detection timing such that the rotation phase of the stirring member at the stop timing is a rotation phase within a predetermined range, on the basis of the rotation phase of the stirring member detected at the detection timing after the image forming operation ends and a time required for the second stop control.

Also, in order to achieve the above object, an image forming apparatus according to the present invention includes:

an image bearing member;

a developer bearing member that bears a developer for developing an electrostatic latent image formed on the image bearing member;

a frame member that includes a developing chamber in which the developer bearing member is disposed and an accommodating chamber that communicates with the developing chamber and accommodates the developer;

a stirring member that is provided inside of the accommodating chamber, the stirring member including a rotation shaft that rotates about a rotation axis and a sheet having a first end portion that is one end portion in a direction of the rotation axis and is fixed to the rotation shaft and a second end portion that is the other end portion and is a free end, the stirring member being configured to stir the developer by the sheet rotating along with the rotation shaft; and a sensor that includes a light emitting element that emits light toward the inside of the accommodating chamber and a light receiving element that receives light that has been emitted by the light emitting element, has passed through the inside of the accommodating chamber, and has been output to outside of the accommodating chamber, the sensor issuing a signal with an intensity in accordance with the amount of light received by the light receiving element, wherein the sheet of the stirring member is configured to block an optical path of light emitted from the light emitting element in the inside of the accommodating chamber once in one cycle in which the stirring member rotates about the rotation axis once, and wherein the image forming apparatus includes a phase detecting unit that detects a rotation phase of the stirring member with reference to a period during which the intensity of the signal is continuously below a threshold value for a longest time in the one cycle.

According to the present invention, it is possible to provide a new aspect of an image forming apparatus of a toner replenishing scheme of replenishing a toner at once.

Further features of the present invention will become apparent from the following description of exemplary embodiments with reference to the attached drawings.

DESCRIPTION OF THE EMBODIMENTS

Embodiments of the present disclosure will be illustratively explained in the following embodiments. However, configurations disclosed in the following embodiments, for example, functions, materials, shapes, and relative dispositions of components illustrate exemplary modes related to the claims, and the claims are not intended to be limited to the configurations disclosed in the embodiments. Also, problems solved by the configurations disclosed in the following embodiments or effects or advantages obtained from the disclosed configurations are not intended to limit the claims.

First Embodiment

Figure 1A:
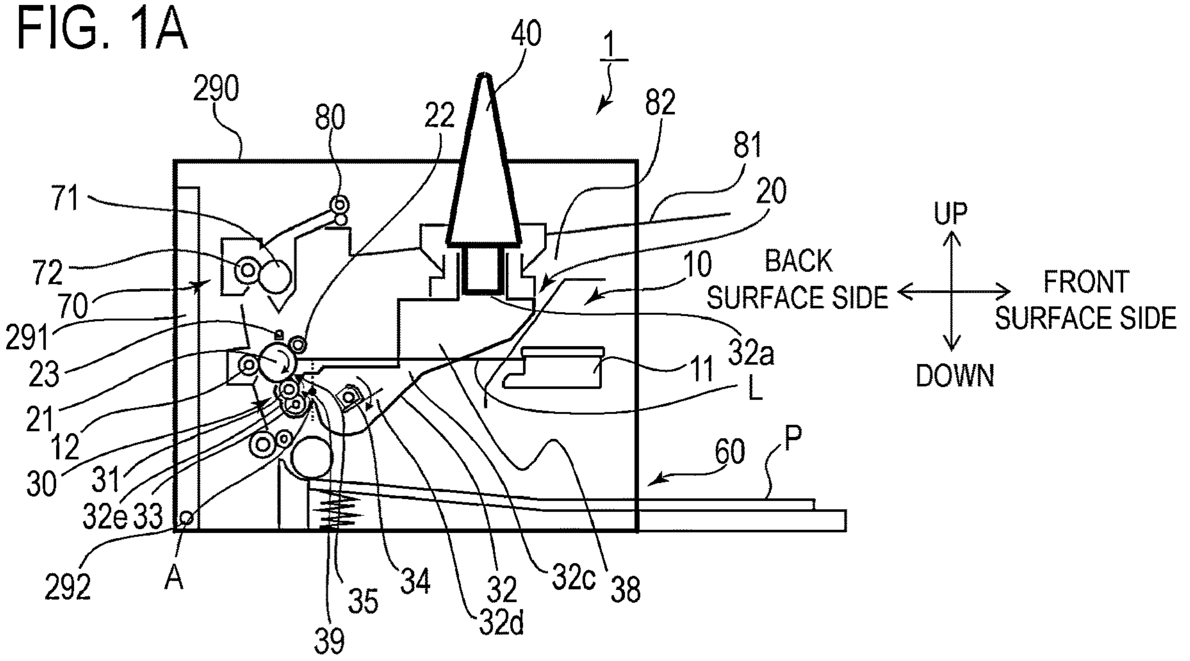
FIGS. 1A and 1B are a sectional view and a perspective view of an image forming apparatus 1 according to a first embodiment.
Figure 1B:
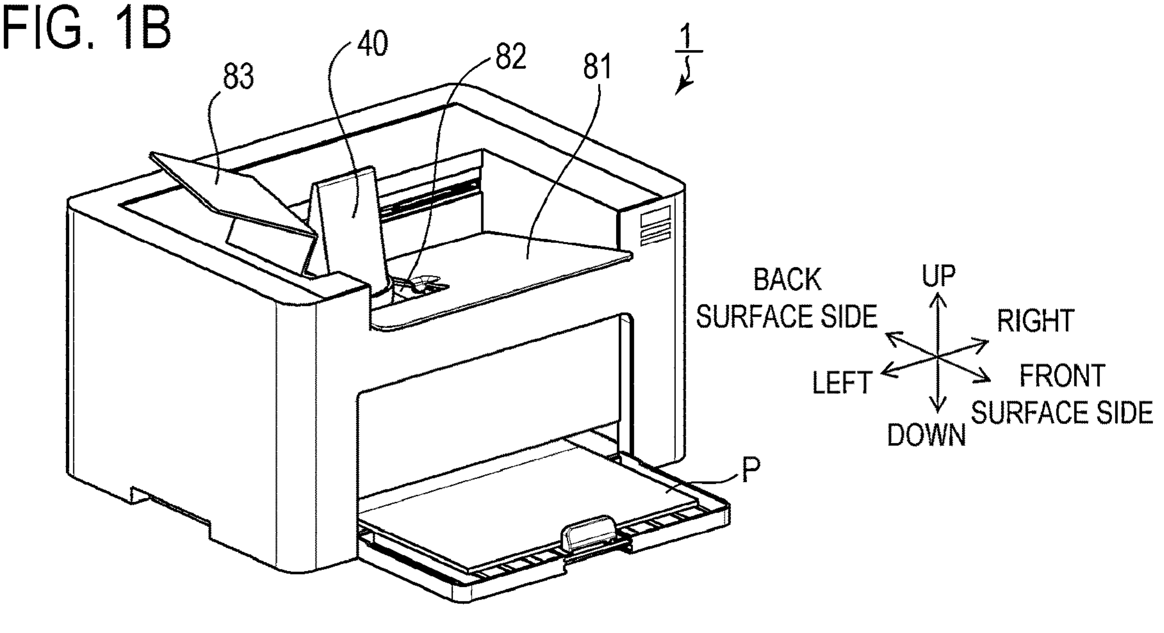
Figure 2:
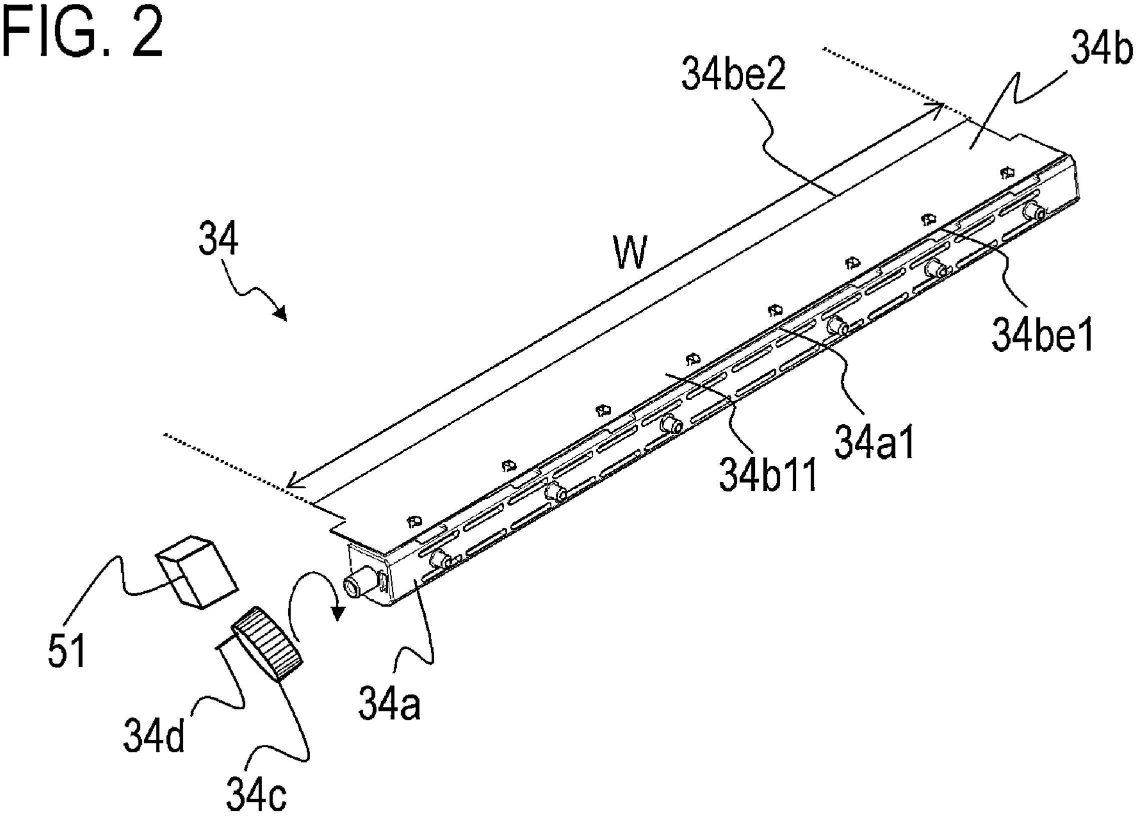
FIG. 2 is a perspective view of a stirring member 34.

FIG. 1A is a schematic sectional view schematically illustrating a configuration of an image forming apparatus 1 according to a first embodiment of the present invention. FIG. 1B is a perspective view of the image forming apparatus 1 according to the present embodiment. FIG. 2 is a schematic perspective view illustrating a configuration of a stirring member. The image forming apparatus 1 is a monochrome printer that forms an image on a recording material on the basis of image information input from an external device.

Note that FIG. 1A illustrates a state where the image forming apparatus 1 is installed on a horizontal surface as a typically assumed installation state of the image forming apparatus 1, and each direction on the paper of the drawing is defined as follows. The up-down direction on the paper surface is a vertical direction (a gravity direction), and the upward direction on the paper and the downward direction on the paper will be referred to as an upward direction and a downward direction, respectively. The leftward direction on the paper and the rightward direction on the paper will be referred to as a backward direction (a direction directed from a front surface side toward a back surface side of the apparatus) and a forward direction (a direction directed from the back surface side toward the front surface side of the apparatus), respectively. Also, a forward direction from the paper (a direction that is perpendicular to the paper surface and is directed from the side behind the paper surface toward the side in front of the paper surface) and the backward direction (a direction that is perpendicular to the paper surface and is directed from the side in front of the paper surface toward the side behind the paper surface) will be referred to as a leftward direction and a rightward direction, respectively.

An image forming portion 10 includes a scanner unit 11, a process cartridge 20 of an electrophotographic system, and a transfer roller 12 that transfers a toner image formed on a photosensitive drum (image bearing member) 21 of the process cartridge 20 to a recording material.

The process cartridge 20 includes the photosensitive drum 21, a charging roller (charging member) 22 and a pre-exposure device (static eliminate unit) 23 disposed in the surroundings of the photosensitive drum 21, and a developing apparatus 30 including a developing roller (developer bearing member) 31.

The photosensitive drum 21 is a photosensitive member molded into a cylindrical shape. The photosensitive drum 21 in the present embodiment includes a photosensitive layer formed of a negative-charging organic photosensitive member on a drum-shaped base molded using aluminum. Also, the photosensitive drum 21 is driven and rotated at a predetermined process speed in a predetermined direction (the clockwise direction in the drawing) with a drive force supplied from a motor.

The charging roller 22 comes into contact with the photosensitive drum 21 with a predetermined pressure-contact force and forms a charging portion. Moreover, a surface of the photosensitive drum 21 is uniformly charged with a predetermined potential by a charging high-voltage power source applying a desired charging voltage. In the present embodiment, the photosensitive drum 21 is negatively charged by the charging roller 22. The pre-exposure device 23 eliminates the surface potential of the photosensitive drum 21 before the photosensitive drum 21 enters the charging portion, in order to cause stabile discharging at the charging portion.

The scanner unit (exposure unit) 11 scans and exposes the surface of the photosensitive drum 21 by irradiating the photosensitive drum 21 with laser light corresponding to the image information input from the external device using a polygon mirror. An electrostatic latent image in accordance with the image information is formed on the surface of the photosensitive drum 21 through the exposure. Note that the scanner unit 11 is not limited to a laser scanner device, and an LED exposure device including an LED array in which a plurality of LEDs are aligned in a longitudinal direction of the photosensitive drum 21, for example, may be employed.

The developing apparatus 30 includes a developer container 32 (developer frame member) that accommodates a developer, a developing roller 31 serving as a developer bearing member that bears the developer, and a supply roller 33 capable of supplying the developer to the developing roller 31. A toner serving as the developer accommodated in the developer container 32 is applied to a surface of the developing roller 31 by the supply roller 33. The developer container 32 includes the developing roller 31, a developing chamber **32*e* in which the supply roller 33 is disposed, and a toner accommodating chamber (developer accommodating chamber) 32*d* that communicates with the developing chamber 32*e* and accommodates the toner to be supplied to the developing chamber 32*e*. In the developer container 32, the developing chamber 32*e* is provided with a projecting portion (A in FIG. 1A) to hold the toner to be supplied to the developing roller 31 and the supply roller 33. A boundary portion between the toner accommodating chamber 32*d* and the developing chamber 32*e* at the position corresponding to the projecting portion A will be referred to as a developing opening portion 39. Note that the supply roller 33 is not necessarily needed as long as it is possible to sufficiently supply the toner to the developing roller 31** with the configuration.

The developing apparatus 30 in the present embodiment uses a contact developing system as a developing system. In other words, a toner layer that the developing roller 31 bears comes into contact with the photosensitive drum 21 at a developing portion where the photosensitive drum 21 and the developing roller 31 face each other.

A developing high-voltage power source applies a developing voltage to the developing roller 31. The electrostatic latent image is developed into a toner image by the toner that the developing roller 31 bears being moved from the developing roller 31 to the drum surface in accordance with potential distribution on the surface of the photosensitive drum 21 under the developing voltage. Note that a reversal developing system is employed in the present embodiment. In other words, a toner image is formed by the toner adhering to a surface region of the photosensitive drum 21 in which the amount of charge has been attenuated through exposure in an exposure process after charging in the charging process.

Also, a toner with a negative regular charge polarity with a particle diameter of about 6 μm is used in the present embodiment. As the toner in the present embodiment, a polymerized toner generated by a polymerization method is employed in an example. Also, the toner in the present embodiment does not contain any magnetic component, and a so-called non-magnetic mono-component developer in which the developing roller 31 bears the toner mainly with an intermolecular force or an electrostatic force (mirror image force) is used. However, a mono-component developer containing a magnetic component may be used. Also, the mono-component developer may contain, in addition to a toner particle, an additive (such as a wax and a silica fine particle, for example) to adjust fluidity and charge performance of the toner in some cases. Moreover, a two-component developer configured of a non-magnetic toner and a carrier with magnetism may be used as a developer. In a case where a developer with magnetism is used, a cylindrical developing sleeve with a magnet disposed therein, for example, is used as the developer bearing member.

A developing blade 35 restricts the amount of toner that the developing roller 31 is to bear. The toner supplied to a surface of the developing roller 31 is uniformly thinned into a layer form by passing through a portion facing the developing blade 35 with rotation of the developing roller 31, and is negatively charged through triboelectric charging.

In addition, a stirring member 34 is rotatably provided inside a toner accommodating chamber **32*d* of the developer container 32. As illustrated in FIG. 2, the stirring member 34 includes a stirring shaft (rotation shaft) 34*a* that extends in the longitudinal direction and a vane portion (sheet) 34*b* that extends further outward than the stirring shaft 34*a* in the radial direction. The vane portion 34*b* is attached to the stirring shaft 34*a* such that an attachment portion 34*b*11 which is a part of the vane portion 34*b* comes into contact with an attachment surface 34*al* of the stirring shaft 34*a* that extends in a direction of a rotation axis of the stirring shaft 34*a*. The vane portion 34*b* is configured such that a first end portion 34*be*1 which is one end portion in a direction perpendicularly intersecting the rotation axis is fixed to the stirring shaft 34*a* as a part of the attachment portion 34*b*11 and a second end portion 34*be*2 which is the other end portion is able to come into contact with an inner wall of the toner accommodating chamber 32*d*. The stirring member 34 is turned around the stirring shaft 34*a* at the center through motor driving via a gear 34*c***.

The vane portion **34*b* of the stirring member 34 in the present embodiment is made of polycarbonate with a thickness of 180 μm and has flexibility. The vane portion 34*b* stirs the toner in the developer container 32 while being bent or restored in accordance with the shape of the inner wall of the developer container 32. Also, a width W of the vane portion 34*b* of the stirring member 34 in the longitudinal direction is set to be narrower than a width of the developing opening portion 39 in the longitudinal direction such that the vane portion 34*b* can enter the developing opening portion 39. The vane portion 34*b* plays a role in feeding the toner to the developing chamber 32*e* where the developing roller 31 and the supply roller 33 are present via the developing opening portion 39**.

In the present embodiment, a pin **34*d* is disposed in the gear 34*c* of the stirring member 34 at a position corresponding to the vane portion 34*b* of the stirring member 34. FIG. 2 illustrates a state where the gear 34*c* has been removed from the stirring member 34. A phase detection sensor 51 is a photo interrupter of a reflection type, and a control portion of the image forming apparatus 1 can determine a phase of the stirring member 34 by detecting presence/absence of the pin 34*d*. In other words, the phase detection sensor 51 includes a light emitting portion (light emitting element) and a light receiving portion (light receiving element) and is configured to be able to recognize the position (phase) of the pin 34*d* by detection light output from the light emitting portion being reflected by the pin 34*d* and received by the light receiving portion. Note that the configuration of the phase detection sensor 51** is not limited to the reflection type and a sensor of a transmission type may be used.

Image Forming Operation

Figure 3:
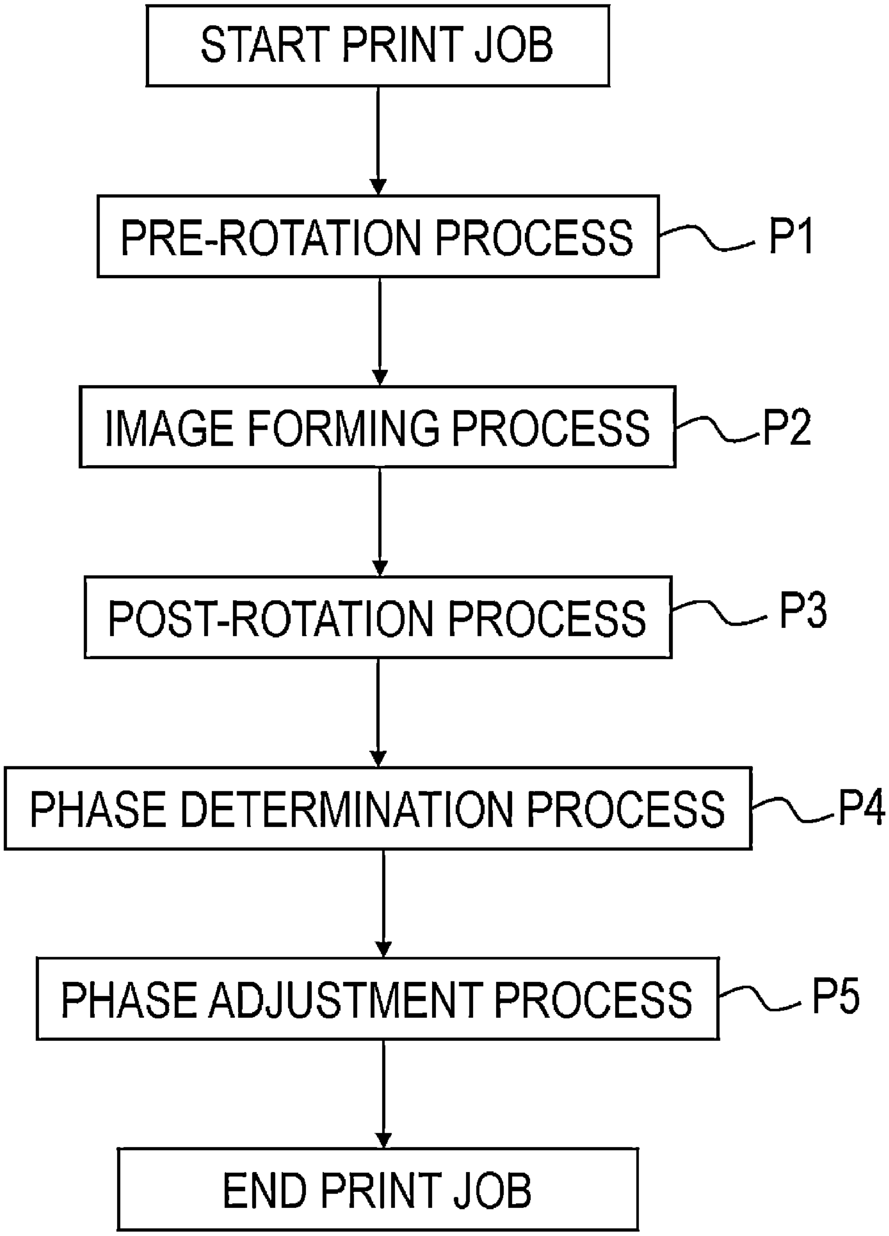
FIG. 3 is a flowchart of an image forming process.

An image forming operation of the image forming apparatus 1 will be explained using FIGS. 1A, 1B, and 3. FIG. 3 is a flowchart of an image forming process.

As illustrated in FIG. 3, once a command is input to the image forming apparatus 1, a print job is started. An image forming process P2 of the image forming portion 10 is executed on the basis of image information input from an external computer or the like connected to the image forming apparatus 1. A pre-rotation process P1 as a preparation process for image formation and a post-rotation process P3 as a post-processing process are typically provided before and after the image forming process P2.

In the pre-rotation process P1, the scanner unit 11, various high-voltage power sources, and a fixing portion 70 are activated and stabilized. Once each unit is activated, that is, at a timing at which each unit can form an image or each unit is expected to be able to form an image, the pre-rotation process P1 is ended, and the image forming process P2 is started.

In the image forming process P2, the scanner unit 11 irradiates the photosensitive drum 21 with laser light L (see FIG. 1A) on the basis of the input image information. At this time, the photosensitive drum 21 is charged in advance by the charging roller 22, and an electrostatic latent image is formed on the photosensitive drum 21 through the irradiation with the laser light L. Thereafter, the electrostatic latent image is developed by the developing roller 31, and a toner image is formed on the photosensitive drum 21.

In parallel with the image forming process, a feeding portion 60 conveys a recording material P toward a transfer nip formed of the transfer roller 12 and the photosensitive drum 21. A transfer voltage is applied from a transfer high-voltage power source to the transfer roller 12, and the toner image that the photosensitive drum 21 bears is transferred onto the recording material P.

The recording material P onto which the toner image has been transferred is conveyed to the fixing portion 70, and the toner image is heated and pressurized when it passes through a nip portion between a fixing film 71 and a pressurization roller 72 of the fixing portion 70. In this manner, a toner particle is melted and is then stuck, and the toner image is thereby fixed on the recording material P.

The recording material P that has passed through the fixing portion 70 is discharged to outside (outside of a machine) of the image forming apparatus 1 by a discharge roller pair 80 serving as a discharge unit and is placed on a discharge tray 81 serving as a placement portion formed at an upper portion of the image forming apparatus 1. After all recording materials designated through commands are discharged to the discharge tray 81, the image forming apparatus 1 moves on to the post-rotation process P3.

In the post-rotation process P3, the various high-voltage power sources are inactivated, and the fixing portion 70 is rotated at a temperature that is lower than a temperature adjusted to at the time of paper passing or in a state where temperature adjustment is turned off in order to uniformize a temperature difference between a paper passing portion and a non-paper passing portion.

In the present embodiment, a phase determination process P4 of determining a phase of the vane portion 34*b* of the stirring member 34 disposed in the developer container 32 is performed to prepare for toner replenishment after the post-rotation process P3. A phase adjustment process P5 of stopping motor driving is performed at a timing at which the position of the vane portion 34*b* of the stirring member 34 becomes a predetermined position after the phase determination process P4, and the image forming operation is then ended. A configuration related to the toner replenishment, the phase determination process P4, and the phase adjustment process P5 will be described later in detail.

Cleanerless Toner Collection

The toner (transfer remaining toner) remaining on the photosensitive drum 21 without being transferred to the recording material P in the transfer process is removed from the photosensitive drum 21 as follows.

The surface of the photosensitive drum 21 after the transfer process plunges into the charging portion after the pre-exposure device 23 performs static elimination such that the surface potential becomes 0 V. A positively charged toner and a toner that is negatively charged but does not have a sufficient electrical charge are present together in the transfer remaining toner that remains on the photosensitive drum 21. The transfer remaining toner is negatively charged through discharge at the charging portion.

The transfer remaining toner negatively charged at the charging portion reaches the position facing the developing roller 31 with rotation of the photosensitive drum 21. Here, the electrostatic latent image in accordance with the image information is formed on the surface of the photosensitive drum 21 that has reached the position facing the developing roller 31. The transfer remaining toner adhering to a non-exposed portion (non-image portion) on the photosensitive drum 21 moves from the photosensitive drum 21 to the developing roller 31 with a potential difference between a potential before exposure and a developing voltage on the photosensitive drum 21 at the portion facing the developing roller 31 and is then collected by the developing chamber 32*e* of the developer container 32. Note that the toner collected by the developing chamber 32*e* is used to form an image again.

On the other hand, the transfer remaining toner adhering to an exposed portion (image portion) on the photosensitive drum 21 does not move from the photosensitive drum 21 to the developing roller 31 and configures a toner image along with a toner that has moved from the developing roller 31 to the photosensitive drum 21. Also, the toner is transferred onto the recording material P by the transfer portion and is then removed from the photosensitive drum 21.

Control System of Image Forming Apparatus

Figure 16:
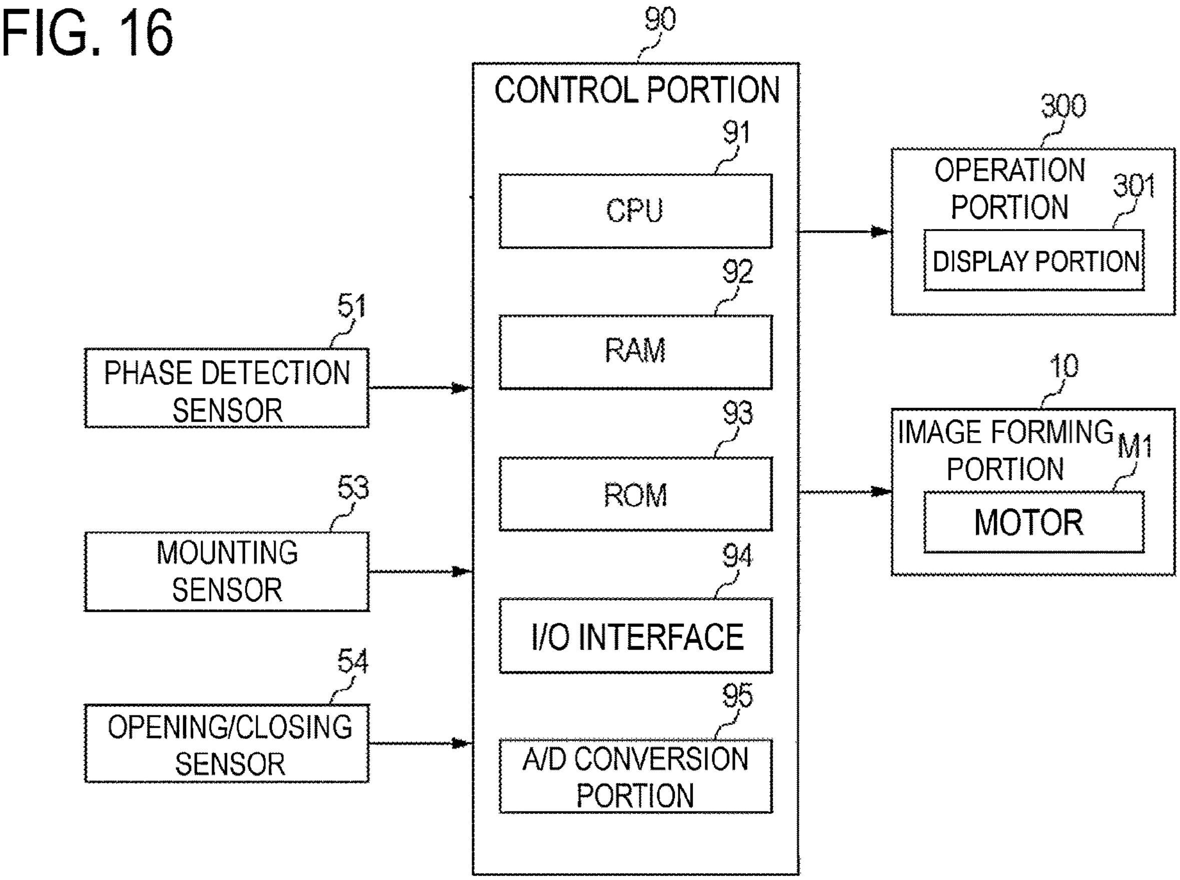
FIG. 16 is a block diagram illustrating a control system of an image forming apparatus 1.

FIG. 16 is a block diagram illustrating a control system of the image forming apparatus 1. A control portion 90 as a control unit of the image forming apparatus 1 includes a CPU 91 as an arithmetic operation device, a RAM 92 that is used as a work area of the CPU 91, and a ROM 93 that stores various programs. Also, the control portion 90 includes an I/O interface 94 as an input/output port that is connected to an external device and an A/D conversion portion 95 that converts an analog signal into a digital signal.

A phase detection sensor 51, a mounting sensor 53, and an opening/closing sensor 54 are connected to an input side of the control portion 90.

The phase detection sensor 51 is adapted to detect a phase of the stirring member 34 and is configured of a photo interrupter of a reflection type in the present embodiment as described above. The mounting sensor 53 detects that the toner pack 40 has been mounted on a replenishing port (developer receiving port) 32*a* of the developer container 32. For example, the mounting sensor 53 is provided at the replenishing port 32*a* and is configured of pressure sensitive switch that outputs a detection signal in response to pressurization by the toner pack 40. Also, the opening/closing sensor 54 detects an opening/closing state of an opening/closing member 83, that is, whether or not the opening/closing member 83 has been opened to the discharge tray 81. The opening/closing sensor 54 is configured of a pressure sensitive switch and a magnetic sensor, for example.

Also, an operation portion 300 and the image forming portion 10 are connected to the control portion 90, and the operation portion 300 includes a display portion 301 capable of displaying various setting screens, a physical key, and the like. The display portion 301 is configured of, for example, a liquid crystal panel. The image forming portion 10 includes a motor M1 as a drive source that drives the photosensitive drum 21, the developing roller 31, the supply roller 33, the stirring member 34, and the like. Note that a configuration in which each of the photosensitive drum 21, the developing roller 31 and the supply roller 33, and the stirring member 34 is driven by a separate member may be adopted.

Configuration Related to Toner Replenishment

As illustrated in FIG. 1B, the opening/closing member 83 to replenish toner using the toner pack 40 (developer replenishing container) is provided in the discharge tray 81 such that the opening/closing member 83 can be open and closed in the present embodiment based on the direct toner replenishment system. A main body-side replenishment opening portion 82 opening upward is formed in the discharge tray 81. The opening/closing member 83 is configured to be movable between a closed position at which the replenishing port 32*a* (developer receiving port) is covered such that the toner pack 40 cannot be mounted on the developer container 32 and an open position at which the replenishing port 32*a* is exposed such that the toner pack 40 can be mounted on the developer container 32. The opening/closing member 83 functions as a part of the discharge tray 81 at the closed position. The opening/closing member 83 and the main body-side replenishment opening portion 82 are formed on the left side of the discharge tray 81.

Figure 4A:
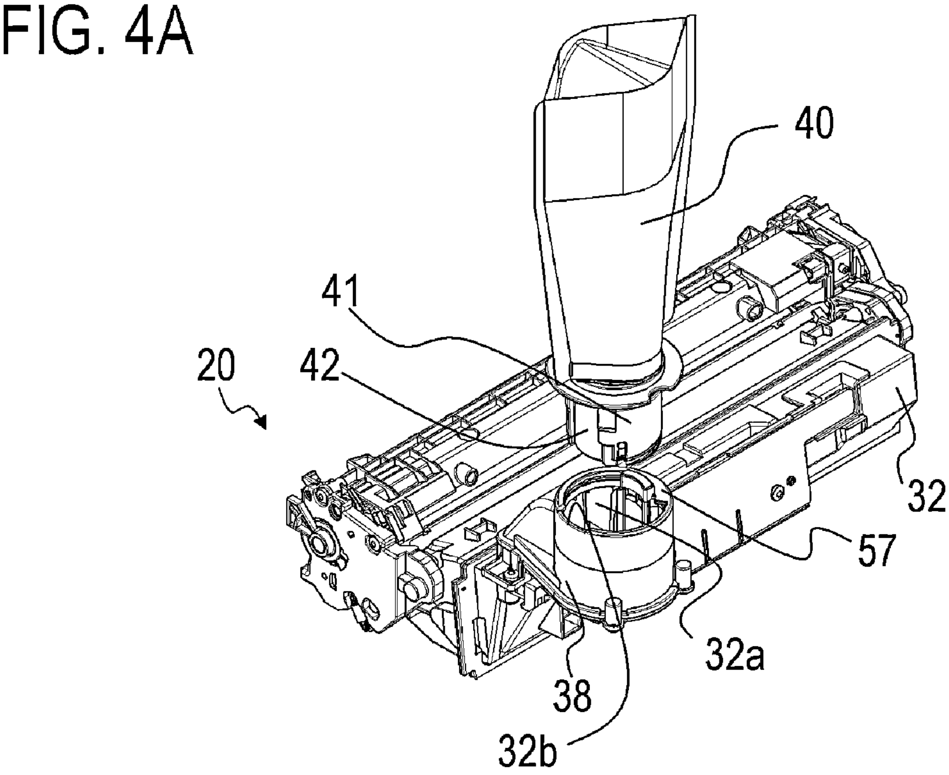
FIGS. 4A and 4B are a perspective view and a front view of a process cartridge 20 and a toner pack 40.
Figure 4B:
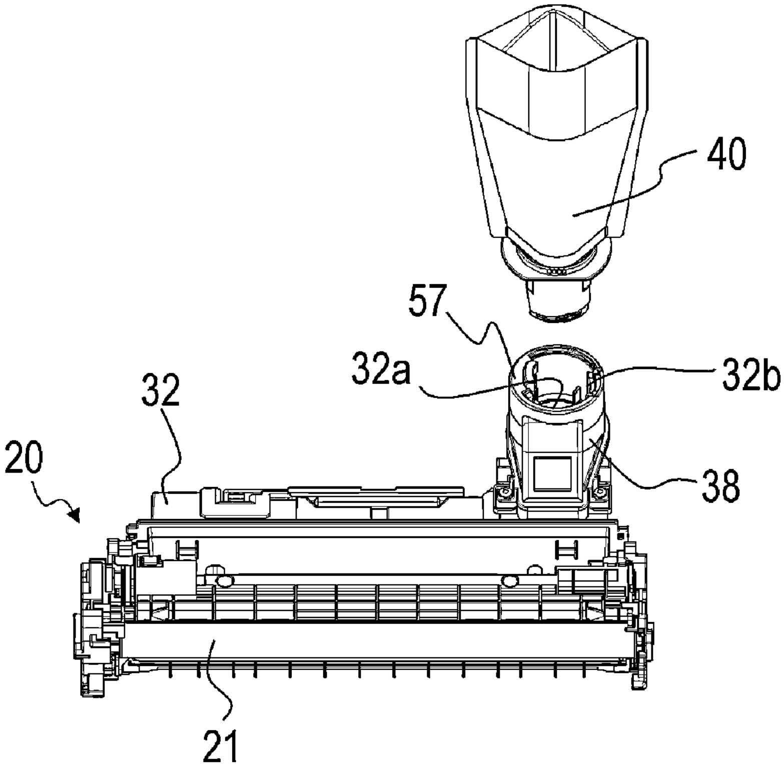

Configurations of the developer container 32 and the toner pack 40 will be explained with reference to FIGS. 4A and 4B. FIG. 4A is a perspective view illustrating the developer container 32 and the toner pack 40, and FIG. 4B is a front view illustrating the developer container 32 and the toner pack 40.

The developer container 32 includes a projecting portion 38 that projects upward on the apparatus closer side from one end portion in the longitudinal direction. A mounting portion 57 on which the toner pack 40 can be mounted is provided at an upper end portion (distal end portion) of the projecting portion 38, and the replenishing port 32*a* for replenishing the developer from the toner pack 40 to the inside of the developer container 32 is formed in the mounting portion 57. The replenishing port 32*a* opens to the outside of the developer container 32 and is continuous with an introduction port 32*c* (accommodating chamber opening) that opens in an inner wall of the toner accommodating chamber 32*d* of the developer container 32. In other words, a toner replenishing path that extends from the replenishing port 32*a* to the introduction port 32*c* is formed inside the projecting portion 38, and the replenishing port 32*a* and the introduction port 32*c* are configured to be able to communicate with each other. In other words, a user's work of replenishing the toner to the developer container 32 is facilitated by the mounting portion 57 including the replenishing port 32*a* being disposed on the apparatus closer side of the image forming apparatus 1 in the present embodiment.

The toner pack 40 is configured to be attachable to the mounting portion 57 provided at the distal end portion of the projecting portion 38 of the developer container 32. Also, the toner pack 40 includes a shutter member 41 that is provided at an opening portion and is able to open and close and a plurality of protrusions 42 that are formed corresponding to a plurality of groove portions 32*b* formed in the mounting portion 57. The shutter member 41 is configured to be movable between an open position at which the opening portion is opened (that is, the inside of the toner pack 40 is continuous with the replenishing port 32*a*) and a closed position at which the opening portion is closed (that is, the inside of the toner pack 40 is not continuous with the replenishing port 32*a*).

In a case where the toner is replenished to the developer container 32, the user performs positioning such that the protrusions 42 of the toner pack 40 pass through the groove portions 32*b* of the mounting portion 57 and couples the toner pack 40 to the mounting portion 57. Then, once the toner pack 40 is caused to rotate by 180 degrees in this state, the shutter member 41 of the toner pack 40 rotates with respect to the main body of the toner pack 40 by abutting an abutment portion, which is not illustrated, of the mounting portion 57, and the shutter member 41 is opened. In this manner, the toner accommodated in the toner pack 40 drops down from the toner pack 40, and the dropping toner enters the developer container 32 via the replenishing port 32*a*. Note that the shutter member 41 may be provided on the side of the replenishing port 32*a*.

The toner replenished from the replenishing port 32*a* is fed to the developing roller 31 and the supply roller 33 with rotation of the stirring member 34 inside the developer container 32. The replenishing port 32*a* and the projecting portion 38 are disposed at one end portion of the developer container 32 in the longitudinal direction, and the toner reaches the entire region of the developer container 32 by repeating the rotation of the stirring member 34.

Figure 15:
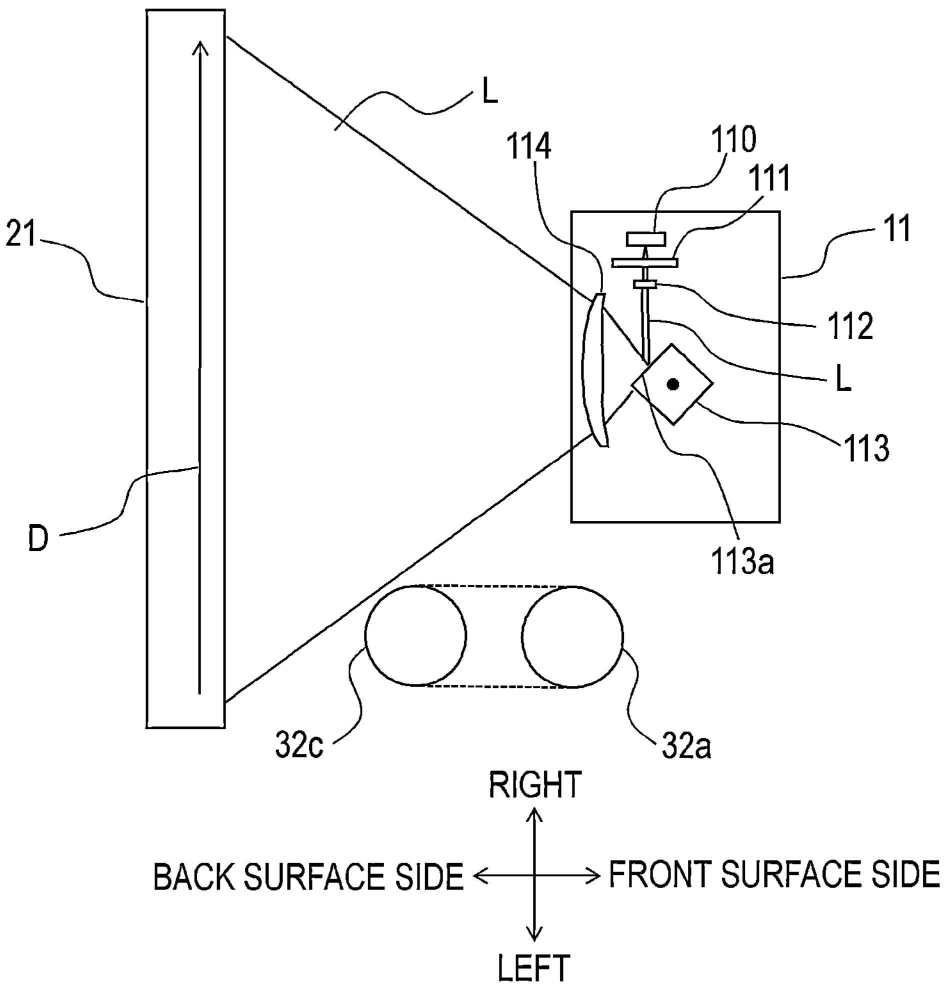
FIG. 15 is a schematic plan view illustrating an optical path of laser light of an exposure unit.

A positional relationship between the toner replenishing path of the developer container 32 and the scanner unit 11 will be explained with reference to FIG. 15. FIG. 15 is a schematic plan view for explaining a positional relationship between the scanner unit 11 and the replenishing port 32*a* and the introduction port 32*c* of the developer container 32, and is a plan view along a scanning optical path of the laser light L of the scanner unit 11.

The scanner unit 11 includes a light source 110, a diaphragm 111, an incident optical element 112, a deflector 113, and an image forming optical element 114. The light source 110 is, for example, a semiconductor laser. The diaphragm 111 has an elliptical opening portion and limits a light flux diameter in each of a main scanning direction and a sub-scanning direction of a light flux emitted from the light source 110. The incident optical element 112 has a positive refractive force in a main scanning section and converts a light flux that has passed through the diaphragm 111 into a parallel light flux in the main scanning section. The scanner unit 11 reduces the refractive force needed by the image forming optical element 114 by the light flux that has passed through the diaphragm 111 being converted into a weakly converged light flux. Also, the incident optical element 112 has a positive refractive force in a sub-scanning section and forms a line image that is long in the main scanning direction by collecting a light flux that has passed through the diaphragm 111 in the vicinity of a deflecting surface 113*a* of the deflector 113 in the sub-scanning section.

The image forming optical element 114 has a positive refractive force within each of the main scanning section and the sub-scanning section and forms a spot-shaped image in the vicinity of a scanned surface of the photosensitive drum 21 by collecting a light flux deflected by the deflector 113 within each of the main scanning section and the sub-scanning section. Specifically, the image forming optical element 114 includes two optical surfaces (lens surfaces), namely an incident surface and an emitting surface and is configured such that the light flux deflected by the deflecting surface 113*a* of the deflector 113 scans the scanned surface of the photosensitive drum 21 with desired scanning properties within the main scanning section. Also, the image forming optical element 114 performs surface falling compensation (that is, reduction of a scanning position deviation in the sub-scanning direction on the scanned surface of the photosensitive drum 21 when the deflecting surface 113*a* falls down) by keeping the vicinity of the deflecting surface 113*a* of the deflector 113 and the vicinity of the scanned surface of the photosensitive drum 21 in a mutual conjugate relationship within the sub-scanning section.

In this manner, the light flux emitted from the light source 110 passes through the diaphragm 111 and the incident optical element 112 and is then incident on the deflecting surface 113*a* of the deflector 113. Then, the light flux reflection-deflected by the deflecting surface 113*a* of the deflector 113 is introduced to the scanned surface of the photosensitive drum 21 by the image forming optical element 114. The deflector 113 forms an electrostatic latent image on the scanned surface of the photosensitive drum 21 by being rotated at a constant speed by a drive portion, which is not illustrated, and optically scanning the scanned surface of the photosensitive drum 21 in the main scanning direction illustrated by the arrow D.

As illustrated in FIGS. 15 and 1A, the projecting portion 38 (the toner replenishing path from the replenishing port 32*a* to the introduction port 32*c*) of the developer container 32 extends above and below a scanning optical path of the laser light L of the scanner unit 11 at positions where the scanning optical path is avoided. In other words, the replenishing port 32*a* is located above the scanning optical path of the laser light L, and the introduction port 32*c* is located below the scanning optical path of the laser light L when seen in the apparatus left-right direction. Note that the apparatus left-right direction is a direction that is substantially parallel to the direction of the rotation axis of rotating members such as the photosensitive drum 21, the developing roller 31, the supply roller 33, and the stirring member 34.

Also, as illustrated in FIG. 15, the toner replenishing path from the replenishing port 32*a* to the introduction port 32*c* is at a position included on the side further inward (the center side of the photosensitive drum 21) than the end portion of the photosensitive drum 21 in the apparatus left-right direction. Moreover, the toner replenishing path is at a position included between the photosensitive drum 21 and the scanner unit 11 in the apparatus front-rear direction. In other words, the projecting portion 38 of the developer container 32 is disposed to prevent the apparatus sizes in the apparatus left-right direction and the apparatus front-rear direction from increasing while avoiding the scanning optical path of the laser light L emitted from the image forming optical element 114.

Concerning Phase of Vane Portion 34*b* During Replenishment and Mixed State of New and Old Toners The toner (hereinafter, referred to as a new toner) replenished from the replenishing port 32*a* by the toner pack 40 is introduced into the toner accommodating chamber 32*d* via the introduction port 32*c* and reaches the entire longitudinal region inside the toner accommodating chamber 32*d* by rotation of the stirring member 34 inside the toner accommodating chamber 32*d*. Also, the new toner is gradually mixed with the toner (hereinafter, referred to as an old toner) that is originally present inside the developer container 32.

Here, it has been discovered that a stop phase of the vane portion 34*b* of the stirring member 34 before a start of location at the time of replenishing the new toner causes a difference in level of a degree to which the new toner enters the toner accommodating chamber 32*d*. Specifically, it has been discovered that there is a case where the new toner instantaneously spreads to the entire region in the toner accommodating chamber 32*d* in the longitudinal direction and a case where the new toner remains near the introduction port 32*c* in the toner accommodating chamber 32*d* in the longitudinal direction. It has also been discovered that a time required for the new toner and the old toner to be uniformly mixed by the rotation of the stirring member 34 after the new toner is replenished by the toner pack 40 significantly differs in each case.

Figure 5A:
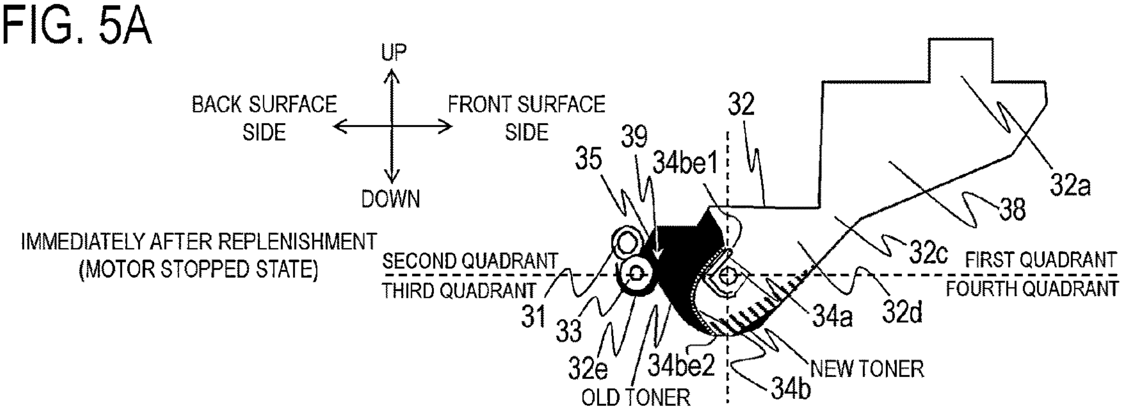
FIGS. 5A to 5D are diagrams illustrating a phase of a stirring member 34 at the time of replenishment and toner mixed states achieved by later stirring.
Figure 5B:
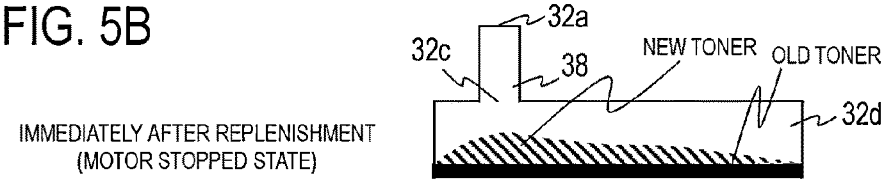
Figure 5C:
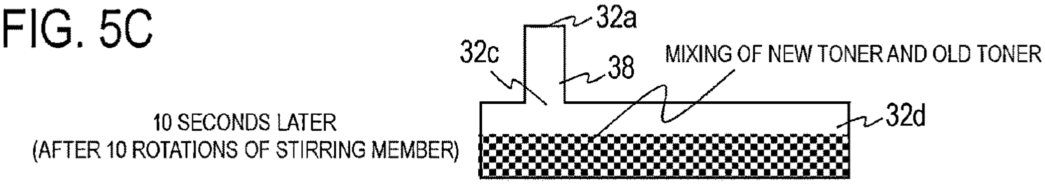
Figure 5D:
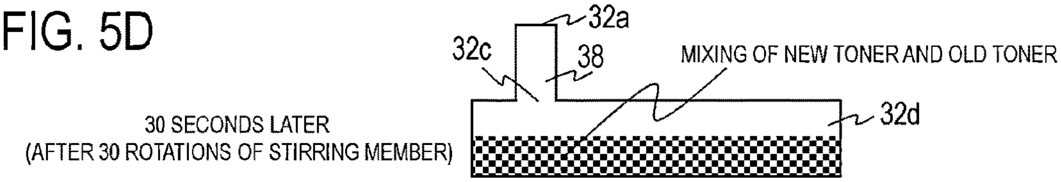
Figure 6A:
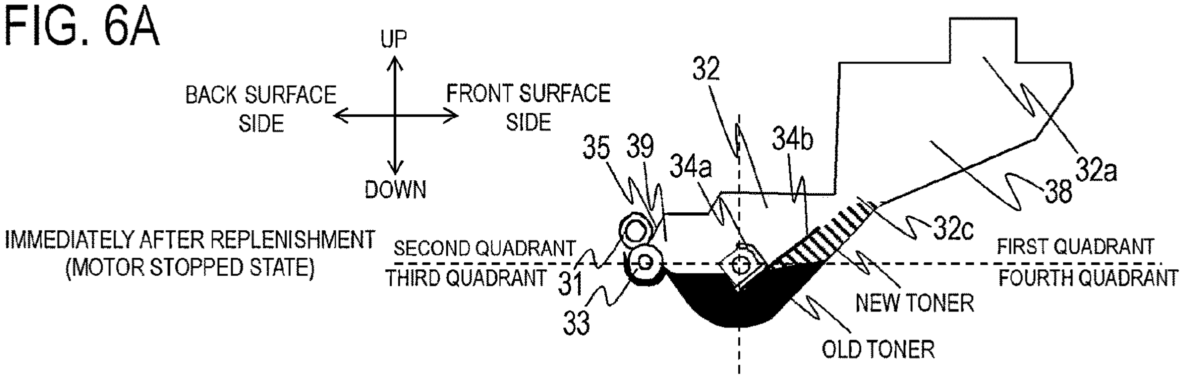
FIGS. 6A to 6D are diagrams illustrating a phase of the stirring member 34 at the time of replenishment and toner mixed states achieved by later stirring.
Figure 6B:
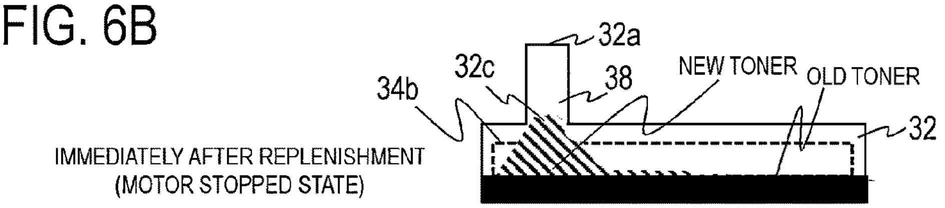
Figure 6C:
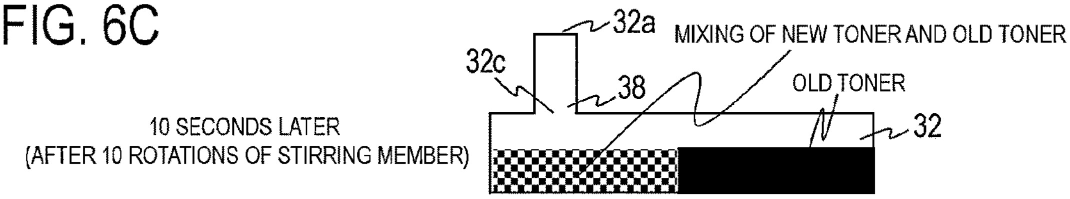
Figure 6D:
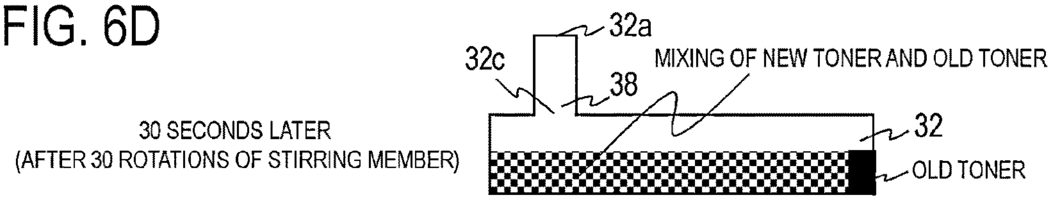
Figure 7A:
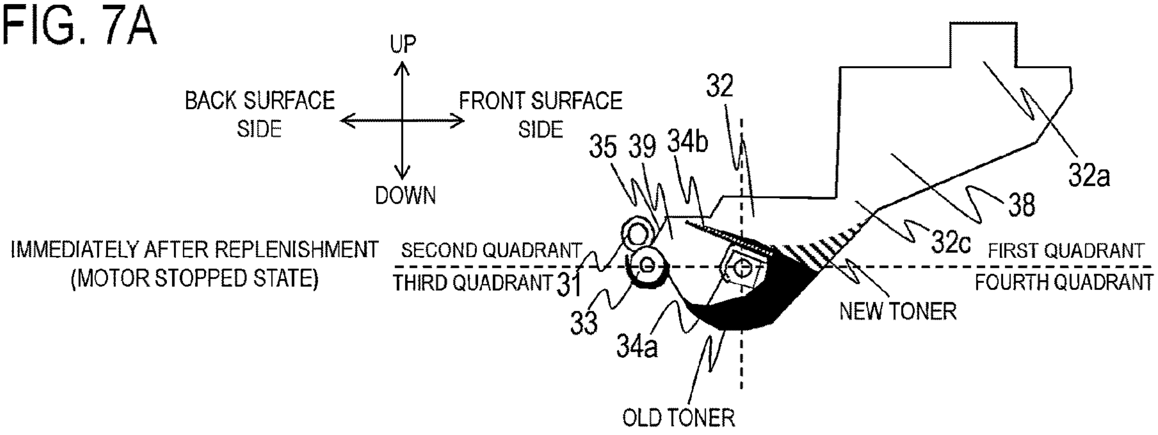
FIGS. 7A to 7D are diagrams illustrating phases of the stirring member 34 at the time of replenishment in another case.
Figure 7B:
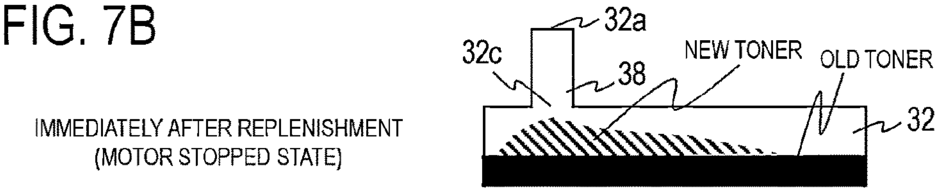
Figure 7C:
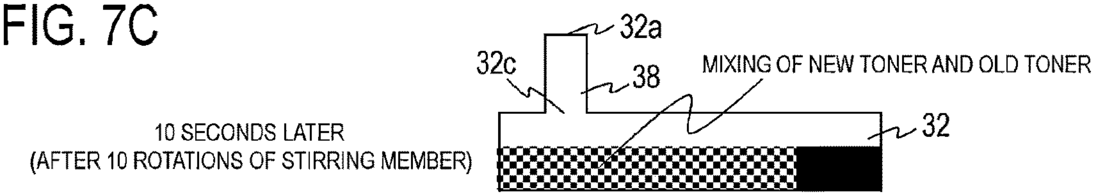
Figure 7D:
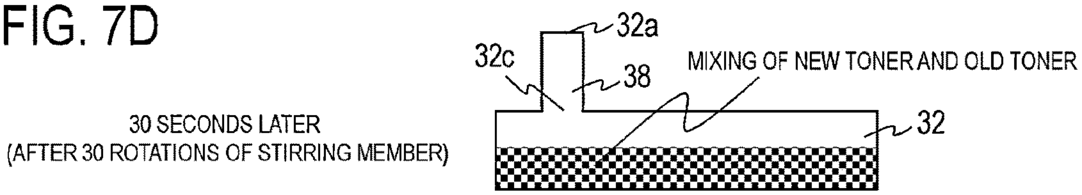
Figure 8A:
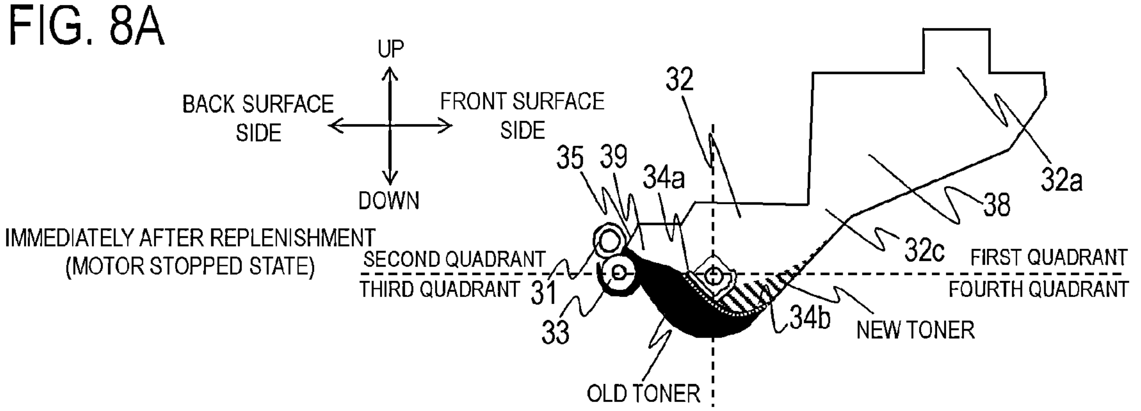
FIGS. 8A to 8D are diagrams illustrating phases of the stirring member 34 at the time of replenishment in another case.
Figure 8B:
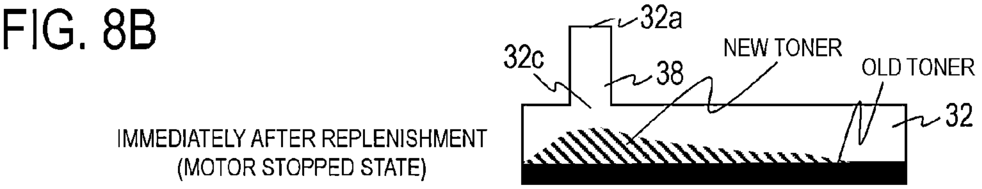
Figure 8C:
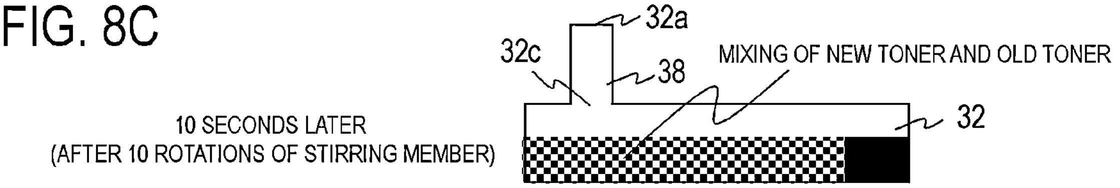
Figure 8D:
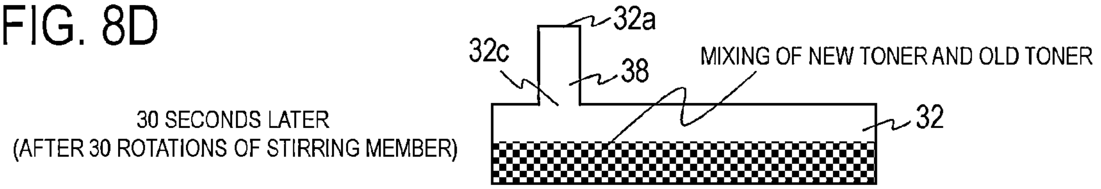

FIGS. 5A to 5D and 6A to 6D are schematic views illustrating how the new toner (hatched portion) replenished from the toner pack 40 and the old toner (solid portion) inside the developer container 32 are. FIGS. 5A and 6A are schematic sectional views of the developer container 32 seen from a lateral side (left side). FIGS. 5B to 5D and 6B to 6D are schematic views of the inside of the developer container 32 seen from the front surface side. FIGS. 5A to 5D and 6A to 6D are diagrams illustrating how the new toner is actually mixed with the old toner by preparing a transparent developer container 32 and using a yellow toner as a new toner of the toner pack 40 and a black toner as an old toner inside the transparent developer container 32. FIGS. 5B to 5D and 6B to 6D represent how a range up to the plane including the stirring shaft 34*a* of the stirring member 34 is seen from the front surface side.

An expression "immediately after the replenishment" described here means a timing before the stirring member 34 rotates. Also, the image views seen from the front surface side also show how the toners are like immediately after the replenishment, 10 seconds later (after 10 rotations of the stirring member 34), and 30 seconds later (after 30 rotations of the stirring member 34) after the stirring member 34 starts to rotate. The solid portion indicates a part where the proportion of the old toner is high, the hatched portion indicates a part where the proportion of the new toner is high, and the dot portion indicates a part where the new toner and the old toner are satisfactorily mixed.

FIGS. 5A to 5D illustrate a case where the new toner is replenished when the distal end position of the vane portion 34*b* of the stirring member 34 is at the furthest location from the introduction port 32*c* at the time of replenishment. FIGS. 6A to 6D illustrate a case where the new toner is replenished when the distal end position of the vane portion 34*b* of the stirring member 34 is at a location on the side of the introduction port 32*c* at the time of replenishment.

Here, the furthest location from the introduction port 32*c* is defined as follows. The introduction port 32*c* is located in a first quadrant of a two-dimensional orthogonal coordinate system sectioned by an axis (second virtual line) in the gravity direction and an axis (first virtual line) in a direction (horizontal direction) perpendicularly intersecting the gravity direction around the rotation shaft (rotation center) of the stirring shaft 34*a* of the stirring member 34. With respect to the introduction port 32*c* located in the first quadrant as one quadrant, developing portions such as the photosensitive drum 21 and the developing roller 31 are located in a second quadrant as the other quadrant. At this time, a state where the distal end of the vane portion 34*b* of the stirring member 34 before replenishment is located in a third quadrant is defined as the furthest location from the introduction port 32*c*. In other words, a predetermined stop position where the distal end of the vane portion 34*b* of the stirring member 34 before replenishment is located is set at a position inside the third quadrant, which is the furthest location from the introduction port 32*c*. On the other hand, a timing when the distal end position of the vane portion 34*b* of the stirring member 34 at the time of replenishment is located on the side of the introduction port 32*c* corresponds to a state where the distal end of the vane portion 34*b* of the stirring member 34 before replenishment is located in the first quadrant which is the same quadrant as that of the introduction port 32*c*.

Note that the positional relationship of each configuration of the apparatus using the above coordinate system does not require an apparatus layout to strictly dispose the configuration in each quadrant. In other words, disposition in which a part (a major part of the introduction port 32*c*) of the introduction port 32*c* is included in the first quadrant and the other part sticks out to another quadrant may be adopted. Similarly, disposition in which a part of the vane portion 34*b* including at least the distal end (second end portion 34*be*2) of the vane portion 34*b* is included in the third quadrant and the other part sticks out to another quadrant may be adopted for the vane portion 34*b* of the stirring member 34 as well. Other positional relationships using the above coordinate system described below may be similarly considered.

As illustrated in FIGS. 5A to 5D, the new toner is ejected to a sufficiently broad space in a case where the distal end position of the vane portion 34*b* is at the furthest location from the introduction port 32*c* at the time of replenishment of the new toner. Then, the new toner spreads like a landslide in the longitudinal direction as well while dropping to the bottom surface inside the developer container 32. In other words, the replenished new toner reaches the entire region in the longitudinal direction. This is caused because the old toner inside the developer container 32 has been pushed to the side of the developing opening portion 39 in this state, there is thus substantially no old toner on the bottom surface of the developer container 32, and a state where a broad space is open when seen from the introduction port 32*c* has been achieved.

However, on the other hand, the new toner remains immediately below the replenishing port 32*a* of the toner replenishing path reaching the introduction port 32*c* from the replenishing port 32*a* inside the projecting portion 38 in a case where the distal end position of the vane portion 34*b* is located on the side of the introduction port 32*c* at the time of replenishment of the new toner as illustrated in FIGS. 6A to 6D. Reasons that the state is achieved are considered as follows. One reason is that the vane portion 34*b* at this time is in a state before the old toner is fed to the developing opening portion 39 where the developing roller 31 and the supply roller 33 are present and a bottom portion of the developer container 32 is filled with the old toner. Furthermore, the vane portion 34*b* blocks an ejection space of the new toner. In this manner, a state where the new toner is ejected to a narrow space once at a time is achieved, a state where the new toner remains in the projecting portion 38 as described above occurs. The toner which is powder is brought into a further clogging state due to a pressure of the toner itself and friction with each side surface as it is ejected to a narrower space. Therefore, the new toner is unlikely to spread in the longitudinal direction inside the developer container 32.

An object of the present embodiment is to achieve a state where the new toner and the old toner are mixed in a nearly uniform state in the longitudinal direction in a shorter period of time inside the developer container 32. Although the vane portion 34*b* is adapted to stir the toner in the rotation direction, the toner is gradually mixed in the longitudinal direction as well through continuous rotation.

As illustrated in FIGS. 6A to 6D, it takes time of 30 seconds (30 rotations of the stirring member 34) or more until the new toner reaches the entire longitudinal region if the stirring member 34 is driven in a state where the new toner remains near the introduction port 32*c* in the longitudinal direction inside the developer container 32.

However, it is possible to achieve uniformization in about 10 seconds (10 rotations of the stirring member 34) in a case where the new toner enters the developer container 32 in a spreading manner in the longitudinal direction at a timing immediately after the replenishment by the distal end position of the vane portion 34*b* being at the furthest location from the introduction port 32*c* as illustrated in FIGS. 5A to 5D.

Concerning Mixed State of New and Old Toners and Image Failure

In a case where the image forming process is started before the old toner and the new toner are completely mixed, an image failure due to a transfer failure may occur. Transformation of the toner or filling of an additive may occur if the toner is continuously stirred inside the developer container 32 or particularly through the repeated image forming process in a case of a cleanerless configuration as in the present embodiment. Therefore, charge performance of the old toner may be degraded as compared with the new toner.

As the charge performance of the toner is higher, the potential distribution of the developing roller 31 and the photosensitive drum 21 is more likely to be followed, and development as a toner image is more likely to be achieved on the electrostatic latent image on the photosensitive drum 21. Therefore, in a case where the old toner and the new toner are uniformly mixed, the new toner in the mixed toner is used to form an image with higher priority. However, if the mixing of the toners is not uniform, a situation in which the new toner with high charge performance is used to form an image or a situation in which the old toner with low charge performance is used to form an image may occur.

Also, as the charge performance of the toner is higher, a stronger bias is needed to transfer the toner image on the photosensitive drum 21 onto the recording material P. On the other hand, if a high transfer bias is applied to a toner with low charge performance, a coarse image failure called strong defect may occur. In other words, if a transfer bias is set in accordance with the new toner with high charge performance, an image failure such as a strong defect may occur in a case where a region in which the old toner with low charge performance is used to form an image is present. Therefore, if the mixing of the old toner and the new toner remains non-uniform, or if the new toner does not reach the entire region in the longitudinal direction and there is a region where only the old toner is present, a strong defect may occur in the region where the old toner is used to form an image.

In this manner, the transfer bias setting needed after the replenishment may become difficult due to variations in the mixed state of the new and old toners after the replenishment, and a situation in which a transfer failure cannot be avoided in the longitudinal direction may be achieved. Therefore, it is desirable that the mixed state of the new and old toners be a mixed state where the new toner is uniformly distributed in the longitudinal direction as much as possible.

Phase Determination Process P4 and Phase Adjustment Process P5

Thus, in the present embodiment, the control portion 90 controls the stirring member 34 such that the stirring member 34 stops rotating in a predetermined rotation phase by a timing at which the toner passes through the introduction port 32*c* of the developer container 32 at the latest when the toner is replenished from the toner pack 40 to the developer container 32. In other words, the control portion 90 controls rotation of the stirring shaft 34*a* to stop rotating in a state where the distal end (second end portion 34*be*2) of the vane portion 34*b* is located in a quadrant that is different from a quadrant where the introduction port 32*c* is located in the above coordinate system. More specifically, a motor drive time is adjusted such that the phase of the vane portion 34*b* of the stirring member 34 is at the furthest location from the introduction port 32*c* when the motor is stopped after a print job. A phase determination process P4 and a phase adjustment process P5 are added after the post-rotation process P3 after the image forming process P2, and the print job is then ended.

In the present embodiment, the pin 34*d* provided at the gear 34*c* of the stirring member 34 and the sensor 51 determine the phase of the vane portion 34*b* of the stirring member 34 in the phase determination process P4. After the phase determination, the process proceeds to the phase adjustment process P5. In the phase adjustment process P5, a command for a motor stop timing is provided to the control portion of the image forming apparatus 1 such that the position of the vane portion 34*b* of the stirring member 34 becomes the furthest location from the desired replenishing port 32*a*. An inertia of several msec may occur until the motor drive is actually turned off after the command to stop is provided to the control portion, depending on the motor. In the image forming apparatus in the present embodiment, a brush motor is used as a motor serving as a drive source, and it takes time for the motor to completely stop rotating due to inertia even after a current is stopped. Therefore, it is desirable to adjust a stop command timing in consideration of the inertia.

Also, the vane portion 34*b* is accompanied with not a little deformation when the vane portion 34*b* comes into contact with the inner wall of the toner accommodating chamber 32*d*. A degree of the deformation may change in accordance with a change in phase of the stirring shaft 34*a*. In other words, the shape of the inner wall surface of the toner accommodating chamber 32*d* is not a uniform shape with respect to the rotation center of the stirring shaft 34*a*, and it is considered that a magnitude of a reaction force that the distal end of the vane portion 34*b* receives from the inner wall surface of the toner accommodating chamber 32*d* also changes and how the deformation occurs also changes when the position of contact with the inner wall surface of the toner accommodating chamber 32*d* changes. The shape of the inner wall of the toner accommodating chamber 32*d* is not a cylindrical surface around the rotation center of the stirring member 34, and a positional change of the distal end of the vane portion 34*b* during rotation of the stirring member 34 is not constant with respect to a phase change of the stirring shaft 34*a* due to the change in how the vane portion 34*b* is deformed. In other words, it is considered that the position of the rotation phase of the stirring shaft 34*a* and the position of the distal end of the vane portion 34*b* do not necessarily have one-to-one correspondence. It is considered that how the vane portion 34*b* is deformed also changes due to a change in toner remaining amount in the toner accommodating chamber 32*d*. Therefore, it is desirable to recognize the correspondence between the rotation phase of the stirring shaft 34*a* and the position of the distal end of the vane portion 34*b* in advance through experiments or the like and to reflect the correspondence to the amount of control for the rotation control of the stirring shaft 34*a*.

Effects and Advantages of Present Embodiment

According to the present embodiment, it is possible to constantly keep a state where the position of the distal end of the vane portion 34*b* is at the furthest location from the introduction port 32*c* to constantly prepare for replenishment when the motor is stopped after a print job ends. At this time, the old toner in the developer container 32 is pushed on the side of the developing opening portion 39, and there is thus a space on the bottom surface of the developer container 32. The new toner in the toner pack is ejected while spreading over the entire longitudinal region of the developer container 32 without clogging due to the space. Thereafter, once the rotation of the stirring member 34 is started, the mixed state of the new toner and the old toner is uniformized in a shorter period of time than that in the configuration in the related art (a configuration in which phase control of the stirring member 34 is not performed).

The situation in which the new toner is uniformly present over the entire longitudinal region of the developer container 32 is achieved in a shorter period of time as compared with the related art as described above, and it is thus possible to reduce the probability that an image failure occurs.

Note that although the motor is stopped such that the distal end of the vane portion 34*b* is located in the third quadrant in the orthogonal coordinate system around the rotation center of the stirring shaft 34*a* of the stirring member 34 in the phase adjustment process in the present embodiment, the present invention is not limited thereto. In the present embodiment, the space to which the new toner in the toner pack 40 is ejected is the broadest in a case where the distal end of the vane portion 34*b* of the stirring member 34 is stopped in the third quadrant. However, the same effects as those described above can be exhibited if the new toner in the toner pack 40 is ejected to a sufficiently broad space and goes forward in a spreading manner in the longitudinal direction of the developer container 32 even if the motor is stopped in the second or fourth quadrant as illustrated in FIGS. 7A to 7D and 8A to 8D, for example.

Also, although the phase determination and the phase adjustment are performed after the post-rotation process P3 in the present embodiment, a time required for all processes for a print job may be shortened by performing the position determination in parallel with the post-rotation process P3.

Also, it is only necessary to perform the phase adjustment in time before the toner replenishment, and a configuration in which the phase adjustment is executed before a user actually replenishes a toner may be adopted. In other words, the opening/closing sensor 54 is included as a configuration capable of detecting opening/closing of the opening/closing member 83 provided in a top cover, and the motor may be driven to perform the phase determination process P4 and the phase adjustment process P5 once opening of the opening/closing member 83 is detected. Alternatively, the mounting sensor 53 is included as a configuration capable of detecting mounting of the toner pack 40 on the mounting portion 57, and the motor is driven and the phase determination process P4 and the phase adjustment process P5 may be performed once mounting of the toner pack 40 on the mounting portion 57 is detected. In other words, a configuration in which the phase adjustment of the stirring member 34 is started using detection of the fact that the user has started to prepare for toner replenishment as a trigger may be adopted as a configuration capable of detecting that the user is in a situation in which the user is preparing for toner replenishment (or the likelihood thereof is high).

Also, influences of the inertia in the position adjustment decreases as a motor drive speed (process speed) for the position adjustment is lower. Therefore, the process speed in the phase determination process or the phase adjustment process may be lower than the process speed in the image forming process. It is thus possible to perform the position adjustment with high accuracy.

Others

The positional relationship (the quadrant where each configuration is located) of each configuration in the coordinate system illustrated in FIGS. 5A to 5D to 8A to 8D is a positional relationship when the image forming apparatus is seen from the left side to the right side. Therefore, the quadrant where each configuration is located when seen from the right side to the left side in an opposite manner is inverted in the left-right direction on the paper surface. In other words, the quadrant where the introduction port 32*c* is located in the second quadrant, and the quadrant where the distal end of the vane portion 34*b* is stopped is the fourth quadrant, the first quadrant, or the second quadrant in the positional relationship of each configuration when seen from the right side to the left side, for example.

Also, as a reason that it takes time for the new toner to be mixed with the old toner, a relationship with how broad the toner accommodating chamber 32*d* of the developer container 32 is and how broad the toner path of the projecting portion 38 is (how broad the introduction port 32*c* opening in the inner wall surface of the toner accommodating chamber 32*d*) are also conceivable. It is possible to state that this problem is likely to occur when the width of the projecting portion 38 (introduction port 32*c*) is small with respect to the entire longitudinal length of the toner accommodating chamber 32*d*.

In the present embodiment, a configuration in which the introduction port 32*c* is opened at a position localized on one longitudinal end side of the toner accommodating chamber 32*d* as described above is adopted as a configuration capable of replenishing the toner from the apparatus upper surface in consideration of usability and as a configuration in which the replenishing port does not block the laser light for exposure. In the present embodiment, the longitudinal length of the toner accommodating chamber 32*d* is 230 mm, the longitudinal width (inner diameter) of the introduction port 32*c* is 40 mm, and the length from the longitudinal center of the toner accommodating chamber 32*d* to the width center of the introduction port 32*c* is 86 mm. In regard to the longitudinal position of the introduction port 32*c* with respect to the toner accommodating chamber 32*d*, there is a concern that it becomes difficult for the new toner to reach both the longitudinal end portions depending on the phase of the stirring member 34 even in the configuration in which the introduction port 32*c* is opened at the longitudinal center of the toner accommodating chamber 32*d*, for example. In other words, the configuration that may cause the problem of the present invention is not limited to the above configuration illustrated in the present embodiment.

Also, in a case where the vertical width (height direction) of the toner accommodating chamber 32*d* is sufficiently wide, and a sufficient distance can be secured between the distal end of the vane portion 34*b* and the introduction port 32*c* even when the distal end of the vane portion 34*b* is located in the first quadrant, that is, in a case where there is a space that the new toner can enter in a spreading manner in the longitudinal direction on the side further outward than a trajectory along which the stirring member 34 (the distal end of the vane portion 34*b*) is turned, the aforementioned problem in regard to the time required for the new toner and the old toner to be mixed is unlikely to occur. However, in order to provide such a space, it is necessary to have a wide vertical width for the toner accommodating chamber 32*d*, and there is a concern of an increase in size of the apparatus main body. The developer container 32 in the present embodiment is configured such that the introduction port 32*c* is opened at the same height as the region where the distal end of the vane portion 34*b* can come into contact on the upper surface of the inner wall surface of the toner accommodating chamber 32*d* to prevent the size of the apparatus main body from increasing in the apparatus up-down direction. In other words, according to the present embodiment, it is possible to shorten the time required to mix the new toner and the old toner in a configuration of a small-sized developer container 32 in which it is not possible to secure a sufficient distance between the distal end of the vane portion 34*b* of the stirring member 34 located in the first quadrant and the introduction port 32*c*.

Second Embodiment

Figure 9A:
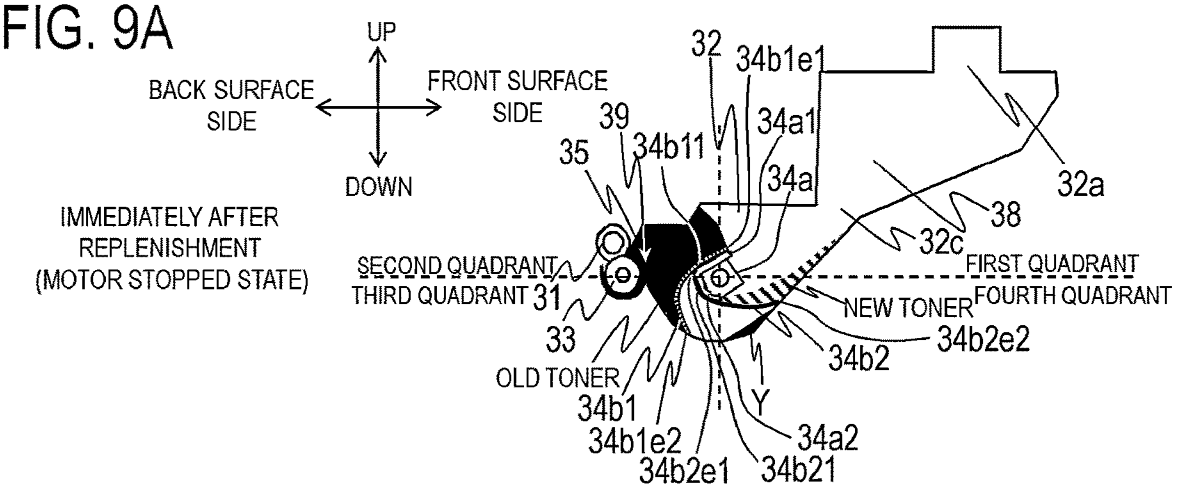
FIGS. 9A to 9C are diagrams illustrating phases of a stirring member 34 at the time of replenishment according to a second embodiment.
Figure 9B:
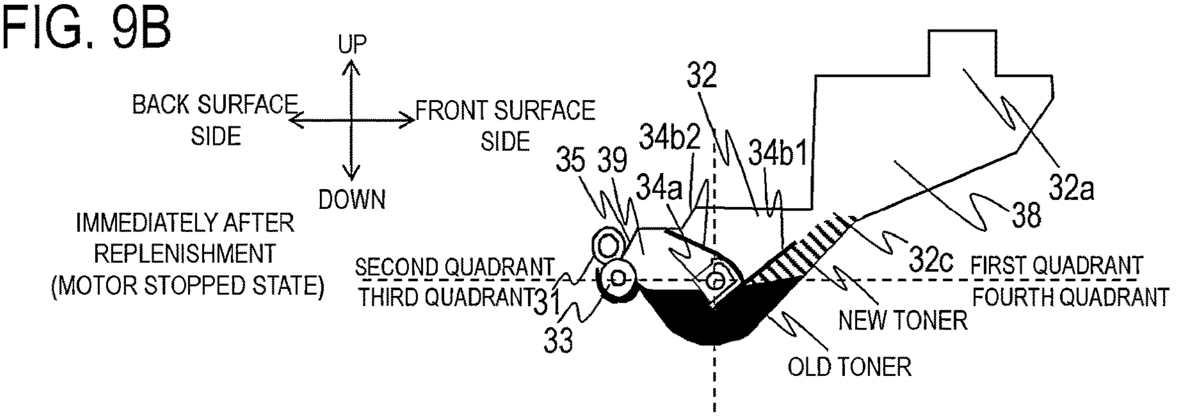
Figure 9C:
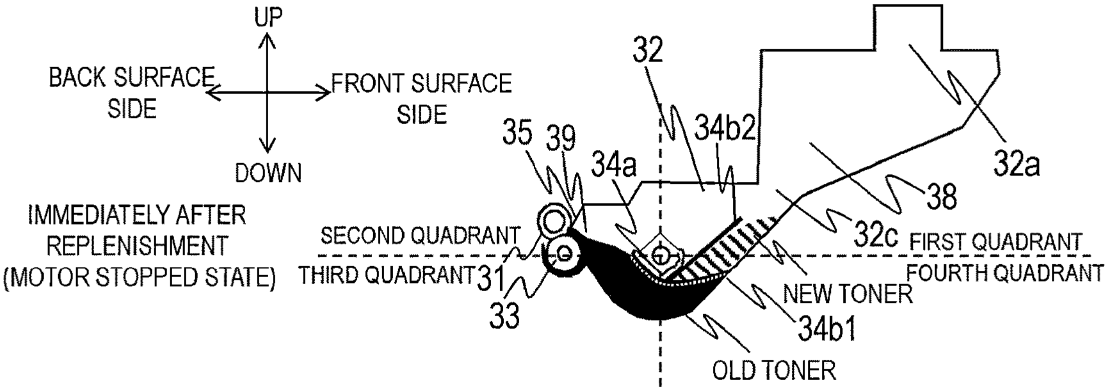

A second embodiment of the present invention will be explained with reference to FIGS. 9A to 9C. FIGS. 9A to 9C are sectional views of a developer container 32 according to the second embodiment.

In the second embodiment, a stirring member 34 includes a plurality of vane portions in order to uniformize mixture of new and old toners earlier at the time of replenishment. Configurations of an image forming apparatus according to the second embodiment other than a vane portion of a stirring member 34 are the same as the configurations of the image forming apparatus explained in the first embodiment, and explanation thereof will be omitted.

In the present embodiment, the stirring member 34 includes a first vane portion 34*b*1 and a second vane portion 34*b*2. The first vane portion 34*b*1 and the second vane portion 34*b*2 are members with the same shape made of polycarbonate. The second vane portion 34*b*2 is installed at a position deviating by 90° on the side downstream the first vane portion 34*b*1 in a rotation direction.

Specifically, the stirring shaft 34*a* includes a first attachment surface 34*al* that extends in a direction of a rotation axis and a second attachment surface 34*a*2 that extends in the direction of the rotation axis at a position different from that of the first attachment surface 34*al* around the rotation axis. The first attachment surface 34*al* and the second attachment surface 34*a*2 are two surfaces adjacent to each other from among four surfaces of the stirring shaft 34*a* with a rectangular section aligned in the rotation direction, and are surfaces with vertical lines (normal lines) extending in mutually perpendicularly intersecting directions. A first vane portion (first sheet) 34*b*1 includes a first attachment portion 34*b*11 that comes into contact with the first attachment surface 34*al*. The first vane portion 34*b*1 has one end portion (first end portion) 34*b*1*e*1 in a direction perpendicularly intersecting the rotation axis fixed to the stirring shaft 34*a* as a part of the attachment portion 34*b*11 and the other end portion (second end portion) 34*b*1*e*2 capable of coming into contact with an inner wall surface of a toner accommodating chamber 32*d*. A second vane portion (second sheet) 34*b*2 includes an attachment portion (second attachment portion) 34*b*21 that comes into contact with the second attachment surface 34*a*2. The second vane portion 34*b*2 has one end portion (third end portion) 34*b*2*e*1 in the direction perpendicularly intersecting the rotation axis fixed to the stirring shaft 34*a* as a part of the attachment portion 34*b*21 and the other end portion (fourth end portion) 34*b*2*e*2 capable of coming into contact with the toner accommodating chamber 32*d*.

The first vane portion 34*b*1 may be significantly bent due to a toner working as a resistance in a case where the amount of toner inside the developer container 32 is large. If the first vane portion 34*b*1 is bent, the toner (Y in the drawing) may remain even after passing through a bottom portion inside the developer container 32. Although mixing of the toner Y at the bottom portion with a dropping toner progresses at a timing when the toner scraped off by the first vane portion 34*b*1 then drops toward the bottom portion, it may take more time to achieve a mixed state where a new toner and an old toner are uniform after replenishment of the new toner as compared with a case where the toner Y does not remain at the bottom portion.

In the present embodiment, the second vane portion 34*b*2 that is present on the side downstream the first vane portion 34*b*1 at 900 can scrape off the toner Y at the bottom portion remaining after the first vane portion 34*b*1 passes. In other words, the toner Y is also fed to the developing opening portion 39 in the present embodiment. Since mixing of the toner Y is actively promoted by the developing opening portion 39, stirring of the entire toner in the developer container 32 quickly progresses. The time taken for the replenished new toner and the old toner in the developer container 32 to be uniformly mixed is shortened even immediately after the replenishment because of presence of the second vane portion 34*b*2.

Concerning Phase of Vane Portions and Mixed State of New and Old Toners at Time of Replenishment in Second Embodiment Even in the configuration including two vane portions as in the second embodiment, a control portion 90 controls rotation of the stirring shaft 34*a* such that both end portions of the two vane portions are located in a quadrant that is different from a quadrant where the introduction port 32*c* is located in the above coordinate system similarly to the first embodiment. In other words, it is possible to obtain effects that are similar to those described in the first embodiment by adjusting the phase such that replenishment is performed when positions of both distal ends of the vane portions **34*b*1 and 34*b*2 at the time of replenishment are located far from the introduction port 32*c***.

FIG. 9A illustrates a case where the new toner is replenished when the positions of the distal ends of the two vane portions **34*b*1 and 34*b*2 are located far from the introduction port 32*c*. FIG. 9B illustrates a case where the new toner is replenished when the distal end of the first vane portion 34*b*1 is located on the side of the introduction port 32*c*, and FIG. 9C illustrates a case where the new toner is replenished when the distal end of the second vane portion 34*b*2 is located on the side of the introduction port 32*c***.

As illustrated in FIG. 9A, in a case where the new toner is replenished when the positions of the distal ends of the vane portions **34*b*1 and 34*b*2 are located far from the introduction port 32*c*, the new toner cannot enter the bottom surface of the developer container 32 due to presence of the second vane portion 34*b*2. However, since both the vane portions 34*b*1 and 34*b*2 do not block the space inside the developer container 32 to which the new toner from the toner pack 40 is replenished, the new toner is ejected to a sufficiently broad space. In this manner, the new product toner enters the developer container 32** in a spreading manner to the entire region in the longitudinal direction.

However, in a case where replenishment is performed when the position of the distal end of either the vane portion **34*b*1 or the vane portion 34*b*2 is located on the side of the introduction port 32*c*, the vane portion 34*b*1 or the vane portion 34*b*2 blocks the space where the new toner enters as illustrated in FIG. 9B or 9C. Therefore, the new toner is ejected to a narrow space, clogging of the ejected new toner may occur, and the new toner may remain near the projecting portion 38 in the longitudinal direction in the developer container 32**.

In the second embodiment, the toners are uniformized 5 seconds later (after 5 rotations of the stirring member 34) once the stirring member 34 is driven in a state where the new toner has instantaneously spread in the longitudinal direction immediately after the replenishment as illustrated in FIG. 9A. Also, it has also been possible to confirm that a transfer failure after the replenishment does not occur in the state.

Third Embodiment

Figure 10A:
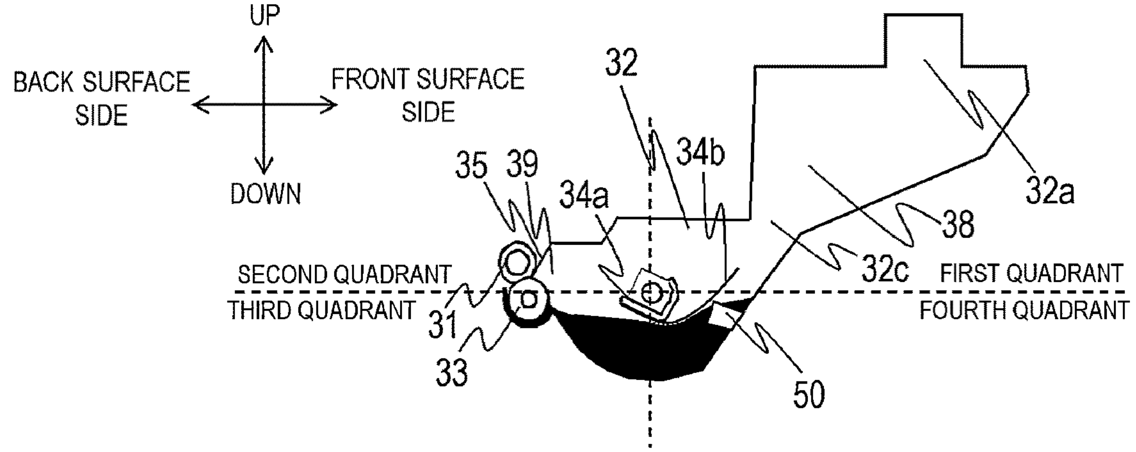
FIGS. 10A and 10B are sectional views of a process cartridge according to a third embodiment.
Figure 10B:
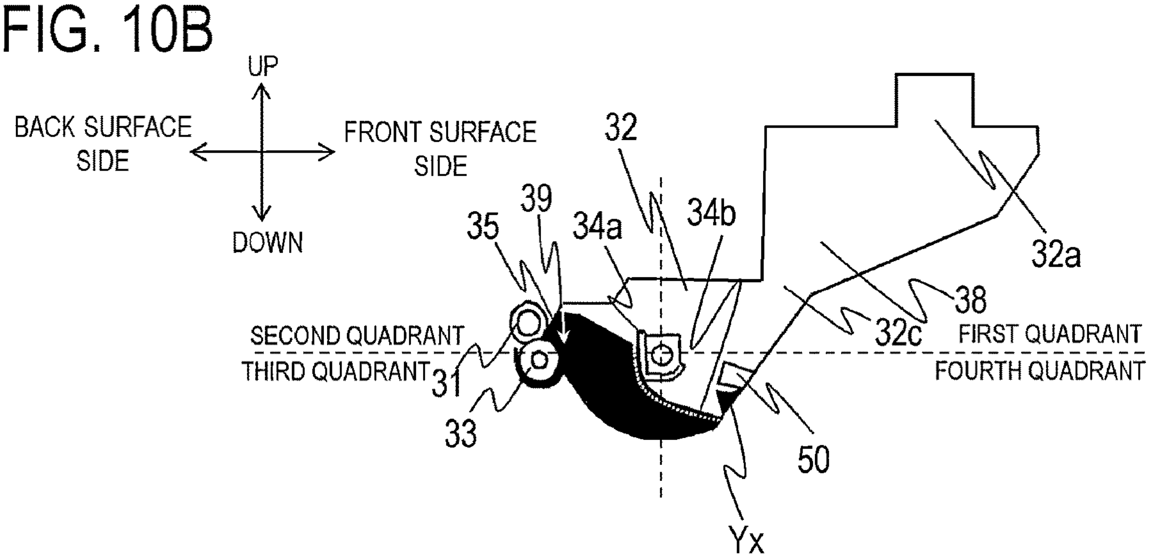
Figure 11A:
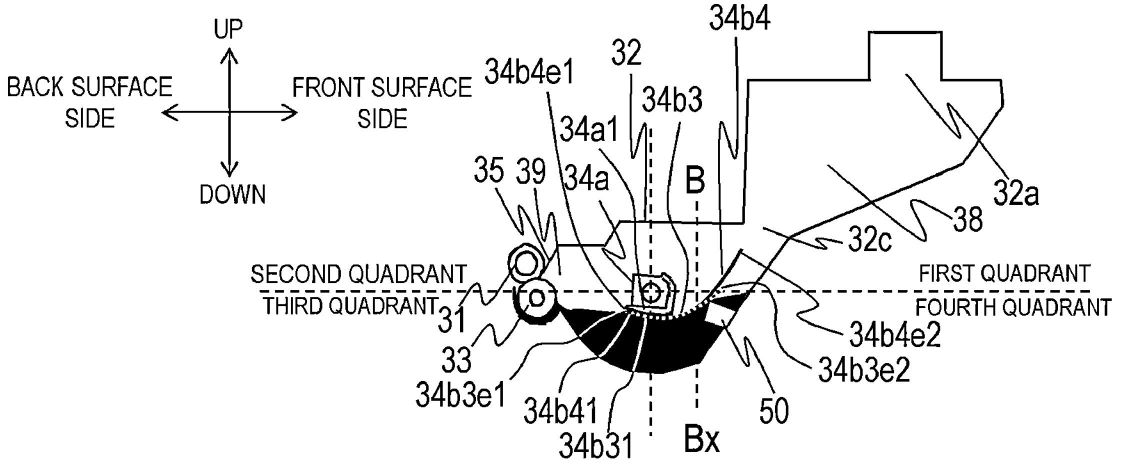
FIGS. 11A and 11B are sectional views of the process cartridge according to the third embodiment.
Figure 11B:
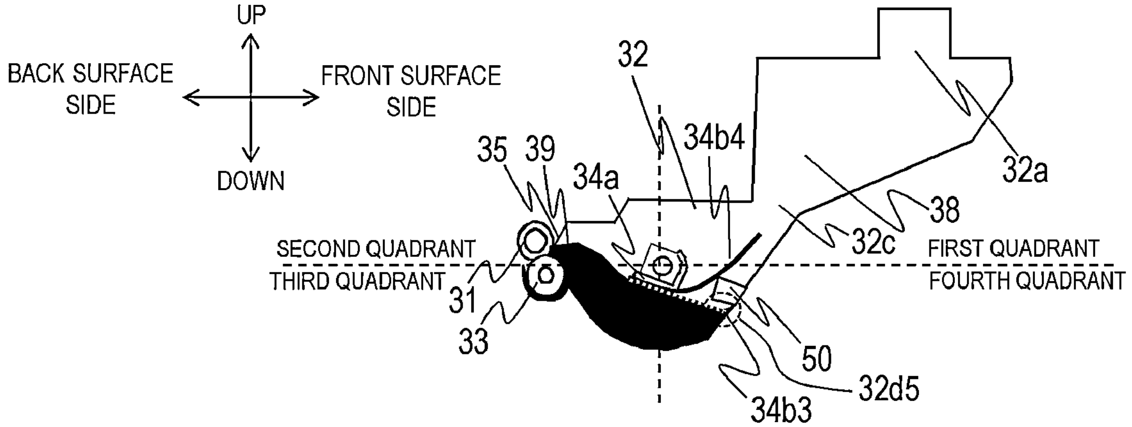

An image forming apparatus according to a third embodiment will be explained using FIGS. 10A, 10B, 11A, and 11B. Although the two vane portions **34*b*1 and 34*b*2 have mutually the same shape and material in the second embodiment, the present invention is not limited thereto. In the present embodiment, a preferred configuration in a case where a toner remaining amount sensor (developer remaining amount detection portion) 50 which is an optical detecting unit for optically detecting the remaining amount inside a developer container 32 is installed will be explained as a configuration of the developer container 32. FIGS. 10A and 10B are schematic sectional views of a developer container 32 in a comparative example in which a toner remaining amount detection sensor 50 is provided in a configuration in which a stirring member 34 includes a single vane portion 34*b* similarly to the first embodiment. FIGS. 11A and 11B are schematic sectional views of a developer container 32 according to the third embodiment in which the toner remaining amount detection sensor 50 is provided in a configuration in which a stirring member 34 includes two vane portions 34*b*3 and 34*b*4** similarly to the second embodiment.

Note that the two vane portions **34*b*3 and 34*b*4 in the third embodiment are attached to one attachment surface of a stirring shaft 34*a* such that the vane portions 34*b*3 and 34*b*4 partially overlap each other, unlike the two vane portions 34*b*1 and 34*b*2 in the second embodiment. Specifically, the stirring shaft 34*a* includes an attachment surface 34*al* that extends in a direction of a rotation axis, and the vane portion (fourth sheet) 34*b*4 includes an attachment portion 34*b*41 (fourth attachment portion) that comes into contact with the attachment surface 34*a*1. The vane portion 34*b*4 has one end portion (seventh end portion) 34*b*4*e*1 in a direction perpendicularly intersecting the rotation axis fixed to the stirring shaft 34*a* as a part of the attachment portion 34*b*41 and the other end portion (eighth end portion) 34*b*4*e*2 capable of coming into contact with an inner wall surface of a toner accommodating chamber 32*d*. Also, the vane portion (third sheet) 34*b*3 includes an attachment portion 34*b*31 (third attachment portion) that is attached to the attachment portion 34*b*41 of the vane portion 34*b*4 in an overlapping manner. The vane portion 34*b*3 has one end portion (fifth end portion) 34*b*3*e*1 in the direction perpendicularly intersecting the rotation axis fixed to the stirring shaft 34*a* as a part of the attachment portion 34*b*31 and the other end portion (sixth end portion) 34*b*3*e*2 capable of coming into contact with the inner wall surface of the toner accommodating chamber 32*d***.

The short-side length of the vane portion **34*b* (the length of the vane portion 34*b* from a fixed end fixed to the stirring shaft 34*a* to a free end on the opposite side) is typically set to a length needed to enter the developing opening portion 39 and supply the toner inside the developer container 32 to the developing opening portion 39. However, the vane portion 34*b* may be brought into a state where the vane portion 34*b* gets caught on the toner remaining amount detection sensor 50 as illustrated in FIG. 10A. Once the rotation further progresses, the distal end of the vane portion 34*b* may not be able to crawl into a lower portion of the toner remaining amount detection sensor 50 although the distal end passes (climbs over) the toner remaining amount detection sensor 50 as illustrated in FIG. 10B, and the toner (Yx in the drawing) below the toner remaining amount detection sensor 50** may not be stirred.

In such a case, the short-side length of the first vane portion **34*b*3 (dotted line) is shortened to a level at which the first vane portion 34*b*3 can crawl into the part below the toner remaining amount detection sensor 50 as illustrated in FIG. 11**A, for example.

The length (third length) of the vane portion **34*b*3 from the attachment portion 34*b*31 to the distal end (third end portion) that comes into contact with the inner wall surface of the toner accommodating chamber 32*d* is shorter than the length (fourth length) thereof from the attachment portion 34*b*41 of the vane portion 34*b*4** to the distal end (fourth end portion). Here, the above length of each vane portion is the length of the vane portion in the short-side direction that perpendicularly intersects the longitudinal direction, and is a length when the distance from the attachment portion to the distal end is measured in the direction in which the vane portion extends when seen in the direction of the rotation axis.

The toner remaining amount detection sensor 50 is located in a quadrant below a quadrant where the introduction port **32*c* is located in the above coordinate system, and is provided to project from the inner wall of the toner accommodating chamber 32*d*. The control portion 90 controls rotation of the stirring shaft 34***a* such that an end portion of the vane portion 34*b*3 is located in the quadrant where the toner remaining amount detection sensor 50 is located in the above coordinate system. The length from the attachment portion 34*b*31 to the distal end (third end portion) of the vane portion 34*b*3 is a length that allows the distal end of the vane portion 34*b*3 to enter a recessed portion 32*d*5 (the broken line circle region in FIG. 11B) formed between the lower end of the toner remaining amount detection sensor 50 and the inner wall surface of the toner accommodating chamber 32*d*.

After the first vane portion 34*b*3 scrapes off the toner below the toner remaining amount detection sensor 50 and feeds the toner to the bottom portion of the developer container 32, the second vane portion 34*b*4 stirs the toner at the bottom portion. Such a configuration enables stirring of the entire toner and supply of the toner to the developing opening portion 39.

In this manner, each of the plurality of vane portions 34*b* may have a different role. It is possible to obtain effects similar to those described in the first embodiment by adjusting the phase such that the replenishment of the new toner is executed when both the distal ends of the vane portions are located far from the introduction port 32*c*. A different number, shape, and material of the vane portions from those in the third embodiment may be appropriately selected depending on a configuration of the developer container 32.

Other Effects of Third Embodiment

Other effects obtained in the third embodiment will be explained. An effect that accuracy of detecting the amount of replenished toner by the toner remaining amount detection sensor 50 is improved can also be obtained in addition to an improvement in image failure achieved by quickly and uniformly mixing the old toner in the developer container 32 and the new toner after the replenishment of the new toner from the toner pack 40.

Figure 12A:
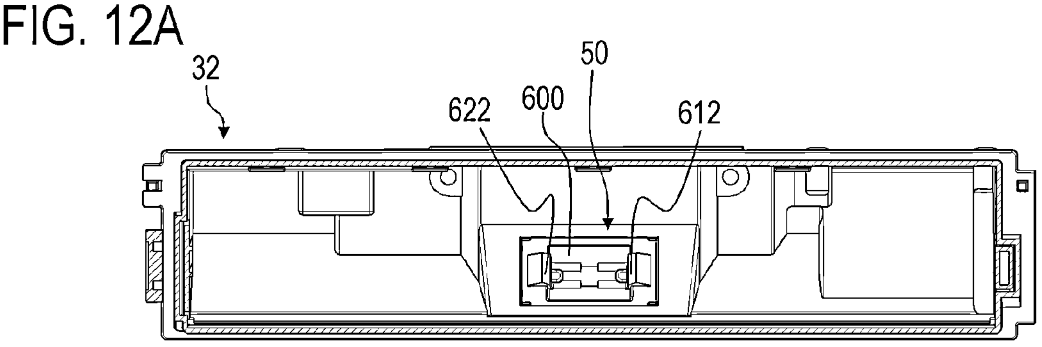
FIGS. 12A to 12C are diagrams illustrating a toner remaining amount detection sensor 50 according to the third embodiment.

The toner remaining amount detection sensor 50 for detecting the toner remaining amount is configured of a light emitting portion 50*a*, a light receiving portion 50*b*, and a light guide 600 that is for guiding light from the light emitting portion 50*a*. FIG. 12A is a sectional view when the plane B-Bx is seen from the back surface side of the developer container 32 according to the third embodiment illustrated in FIGS. 11A and 11B. The light guide 600 is installed at a center portion of the developer container 32 in the longitudinal direction. In the present embodiment, the light guide 600 made of polystyrene that is amorphous and has a high degree of transparency is used.

A CPU 91 of the control portion 90 determines whether or not the light receiving portion (light receiving element) 50*b* has received light from the light emitting portion (light emitting element) 50*a* on the basis of a level of a voltage input to the toner remaining amount detection sensor 50. Then, the CPU 91 calculates a length of time during which the toner remaining amount detection sensor 50 has detected light when the stirring member 34 is caused to stir the toner in the developer container 32 for a specific period of time. A ROM 93 stores a toner remaining amount determination threshold value for determining the toner remaining amount from the light detection time of the toner remaining amount detection sensor 50 as a table 96 in advance. The CPU 91 calculates (predicts) the toner remaining amount in the developer container 32 on the basis of the light detection time of the toner remaining amount detection sensor 50 and the threshold value stored in the table 96.

Toner Remaining Amount Detection Method

Figure 12B:
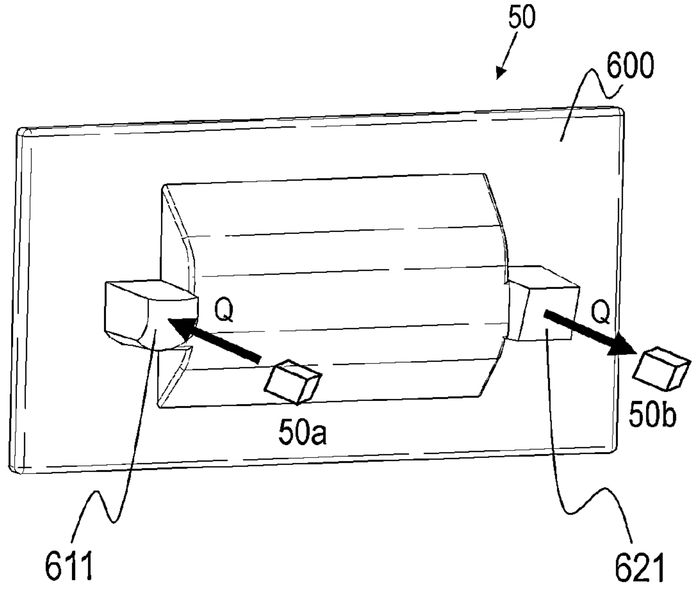
Figure 12C:
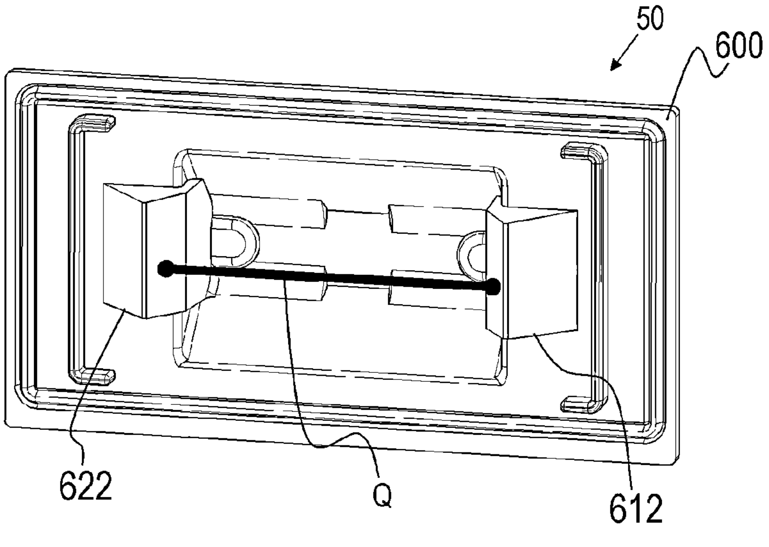
Figure 13A:
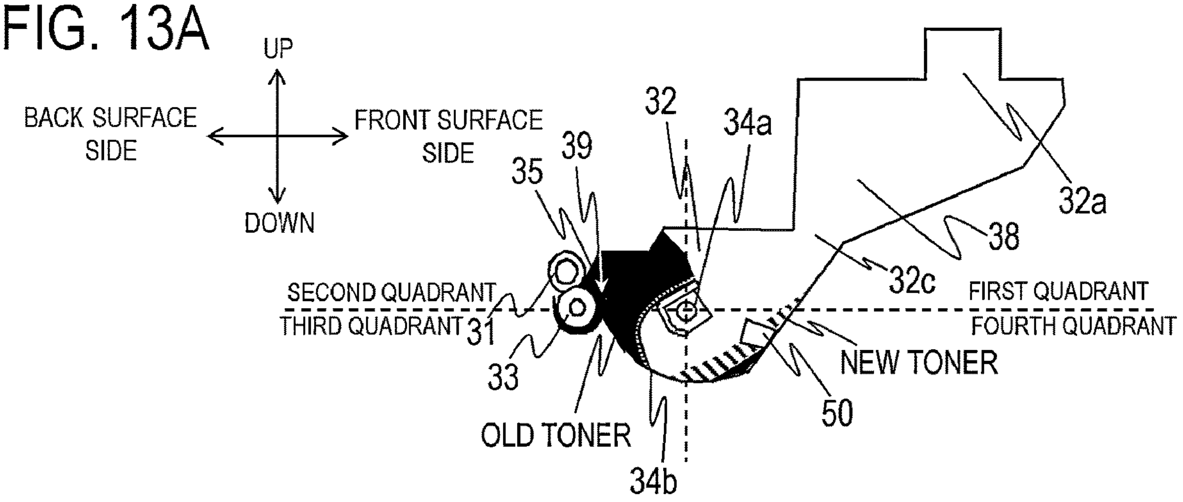
FIGS. 13A to 13D are diagrams illustrating a phase of the stirring member 34 at the time of replenishment and toner mixed states according to the third embodiment.
Figure 13B:
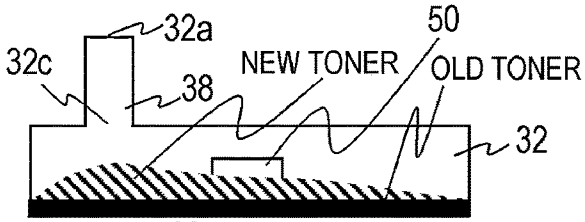
Figure 13C:
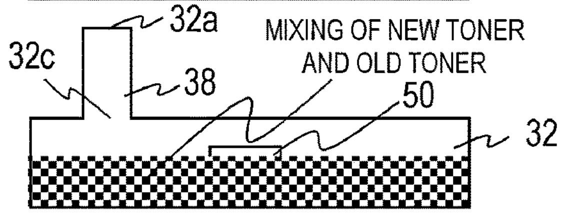
Figure 13D:
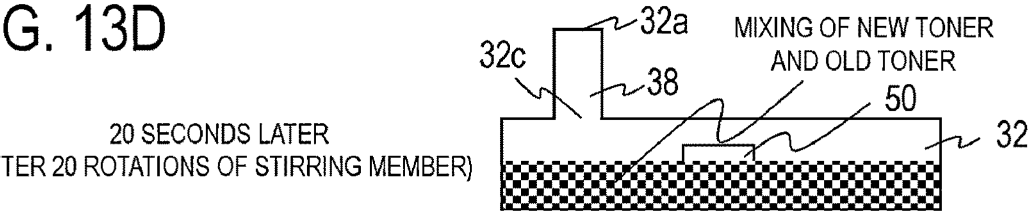
Figure 14A:
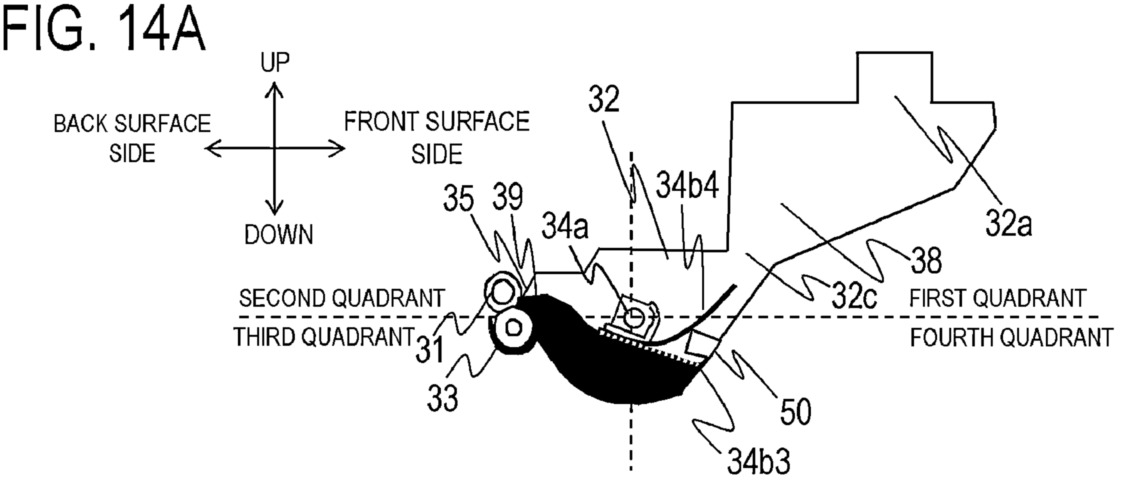
FIGS. 14A to 14D are diagrams illustrating a phase of the stirring member 34 at the time of replenishment and toner mixed states according to the third embodiment.
Figure 14B:
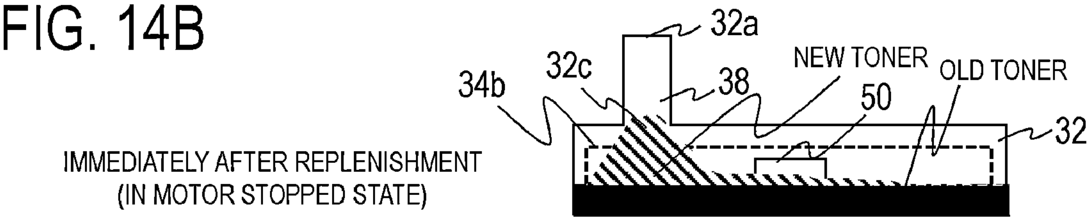
Figure 14C:
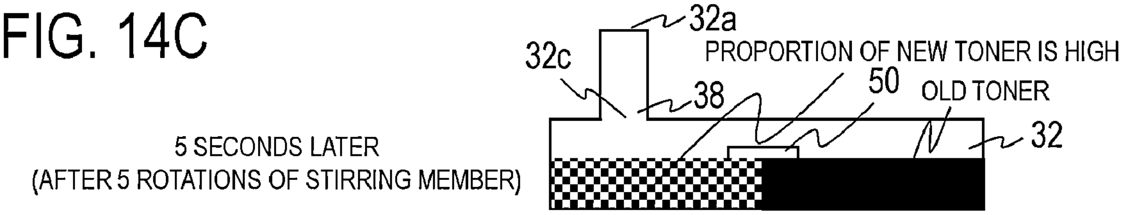
Figure 14D:
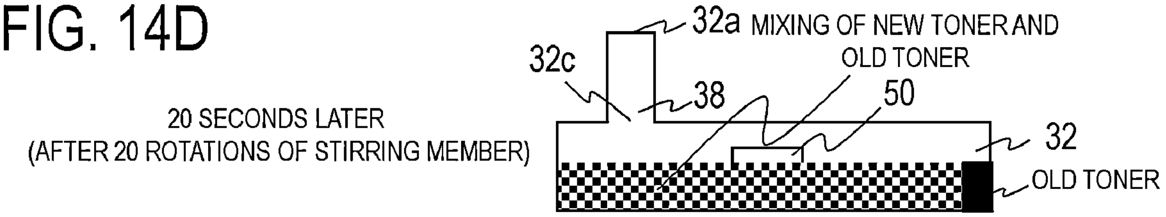

FIGS. 12B and 12C are perspective views of the light guide 600. A toner amount detection method performed by the toner remaining amount detection sensor 50 will be explained using the drawings. FIG. 12B is a diagram seen from the outside of the developer container 32, in which the sensor including the light emitting portion 50*a* and the light receiving portion 50*b* is attached. Light from the light emitting portion 50*a* is taken from a light entering portion 611, and light passing through the inside of the developer container 32 and exiting a light exiting portion 621 is received by the light receiving portion 50*b*. FIG. 12C is a diagram seen from the inside of the developer container 32, in which light taken from the light entering portion 611 is reflected by surfaces 612 and 622 along an optical path Q and is caused to go out to the light exiting portion 621.

The optical path Q is blocked by the toner conveyed by the stirring member 34 when the stirring member 34 rotates once. The time during which the light is blocked, that is, the time during which the light receiving portion 50*b* does not detect the light from the light emitting portion 50*a* changes depending on the toner remaining amount.

In other words, when the toner remaining amount is large, the optical path Q is likely to be blocked by the toner, the time during which the light receiving portion 50*b* receives light thus becomes short, and intensity of received light that the light receiving portion 50*b* receives becomes low.

On the other hand, when the toner remaining amount is small, the time during which the light receiving portion 50*b* receives light becomes long, and intensity of received light that the light receiving portion 50*b* receives becomes high. Therefore, the CPU 91 of the control portion 90 can determine the toner remaining amount level on the basis of the light receiving time and the intensity of the received light of the light receiving portion 50*b*. The toner remaining amount determination threshold value to determine the toner remaining amount from the light receiving time of the light receiving portion 50*b* is stored as a table, for example, in the ROM 93 in advance.

Detection of Toner Remaining Amount when New Toner is Replenished from Toner Pack 40

Here, the toner remaining amount detection accuracy may be degraded depending on a mixed state of the replenished new toner and the old toner in the developer container 32 when the toner remaining amount is detected when the new toner is replenished from the toner pack 40.

As described above, charge performance of the new toner is higher than that of the old toner. On the other hand, the surfaces 612 and 622 of the light guide 600 on the inner side of the developer container 32 are charged through repeated rubbing with the toner and the stirring member 34. Therefore, since a toner with higher charge performance is more likely to adhere to the surfaces 612 and 622 of the light guide 600, a state where the surfaces 612 and 622 of the light guide 600 are constantly blocked from light with the toner is achieved, and the toner remaining amount detection accuracy is likely to be degraded.

Therefore, in a case where the mixed state of the old toner in the developer container 32 and the new toner after the replenishment is not uniform, the toner is likely to adhere to the surfaces 612 and 622 of the light guide 600 due to a part where a large amount of new toner is present in a localized manner, and the remaining amount detection accuracy may be degraded.

On the other hand, in a case where the mixed state of the old toner in the developer container 32 and the new toner after the replenishment becomes uniform, there is no part where a large amount of toner is present in a localized manner, and it is possible to achieve a state where the concentration of the new product toner with respect to the total amount of toner is low as a whole. Therefore, it is possible to curb adhesion of the new product toner to the surfaces 612 and 622 of the light guide 600.

In other words, if the state where the new toner after the replenishment is uniformly mixed with the old toner in the developer container is achieved, then it is possible to curb degradation of the remaining amount detection accuracy.

Mixed State of New and Old Toners After Replenishment in Present Embodiment

FIGS. 13A to 13D and 14A to 14D represent how the new toner (hatched portion) replenished from the toner pack 40 and the old toner (solid portion) in the developer container 32 are like according to the present embodiment in an image seen from a section side and an image seen from the front surface side. These represent actual entrance of the new toner confirmed from the front surface side by preparing a transparent developer container and using a yellow toner as the new toner of the toner pack 40 and a black toner as the old toner in the transparent developer container 32.

The expression "immediately after the replenishment" described here means a timing before the stirring member 34 rotates. Also, the image view seen from the front surface side also shows states immediately after the replenishment, 5 seconds later (after 5 rotations of the stirring member 34), and 20 seconds later (after 20 rotations of the stirring member 34) after the stirring member 34 starts to rotate. The solid portion indicates a part where the proportion of the old toner is high, the hatched portion indicates a part where the proportion of the new toner is high, and the dot portion indicates a part where the new toner and the old toner are satisfactorily mixed.

FIGS. 13A to 13D illustrate a case where replenishment is performed when the position of the distal end of the vane portion 34*b* at the time of replenishment is at the furthest location from the introduction port 32*c*, and FIGS. 14A to 14D illustrate a case where replenishment is performed when the position of the distal end of the vane portion 34*b* at the time of replenishment is located on the side of the introduction port 32*c*.

In a case where replenishment is performed when the position of the distal end of the vane portion 34*b* at the time of replenishment is at the furthest location from the introduction port 32*c* as illustrated in FIGS. 13A to 13D, the new toner is ejected to a sufficiently broad space and spreads like a landslide in the longitudinal direction as well while dropping to the bottom surface in the developer container 32.

However, on the other hand, in a case where replenishment is performed when the position of the distal end of the vane portion 34*b* at the time of replenishment is located on the side of the introduction port 32*c* as illustrated in FIGS. 14A to 14D, the new toner is ejected to a narrow space once at a time, and the new toner thus remains at the part corresponding to the projecting portion 38 immediately below the replenishing port 32*a*.

Once the stirring member 34 is driven, it takes time of 20 seconds (20 rotations of the stirring member 34) or more until the new toner reaches the entire longitudinal region even if the stirring member 34 is driven in a state where the replenishment is performed when the position of the distal end of the vane portion 34*b* is located on the side of the introduction port 32*c* and the new toner remains near the introduction port 32*c* in the longitudinal direction inside the developer container 32 as illustrated in FIGS. 14A to 14D.

In other words, in the case of FIGS. 14A to 14D, the state where the new toner remains on the side of the introduction port 32*c* is not solved before the timing of 5 seconds later (5 rotations of the stirring member 34), and a part where the proportion of the new toner is high is present (wave line portion). In this manner, a state where the part in which the proportion of the new toner is high is present at the center portion where the toner remaining amount detection sensor 50 is located is achieved, the new toner adheres to the surfaces 612 and 622 of the light guide 600 on the inner side of the developer container 32, and the remaining amount detection accuracy is degraded. It is necessary to detect the remaining amount after elapse of 20 seconds or more which are needed for the new toner to reach the entire longitudinal region, and a user is made to wait until a state where the image forming apparatus 1 can be used is achieved after the new toner is replenished.

Thus, according to the present embodiment, it is possible to perform the replenishment when the position of the distal end of the vane portion 34*b* is at the furthest location from the introduction port 32*c* as illustrated in FIGS. 13A to 13D. Since the new toner instantaneously enters the space in a spreading manner in the longitudinal direction inside the developer container 32 at the timing immediately after the replenishment, the new toner and the old toner are uniformized in about 5 seconds (5 rotations of the stirring member 34). It is possible to curb the phenomenon that the new toner adheres to the light guide 600 even at the timing of 5 seconds, the remaining amount detection accuracy is unlikely to be degraded, and it is thus possible to shorten the time during which the user is made to wait after the replenishment.

Note that although only the configuration in which the vane portion 34*b* is installed in the stirring shaft 34*a* of the stirring member 34 has been illustrated as the configuration illustrated in the present embodiment, the present invention is not limited thereto.

For example, there is a configuration in which a cleaning member is installed at the center portion in the longitudinal direction in order to clean the toner remaining amount detection sensor 50. The cleaning member that is present only at the center portion in the longitudinal direction does not significantly block the space into which the new toner is ejected at the time of replenishment of the toner. Therefore, even with the configuration including the cleaning member, the new toner of the toner pack 40 is ejected to a sufficiently broad space at the time of the replenishment and enters the developer container 32 in a spreading manner in the longitudinal direction as long as the distal end of the vane portion 34*b* is located to be far from the introduction port 32*c* before the replenishment, and it is thus possible to exhibit the same effects as the aforementioned effects.

Also, there is a configuration in which a T seal for covering the developing opening portion 39 and sealing the toner in the toner accommodating chamber rotates along with the stirring shaft 34*a* to prevent the toner from leaking during logistics of an unused image forming apparatus 1. A T seal obtained by laminating an easy-peel film made of multiplayer polystyrene on a PET sheet with a thickness of about 45 μm, for example, is used. As the easy peel film, AE300 manufactured by Sumika Plastech Co., Ltd., for example, can be used. The width of the T seal in the longitudinal direction is wider than the developing opening portion 39, completely covers the developing opening portion 39 on the surface on the easy-peel side, and prevents the toner in the developer container 32 from leaking out to the side of the developing roller 31 and the supply roller 33 in the unused image forming apparatus 1.

Also, the T seal is attached to the stirring shaft 34*a* of the stirring member 34 and is peeled off from the developing opening portion 39 in a winding-up manner through rotation of the stirring shaft 34*a* when a power source of the image forming apparatus 1 is turned on for the first time at a user's place and the motor starts to rotate. There is a configuration in which the T seal rotates along with the vane portion 34*b* while following the stirring shaft 34*a* of the stirring member 34 as it is.

However, since the T seal is thinner than the vane portion 34*b* and has a lower elastic force, the T seal is not adapted to stir the toner or feed the toner to the developing opening portion 39 unlike the vane portion 34*b*. Even if a distal end of the T seal is located at the introduction port 32*c* and the T seal is present in the path through which the new toner enters the developer container 32 at the time of replenishment of the new toner, the T seal falls down due to momentum of the dropping of the new toner and does not interrupt the entrance of the new toner. In other words, even if the distal end of the T seal is located at the introduction port 32*c*, the new toner can enter the developer container 32 in a spreading manner over the entire region in the longitudinal direction. In other words, even with the configuration in which the T seal rotates along with the stirring shaft 34*a*, the new toner of the toner pack 40 is ejected to a sufficiently broad space at the time of replenishment and enters the developer container 32 in a spreading manner in the longitudinal direction as long as the distal end of the vane portion 34*b* is located far from the introduction port 32*c* before the replenishment, and it is thus possible to exhibit the same effects as the aforementioned effects.

Although members with various functions may be installed at the stirring member 34, it is possible to exhibit the same effects as the aforementioned effects by locating the distal end of the member having a high elastic force and having a function of stirring the toner and feeding the toner to the developing opening portion 39 like the vane portion 34*b* far from the introduction port 32*c* at the time of replenishment.

A fourth embodiment will be explained. Note that description of configurations that are common to those in the first to third embodiments will be omitted.

An image forming apparatus according to the present embodiment includes a locking mechanism (not illustrated) that performs switching between a state where a toner pack 40 can be rotated and a state where the toner pack 40 cannot be rotated. In this manner, it is possible to control whether or not it is possible to actually replenish the toner (whether or not to allow the replenishment) even when the toner pack 40 is inserted.

As a configuration of the locking mechanism, a configuration that is known in the related art may be appropriately employed. For example, a configuration in which a restricted portion is provided on the side of the toner pack 40 and a restricting member (locking member) that can be at a locking position (in a restricted state where toner replenishment is not allowed) at which the restricted portion is restricted and an unlock position (a non-restricted state where toner replenishment is allowed) on the side of the apparatus main body may be employed. The restricting member may be configured to be able to go forward and backward on a movement trajectory that the restricted portion of the toner pack 40 follows at the time of rotation of the toner pack 40. A configuration in which rotation (lock releasing operation) of the toner pack 40 to cause a shutter member 41 to move to an open position is restricted by the restricting member restricting movement of the restricted portion unless the restricting member evacuates from the movement trajectory of the restricted portion after the toner pack 40 is coupled to the mounting portion 57 may be adopted. The restricting member may be configured to be located on the movement trajectory of the restricted portion due to a bias force of a spring, for example, and may be configured to be able to move in a direction against the bias force of the biasing member and evacuate from the movement trajectory with a solenoid attraction force, for example.

Control Block Diagram

Figure 17:
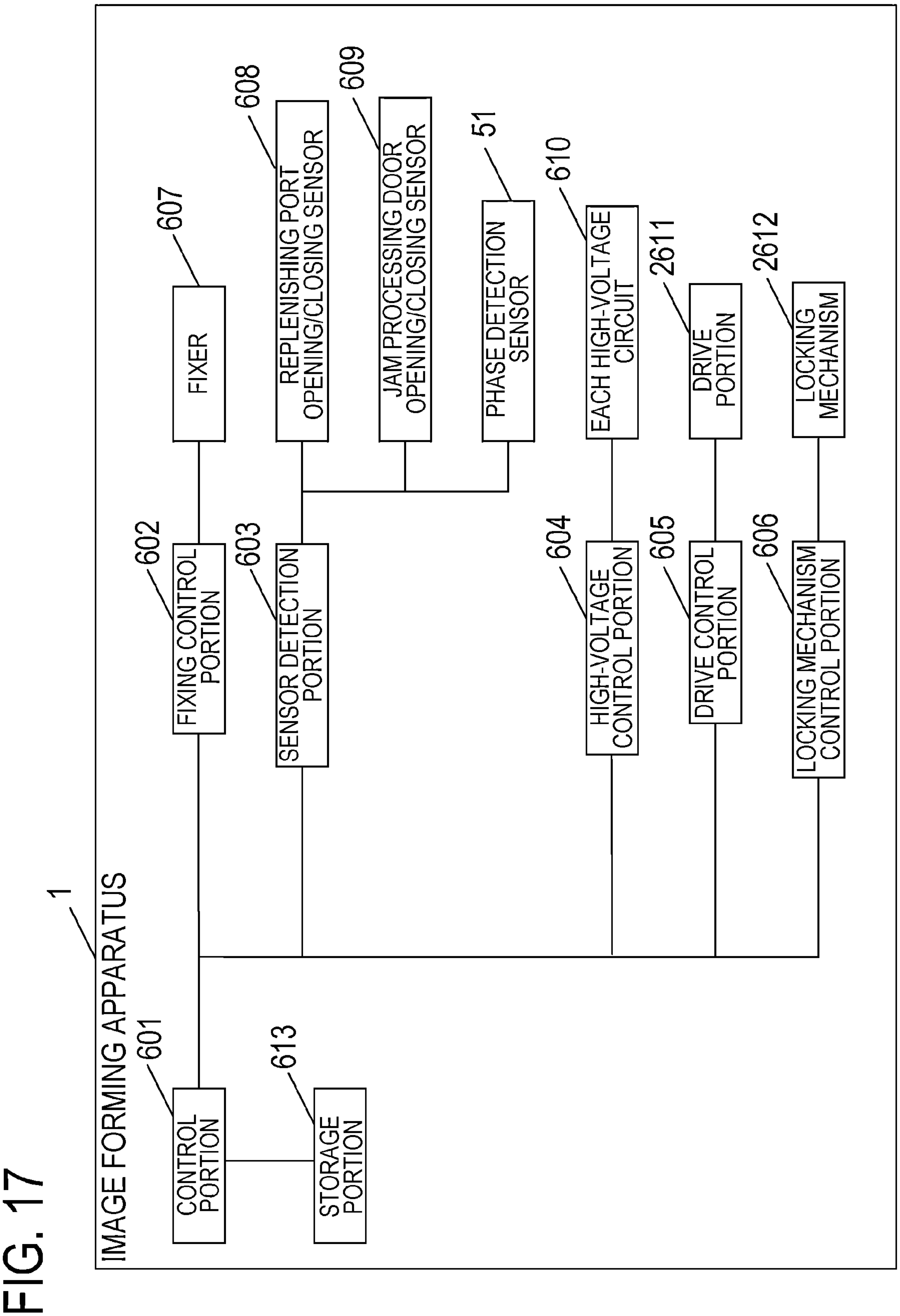
FIG. 17 is a control block diagram according to a fourth embodiment.

FIG. 17 is a control block diagram in the present embodiment. A control portion 601 that controls the image forming apparatus includes various control portions such as a drive control portion 605, a high-voltage control portion 604, a fixing control portion 602, and a locking mechanism control portion 606. The drive control portion 605 that drives and rotates a drive portion 2611, the high-voltage control portion 604 that controls each high-voltage circuit 610, and the fixing control portion 602 that controls a fixer 607 are used to perform the aforementioned print operation.

Also, the control portion 601 acquires detection information of various sensors such as a replenishing port opening/closing sensor 608, a jam processing door opening/closing sensor 609, and a phase detection sensor 51 via a sensor detection portion 603. The replenishing port opening/closing sensor (opening/closing detecting unit) 608 detects an opening/closing state of the opening/closing member (whether it is in an open state or a closed state). The jam processing door opening/closing sensor (opening/closing detecting unit) 609 detects an opening/closing state of a jam processing door 291 (see FIG. 1A) that is opened by a user to access a conveyance path in order to remove a sheet stopping inside the image forming apparatus due to jam during printing. The jam processing door 291 is an opening/closing member that configures a part of an exterior of the apparatus main body on the back surface side of a main body frame member 290 and is configured to be able to be located at an open position at which the inside of the main body frame member 290, particularly, the conveyance path of the recording material is exposed to the outside and a closed position at which it is not exposed, around an opening/closing shaft 292 at a lower end. Configurations that are known in the related art may be appropriately employed as the replenishing port opening/closing sensor 608 and the jam processing door opening/closing sensor 609, and the replenishing port opening/closing sensor 608 and the jam processing door opening/closing sensor 609 may be configured of pressure-sensitive switches or magnetic sensors, for example. The configuration of the phase detection sensor 51 is as described above.

Also, the locking mechanism control portion 606 controls a locking mechanism (restriction mechanism) 2612 that switches whether or not the toner pack can be rotated in the state at the time of replenishment of the toner. The locking mechanism control portion 606 can control a locked state and an unlocked state of the locking mechanism 2612 by controlling power distribution to the solenoid in a case where the locking mechanism 2612 has a configuration as described above, for example. Note that the locking mechanism 2612 is not an essential configuration, and the image forming apparatus 1 according to the present embodiment may have a configuration that does not include the locking mechanism 2612.

Furthermore, the control portion 601 includes a storage portion 613 that stores phase information that is a result of determination in the aforementioned phase determination process.

Phase Determination Process

In a phase determination process P4 in the present embodiment, a pin 34*d* provided at a gear 34*c* of the stirring member 34 and the phase detection sensor 51 determine a phase of the vane portion 34*b*. After the phase determination, the adjustment amount by which adjustment is to be made is saved in the storage portion 613 in a phase adjustment process P5. In a case where it is not necessary to perform adjustment as a result of performing the phase determination, the adjustment amount by which the adjustment is to be made is not saved in the storage portion 613, or information indicating that there is no adjustment amount is saved in the storage portion 613. In other words, since the phase adjustment process is not needed in a case where the rotation phase of the vane portion 34*b* detected in advance before the phase adjustment process is executed is included in a predetermined phase range in which the vane portion 34*b* is to be stopped in the phase adjustment process, the information is saved.

Flowchart of Phase Adjustment Process

Figure 18:
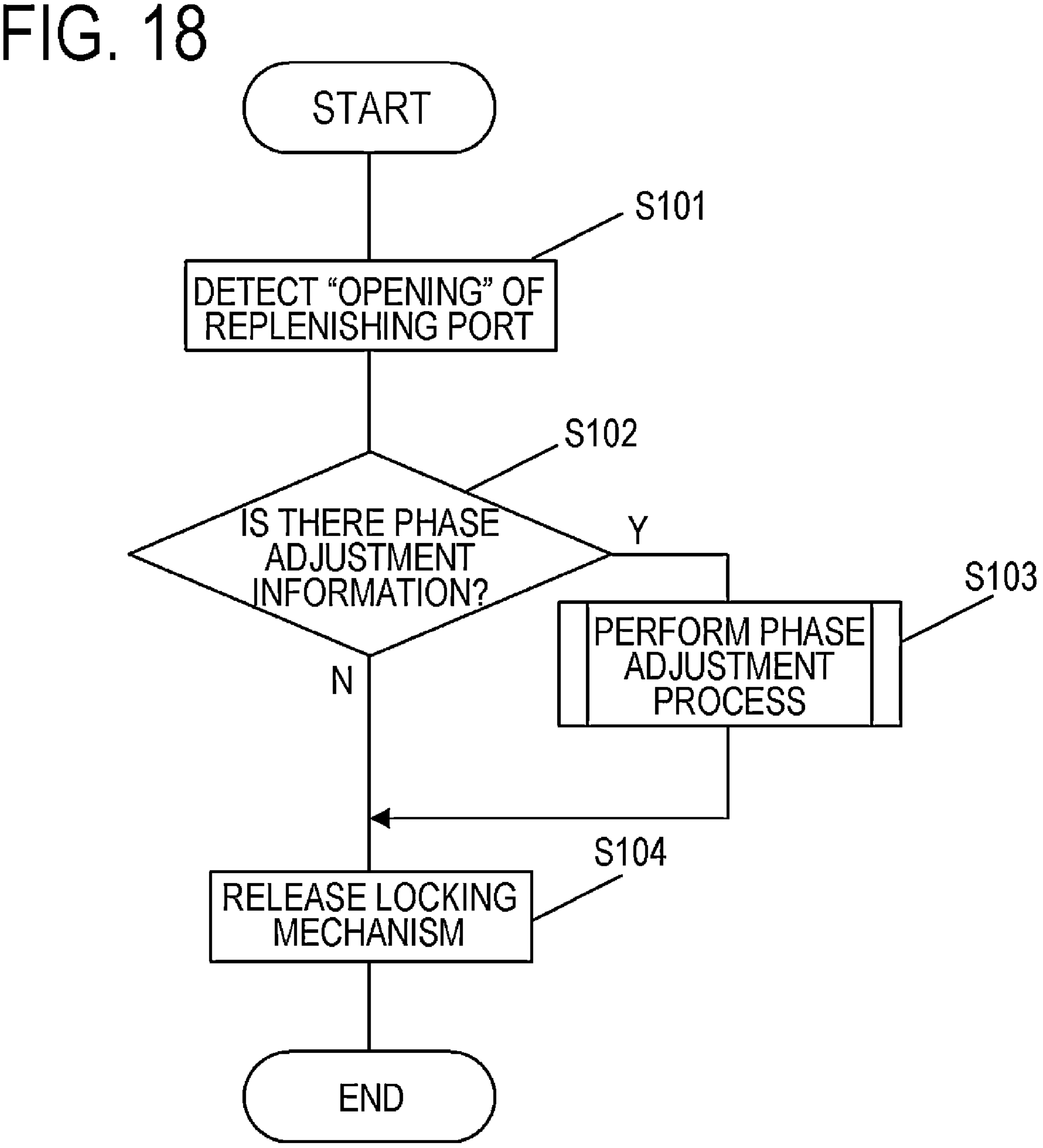
FIG. 18 is a flowchart of a phase adjustment process according to the fourth embodiment.

FIG. 18 illustrates a flowchart of the phase adjustment process in the present embodiment. The drive control portion 605 drives the drive portion 2611 at a timing at which a state of the replenishing port opening/closing sensor 608 is brought from the closed state to the open state (flowchart S101: at the timing when a situation in which the user tries to replenish the toner is detected) in a standby state (a state where printing can be performed and the image forming apparatus 1 is stopped) of the image forming apparatus 1. Specifically, the drive control portion 605 performs (S103) the phase adjustment process of controlling the drive portion 2611 such that the phase of the vane portion 34*b* is at the furthest location from the replenishing port 32*a*. After the phase adjustment process is completed, the locking mechanism 2612 is changed (S104) to a state where the toner can be replenished. In the phase adjustment process, the control portion 601 of the image forming apparatus 1 drives and stops the drive portion 2611 using the drive control portion 605 such that the position of the vane portion 34*b* is at the desired furthest location from the replenishing port 32*a*. However, in a case where there is no phase information to be adjusted (S102: in a case of N) as a result of the phase determination process P4, the locking mechanism 2612 is changed to the state where the toner can be replenished without performing the phase adjustment process.

Sequence of Phase Adjustment Process

Figure 19:
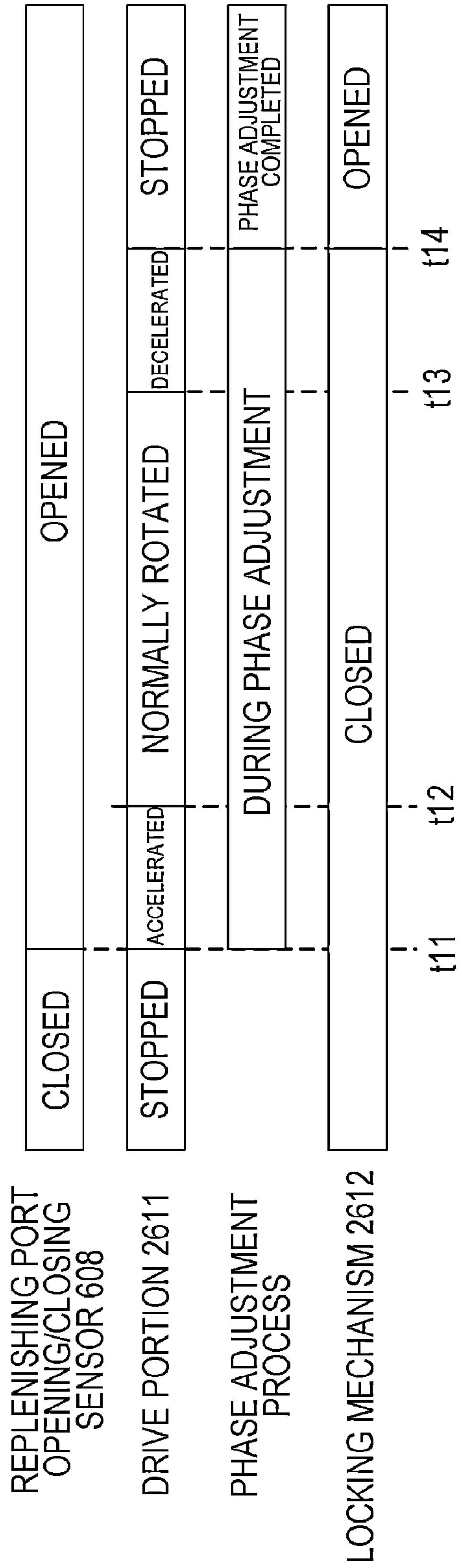
FIG. 19 is a sequence of the phase adjustment process according to the fourth embodiment.

FIG. 19 illustrates a sequence of the phase adjustment process in the present embodiment. FIG. 19 illustrates a sequence when the phase adjustment is performed, that is, a case where the phase information is stored in the storage portion 613. Once a change of the replenishing port opening/closing sensor 608 from the closed state to the open state is detected, the control portion 601 controls the drive control portion 605 at the timing and starts to drive the drive portion 2611 (t11). The drive portion 2611 moves on to a normal rotation state after an accelerated state (t12), then moves on to a decelerated state (t13), and finally stops (t14). Note that the image forming apparatus in the present embodiment uses a brush motor as a motor serving as a drive source, it takes time until the motor completely stops rotating due to inertia even after a current stops, and it is thus desirable to adjust a stop command timing for the motor in consideration of the inertia. The drive portion 2611 is adapted to rotate the stirring member by the amount corresponding to the phase adjustment information stored in the storage portion 613 during a period from t11 to t14. The phase adjustment of the phase adjustment process is completed at the timing (t14) at which the drive portion 2611 stops, and the locking mechanism 2612 is changed to the open state. Note that although the operations of the drive portion 2611 correspond to three states, namely acceleration, normal rotation, and deceleration in the present embodiment, the normal rotation may not necessarily be performed in a case where the amount of adjustment based on the phase adjustment information stored in the storage portion 613 is small and the phase adjustment can be achieved only through acceleration and deceleration.

Effects and Advantages of Present Embodiment

According to the present embodiment, the phase adjustment process is performed as needed at the timing at which a situation where the user tries to replenish the toner is detected, and then the state is changed to the state where the toner can be replenished. It is thus possible to constantly keep the stop position of the stirring member at the timing when the replenishment is started in a state where the position of the distal end of the vane portion 34*b* is constantly at the furthest location from the replenishing port 32*a* to prepare for the replenishment. At this time, the old toner in the developer container 32 is pushed on the side of the developing opening portion 39, and a space is created on the bottom surface of the developer container 32. The new toner in the toner pack is ejected while spreading over the entire longitudinal region of the developer container 32 without clogging because of the space. If the rotation of the stirring member 34 is started thereafter, the mixed state of the new toner and the old toner is uniformized in a shorter period of time as compared with the configuration in the related art (the configuration in which phase control of the stirring member 34 is not performed).

As described above, it is possible to further reduce the probability of occurrence of an image failure by achieving the situation in which the new toner is uniformly present over the entire longitudinal region of the developer container 32 in a shorter period of time as compared with the related art.

Note that although in the present embodiment, the motor is stopped such that the distal end of the vane portion 34*b* is located in a third quadrant in an orthogonal coordinate system around the stirring shaft 34*a* in the phase adjustment process, the present invention is not limited thereto.

Although in the present embodiment, the case where the space into which the new toner of the toner pack 40 is ejected becomes the broadest occurs when the distal end of the vane portion 34*b* is stopped in the third quadrant, the same effects as the aforementioned effects can be exhibited if the new toner of the toner pack 40 is ejected to a sufficiently broad space and enters the developer container 32 in a spreading manner in the longitudinal direction even if the distal end is stopped in the second or fourth quadrant as illustrated in FIGS. 7A to 7D and 8A to 8D, for example.

Also, although the phase determination is performed after the post-rotation process P3 in the present embodiment, the time required for the entire process of a print job may be shortened by performing the phase determination in parallel with the post-rotation process P3.

Also, it is only necessary for the phase adjustment to be performed in time before the toner replenishment, and the present invention is not limited to the configuration explained in the present embodiment as long as it is possible to execute the phase adjustment when the user actually replenishes the toner. In other words, the configuration capable of detecting that the user is in a situation in which the user is preparing for the toner replenishment (or the likelihood thereof is high) is not limited to the detection of opening/closing of the opening/closing member 83 or the like or detection of attachment/detachment of the toner pack illustrated in the present embodiment, and a configuration in which the phase adjustment of the stirring member 34 may be started using the fact that the user has started to prepare for the toner replenishment as a trigger may be adopted.

Also, even with a configuration that does not include the locking mechanism 2612 in the present embodiment, it is possible to perform the toner replenishment in a state where occurrence of an image failure is further reduced when the phase is adjusted before the user performs the toner replenishment. Therefore, it is preferable to perform the phase adjustment process at the timing when the replenishing port opening/closing sensor detects opening of the replenishing port.

Fifth Embodiment

In a fifth embodiment, a phase adjustment process is performed in a configuration in which an image forming apparatus 1 does not include a storage portion. Furthermore, phase determination is performed together in the phase adjustment process. The other configurations of the image forming apparatus according to the fifth embodiment are the same as the configurations of the image forming apparatus described in the fourth embodiment, and explanation thereof will be omitted.

Flowchart of Phase Adjustment Process

Figure 20:
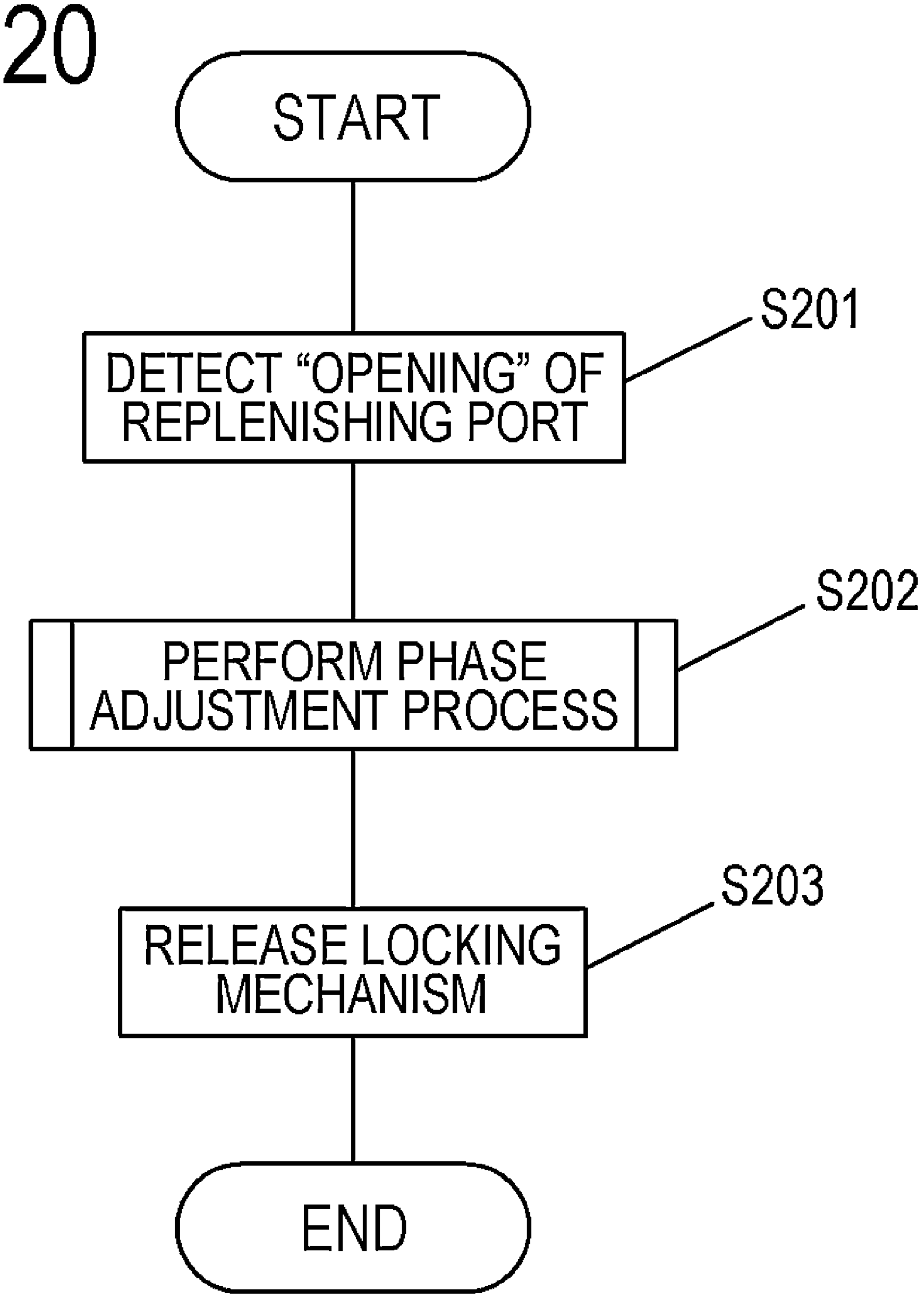
FIG. 20 is a flowchart of a phase adjustment process according to a fifth embodiment.

FIG. 20 illustrates a flowchart of the phase adjustment process in the present embodiment. A drive control portion 605 drives a drive portion 2611 at a timing when a state of a replenishing port opening/closing sensor 608 is changed from a closed state to an open state (flowchart S201: at the timing when a situation in which the user tries to replenish a toner is detected) in a standby state (in a state where print can be performed and the image forming apparatus is stopped) of the image forming apparatus 1. Specifically, the drive control portion 605 performs (S202) the phase adjustment process of controlling the drive portion 2611 such that a phase of a vane portion 34*b* is at the furthest location from a replenishing port 32*a*. After the phase adjustment process is completed, a locking mechanism 2612 is changed (S203) to a state where toner can be replenished. In the phase adjustment process, a control portion 601 of the image forming apparatus 1 drives and stops the drive portion 2611 using the drive control portion 605 such that the position of the vane portion 34*b* is at the furthest location from the desired replenishing port 32*a*.

Sequence of Phase Adjustment Process

Figure 21:
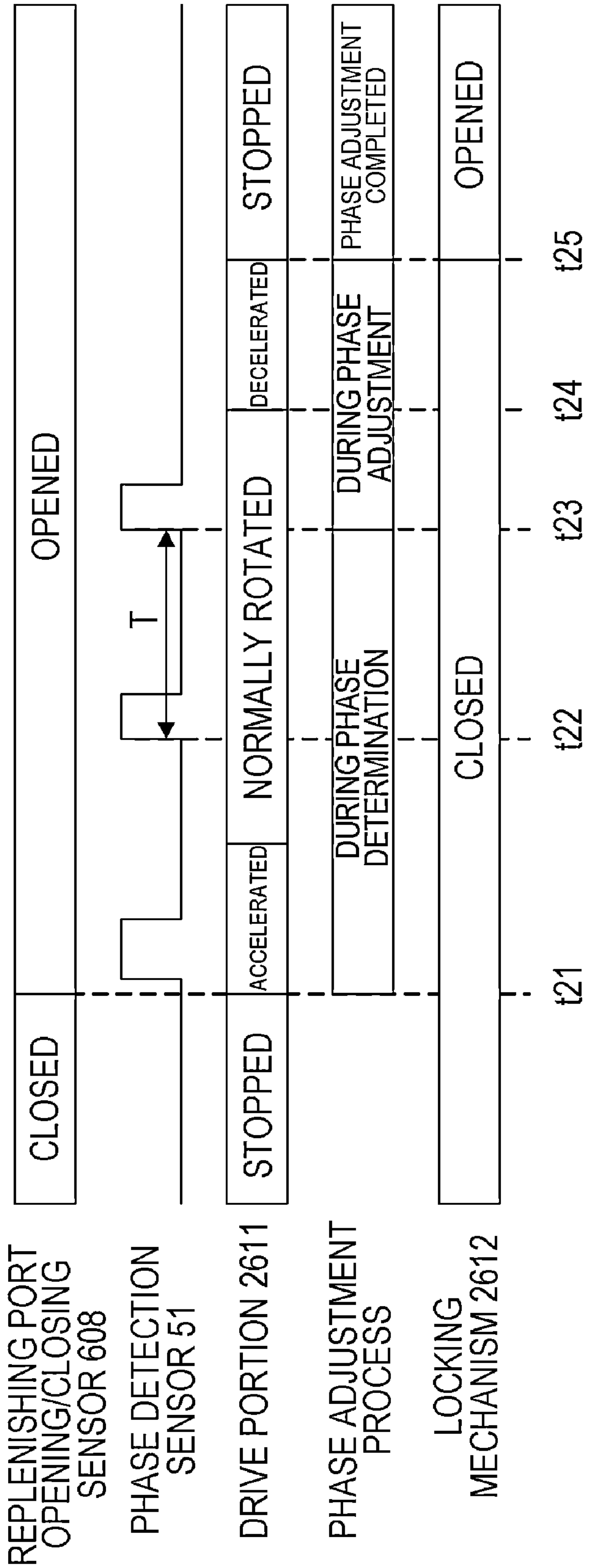
FIG. 21 is a sequence of the phase adjustment process according to the fifth embodiment.

FIG. 21 illustrates a sequence of the phase adjustment process in the present embodiment. Once the replenishing port opening/closing sensor 608 detects a change from the closed state to the open state, the control portion 601 controls the drive control portion 605 at that timing and starts to drive the drive portion 2611 (t21). At the timing of t21, the phase adjustment process transitions to a state where the phase is being determined, and the drive portion 2611 moves on to a normal rotation state after an accelerated state and detects a first change (here, a low→high edge) of the phase detection sensor 51 after the transition to the normal rotation state (t22). Thereafter, a change in the phase detection sensor 51 is detected again at the timing when a rotation cycle T of the stirring member elapses (t23). At the timing of t23, the phase adjustment process transitions from the phase determination state to a state where the phase is being adjusted, calculates backward a time necessary to stop the stirring member far from the replenishing port, continues normal rotation of the drive portion 2611 during the time, then transitions to a decelerated state (t24), and then stops (t25). The phase adjustment is completed at the timing t25, and the locking mechanism 2612 is changed to the open state.

Effects and Advantages of Present Embodiment

According to the present embodiment, the phase adjustment process is performed at the timing when the situation in which the user tries to replenish the toner is detected. It is thus possible to achieve a situation in which the new toner is uniformly present over the entire longitudinal range of the developer container 32 in a short period of time and to cause a transfer bias required in the longitudinal direction to be substantially constant. Therefore, it is possible to curb an image failure occurring due to non-uniformity of the new and old toners after the replenishment.

Also, even with the configuration that does not include the locking mechanism 2612 in the present embodiment, it is possible to replenish the toner in a state where occurrence of an image failure is further reduced when the phase is adjusted before the user performs the toner replenishment similarly to the first embodiment. Therefore, it is preferable to perform the phase adjustment process at the timing when the replenishing port opening/closing sensor detects opening of the replenishing port.

Sixth Embodiment

In a sixth embodiment, a phase adjustment process is performed in a case where an image forming apparatus 1 is not in a standby state. A control block configuration in the sixth embodiment is the same as that in the fourth embodiment and is similar to the configuration illustrated in FIG. 17. The other configurations of the image forming apparatus according to the sixth embodiment are the same as the configurations of the image forming apparatuses explained in the fourth and fifth embodiments, and explanation thereof will be omitted.

In order to achieve transition from a state where the image forming apparatus 1 is stopping but is not in a standby state to a standby state where it is possible to perform printing, the image forming apparatus 1 performs a process initialization operation of checking operations of each component including a drive portion. A trigger of performing the process initialization is a case where a user closes a jam processing door, that is, a jam processing door opening/closing sensor 609 detects closing of the door or a case where the jam processing door opening/closing sensor 609 detects closing when a power source of the image forming apparatus is turned on. Note that the image forming apparatus 1 that is not in the standby state is in a state where sheet jam in which a sheet is stopping in the machine in a state where the sheet cannot be continuously conveyed, breakdown, or the like has occurred and the image forming apparatus cannot be operated (that is, the drive portion cannot be driven), that is, it is not possible to perform the phase adjustment and the toner replenishment.

Flowchart of Phase Adjustment Process

Figure 22:
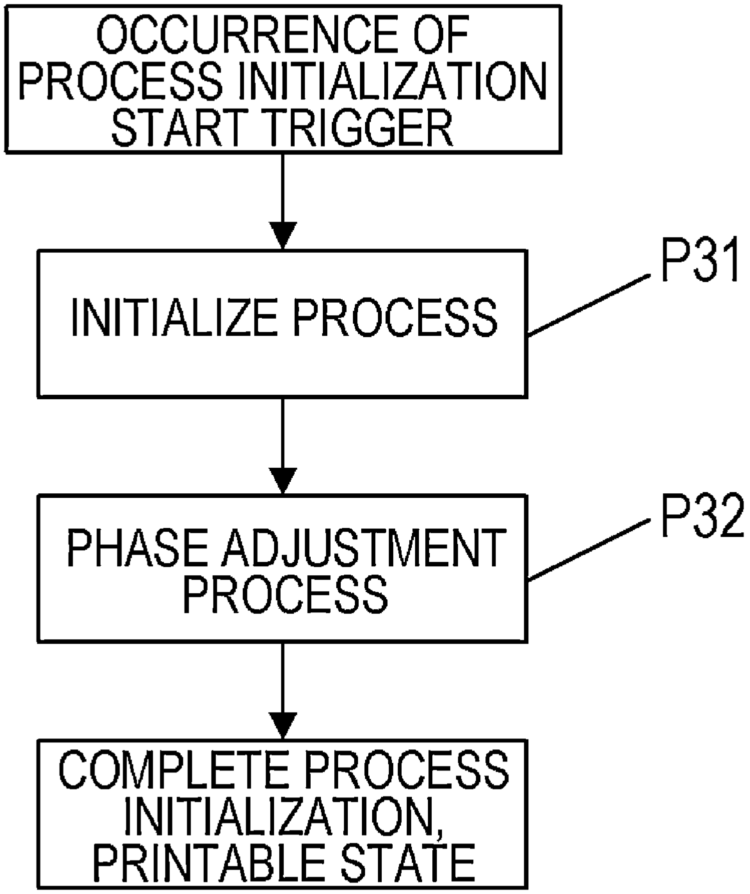
FIG. 22 is a flowchart of a phase adjustment process according to a sixth embodiment.

FIG. 22 illustrates a flowchart of the phase adjustment process in the present embodiment. The image forming apparatus 1 starts process initialization of P31 if no sheet remains in the machine in a case where the aforementioned process initialization start trigger occurs. At that time, the drive portion 2611 is driven, and the stirring member is also rotated while the process initialization is performed. The control portion 601 reads the amount of phase adjustment from the storage portion 613 and continuously stops driving of the drive portion 2611 by the amount corresponding to the necessary amount of phase adjustment from the timing at which the process initialization is supposed to end if the phase adjustment is not performed. In a case where the replenishing port opening/closing sensor 608 is brought into an open state after the process initialization ends, it is possible to change the locking mechanism 2612 into a released state without further performing the phase adjustment since the phase adjustment has already been completed.

Sequence of Phase Adjustment Process

Figure 23:
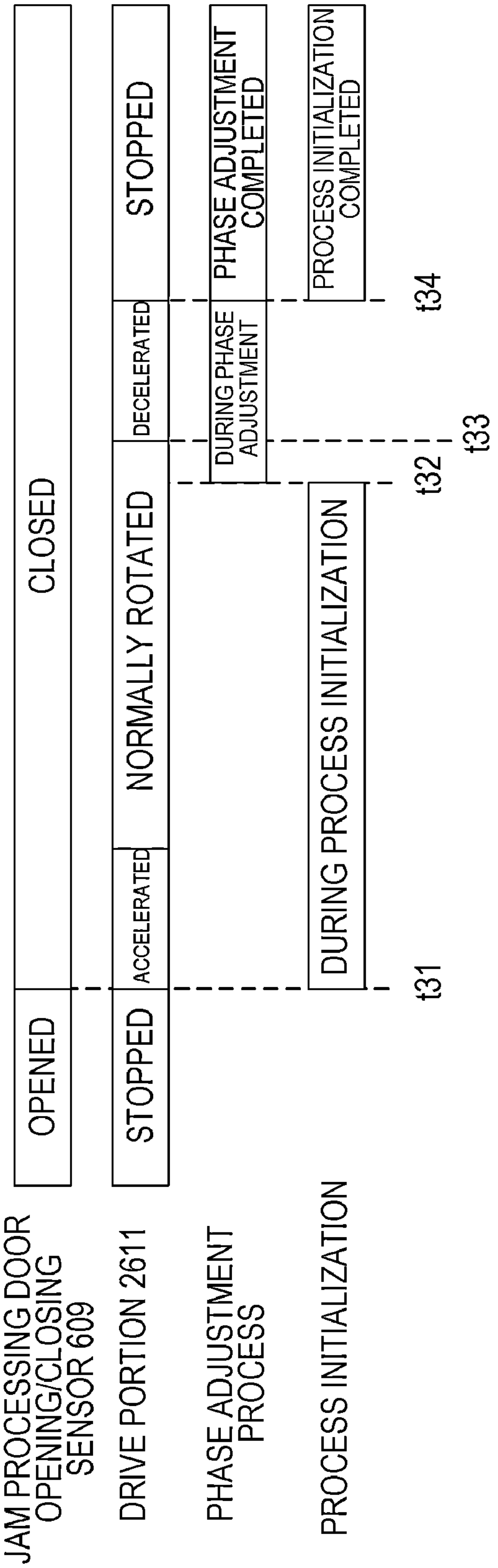
FIG. 23 is a sequence of the phase adjustment process according to the sixth embodiment.

FIG. 23 illustrates a sequence of the phase adjustment process in the present embodiment. FIG. 23 illustrates a case where a detection state of the jam processing door opening/closing sensor 609 has been changed from an open state to a closed state, as an example of the process initialization trigger. Specifically, a case where a user has opened the jam processing door, has removed a jammed paper, and has closed the jam processing door again after occurrence of a jam during printing is illustrated. Note that it is assumed that phase adjustment information of the stirring member is stored in the storage portion 613 similarly to the aforementioned fourth and fifth embodiments at the timing when a jam occurs and the drive portion 2611 is stopped.

Once the jam processing door opening/closing sensor 609 detects a change from the open state to the closed state, the control portion 601 starts to drive the drive portion 2611 at that timing and starts process initialization (t31). The drive portion 2611 moves on to normal rotation after acceleration, and the process initialization can be completed at a timing when it is possible to confirm that operations of each component in the image forming apparatus 1, such as the fixer 607 and each high-voltage circuit 610, are normal (t32). Thereafter, the normal rotation of the drive portion 2611 is continued, and deceleration is then started (t33) and is stopped (t34) on the basis of the phase adjustment information stored in the storage portion 613. At the timing when the drive portion 2611 is stopped, a state where the process initialization and the phase adjustment have been completed is achieved.

Effects and Advantages of Present Embodiment

According to the present embodiment, phase adjustment is performed along with the process initialization at the time of transition from the non-standby state to the standby state. It is thus possible to achieve a change to the state where the toner can be replenished without performing the phase adjustment at the timing when the situation in which the user tries to replenish the toner is detected.

Also, although the present embodiment has been explained as the configuration including the storage portion 613, it is possible to perform the phase adjustment similar to that in the second embodiment along with the process initialization even with the configuration not including the storage portion.

Seventh Embodiment

A seventh embodiment is a configuration that does not include the replenishing port opening/closing sensor in the fourth and fifth embodiments and includes a toner pack mounting sensor instead. The other configurations of an image forming apparatus according to the seventh embodiment are the same as the configurations of the image forming apparatuses explained in the fourth to sixth embodiments, and explanation thereof will be omitted.

Control Block Diagram

Figure 24:
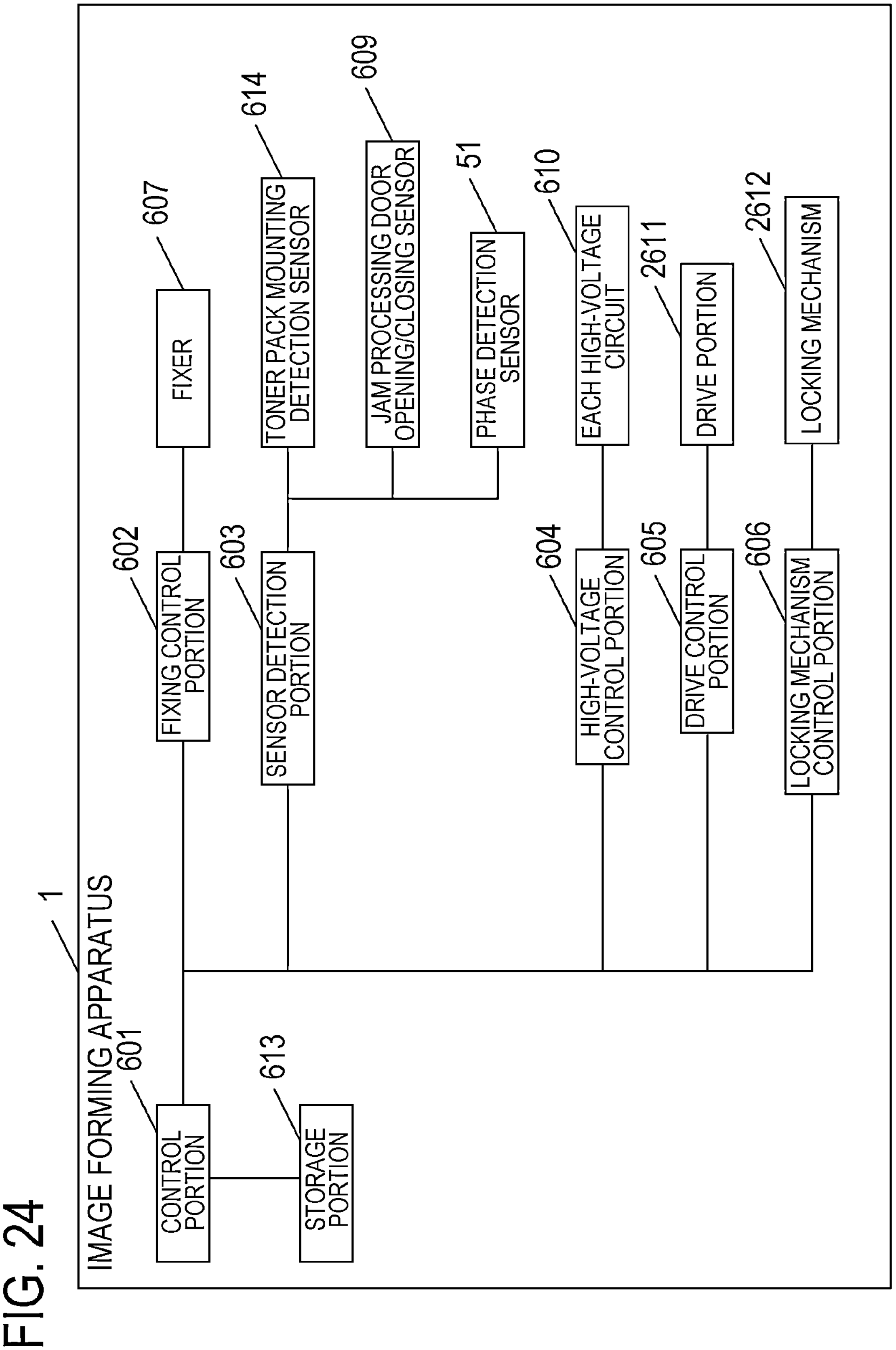
FIG. 24 is a control block diagram according to a seventh embodiment.
Figure 25:
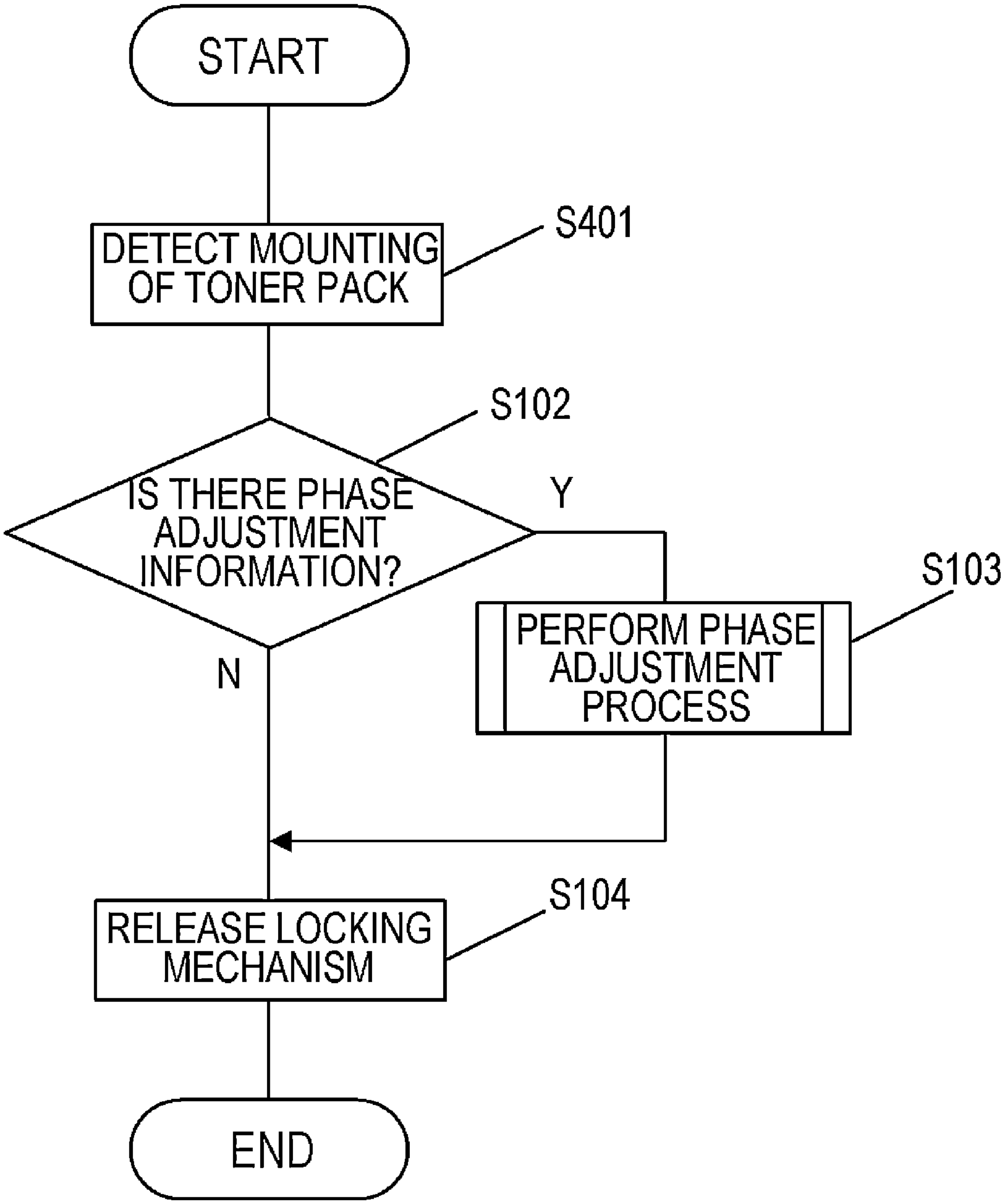
FIG. 25 is a flowchart of a phase adjustment process according to the seventh embodiment.

FIG. 24 illustrates a control block diagram according to the seventh embodiment. On the contrary to the fourth and fifth embodiments that have already been explained using FIG. 17, a toner pack mounting detection sensor 614 that detects mounting of a toner pack on the image forming apparatus 1 is included instead of the replenishing port opening/closing sensor 608 that detects the state (the open state or the closed state) of the opening/closing member in the seventh embodiment. A configuration that is known in the related art may be appropriately employed as a configuration of the toner pack mounting detection sensor 614, and the toner pack mounting detection sensor 614 may be configured of a pressure sensitive switch or a magnetic sensor, for example.

Flowchart and Sequence of Phase Adjustment Process

Whether to perform the phase adjustment process is determined at the timing (S101) when the open state of the replenishing port is detected in the control in the fourth embodiment that has already been explained using the flowchart in FIG. 18. On the contrary, whether to perform the phase adjustment process is determined at a timing (S401) when the toner pack mounting detection sensor detects mounting of the toner pack as illustrated in FIG. 18 in control in the seventh embodiment. The other control in the seventh embodiment is similar to that in the fourth embodiment.

Figure 26:
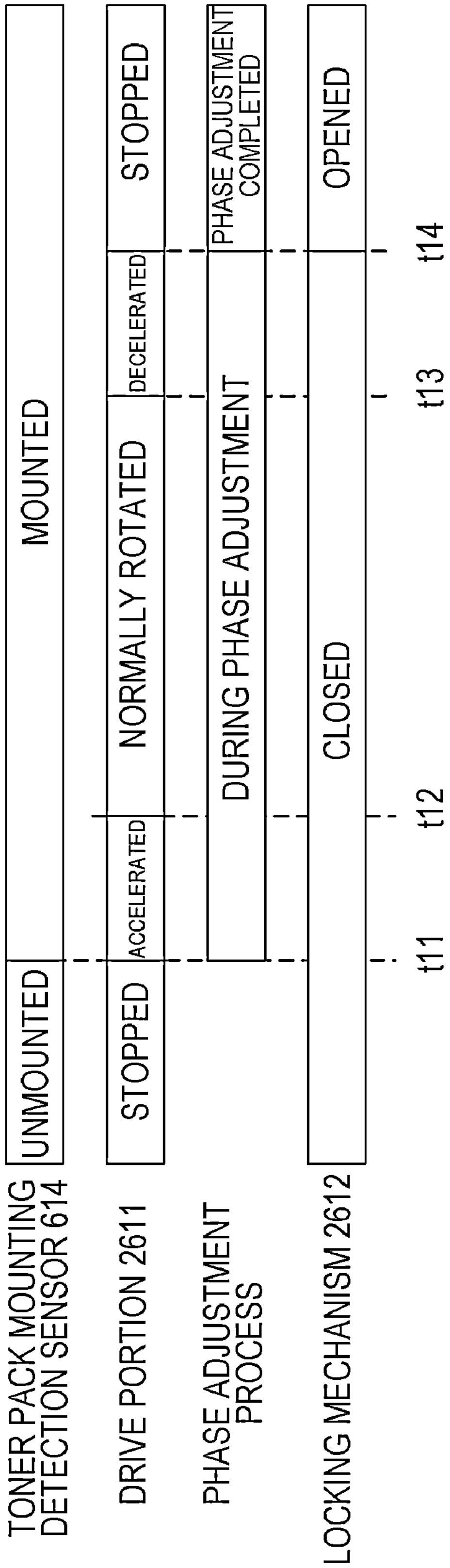
FIG. 26 is a sequence of the phase adjustment process according to the seventh embodiment.

Similarly, in regard to the sequence of the phase adjustment as well, the phase adjustment process is started at a timing (t41) when the mounting of the toner pack is detected as illustrated in FIG. 26 in the sequence in the seventh embodiment, on the contrary to the content of the sequence in the first embodiment that has been explained using FIG. 19. The other sequences in the seventh embodiment are similar to those in the fourth embodiment.

Effects and Advantages of Present Embodiment

According to the present embodiment, it is possible to curb an image failure occurring after replenishment by performing the phase adjustment process at the timing when the situation in which the user tries to replenish the toner is detected similarly to the fourth and fifth embodiments even in the configuration in which the mounting of the toner pack can be detected.

Also, although the present embodiment has been explained as the configuration including the storage portion 613, it is also possible to perform the phase adjustment that is similar to that in the fifth embodiment even with the configuration that does not include the storage portion 613.

Eighth Embodiment

In the first to third embodiments, the section that adjusts the phase of the stirring member 34 and stops the stirring member 34 in a suitable phase has been explained. However, since a main motor 130 which is a single drive source that is common to each rotation member of the apparatus is continuously driven during the adjustment in the phase adjustment process P5 as in the configuration of the image forming apparatus 1 that has been explained hitherto, the photosensitive drum 21 is also driven together. Furthermore, a configuration in which a voltage to be applied to the charging roller 22 and the like when the photosensitive drum 21 is stopped is switched by taking time, and a case where it is necessary to further consider the phase adjustment process P5 is conceivable in such a configuration.

Thus, the following control is performed when first stop control of stopping rotation of the main motor 130 and second stop control of causing applications of a charging bias, a developing bias, and the like to stop in accordance with a motor rotation stop timing in the first stop control are executed after an image forming operation ends in the eighth embodiment. In other words, a start timing of the second stop control is determined on the basis of a deceleration time of the main motor 130 such that end timings of the first stop control and the second stop control coincide with each other and the stirring member 34 is stopped in a predetermined rotation phase when the first stop control is ended. The deceleration time of the main motor 130 is a time required for the main motor 130 to completely stop rotating after power distribution to the main motor 130 is stopped in the first stop control.

Here, before the first stop control (stopping of the main motor 130) is started, determination of the rotation phase and the rotation cycle of the stirring member 34 and adjustment of a deceleration start timing of the main motor 130 based on the rotation cycle of the stirring member 34 are performed. In other words, the cycle of one rotation of the stirring member 34 is acquired on the basis of the rotation phase of the stirring member 34 detected by the phase detecting unit (cycle acquisition process). Then, a start timing of the second stop control is acquired on the basis of the acquired cycle of the stirring member 34 and the aforementioned deceleration time, and the (adjustment process) is executed. In other words, a waiting time until the second stop control is started after a section of the cycle of the stirring member is acquired, and the second stop control is started at the timing after the waiting time from the section of the cycle.

Also, in the second stop control (stop of the application of the bias and the like), each bias application portion is controlled such that a predetermined potential difference is maintained between the photosensitive drum 21 and the developing roller 31 until the rotation of the main motor 130 is stopped. The predetermined potential difference is a potential difference that restricts movement of the toner from the developing roller 31 to the photosensitive drum 21. For example, control in which the magnitude of each of the charging bias and the developing bias is gradually reduced while the potential difference between the charging bias and the developing bias applied in the image forming operation is maintained and each of the charging bias application portion and the developing bias application portion is stopped is performed. Also, the developing bias application portion applies a developing bias with a polarity opposite to the regular charge polarity of the toner after the developing bias becomes zero before the rotation of the main motor 130 is stopped, and continues the application of the developing bias with the opposite polarity until the main motor 130 stops rotating.

In the second stop control (stopping of the application of the bias and the like), static elimination from the surface of the photosensitive drum 21 performed by the pre-exposure device 23 is continued until the static elimination of one cycle of the peripheral surface of the photosensitive drum 21 is ended after the charging bias becomes zero. After the static elimination of one cycle of the peripheral surface of the photosensitive drum 21 is completed, and the pre-exposure device 23 is turned off, power distribution to the main motor 130 is stopped, that is, the first stop control is started.

A section that causes the phase determination process P4, the phase adjustment process P5, and the high-voltage operation at the time of stopping of the motor to be in conjunction with each other in the eighth embodiment will be explained using FIGS. 27 to 31.

Time Relationship Between Phase Determination Process P4 and Phase Adjustment Process P5

Figure 27:
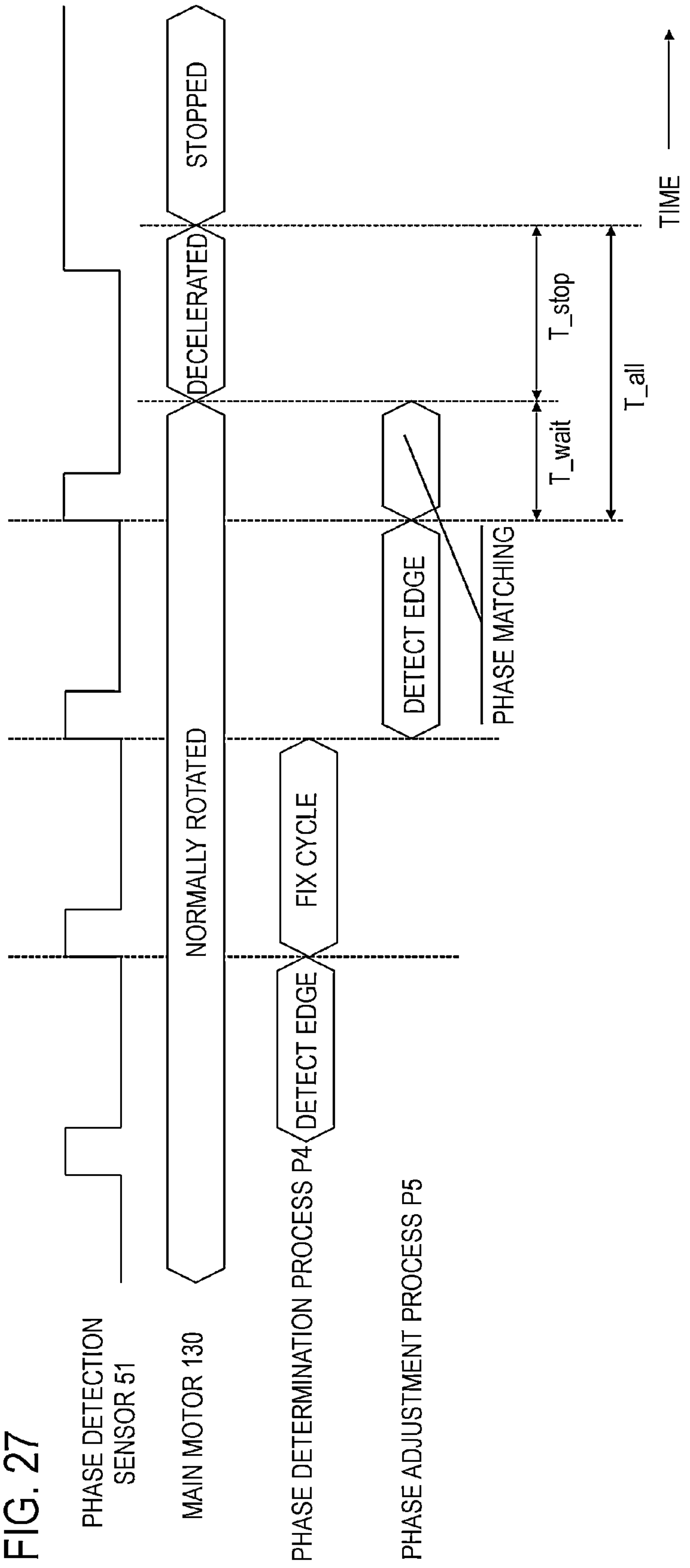
FIG. 27 is a timing chart illustrating control timings in a phase determination process and a phase adjustment process according to an eighth embodiment.

FIG. 27 is a timing chart illustrating the phase detection sensor 51 and the main motor 130, and a time relationship between the phase determination process P4 and the phase adjustment process P5. During normal rotation of the main motor 130, the phase detection sensor 51 cyclically repeats ON and OFF. In the present embodiment, it is assumed that the stirring member 34 is stopped at a suitable phase angle at the time of stopping after elapse of a predetermined phase angle from detection of an ON edge.

In the phase determination process P4, the aforementioned ON edge detection of the phase detection sensor 51 is started at the time of starting the determination. The ON edge detection corresponds to a timing at which the phase detection sensor 51 detects the pin 34*d* for the first time after the image forming operation ends. Once the ON edge is detected, whether or not the ON edge detection can be performed again after one stirring cycle is checked to confirm that the first ON edge detection is not noise.

Although the control may be taken over from the phase determination process P4 in the phase adjustment process P5, the phase adjustment process P5 may independently operate. In the phase adjustment process P5, edge detection is started on the basis of the phase detected in the phase determination process P4. At this time, edge detection section may be limited to prevent unnecessary noise from being detected. The control portion of the image forming apparatus provides a command to stop the main motor 130 in a predetermined phase from the edge detection.

At this time, the command to stop is issued for the main motor 130 after T_wait from the edge detection in consideration of the time T_stop of idling from the start of deceleration to the stop of the main motor 130 and the phase angle at which the stirring member 34 is turned during the time T_stop. It is thus possible to stop the stirring member 34 at a suitable phase angle. In other words, it is possible to start the second stop control at a timing at which the rotation phase of the stirring member is a rotation phase within a predetermined range. The time required for the phase adjustment in the phase adjustment process is T_all, which is a sum of T_stop and T_wait from the edge detection.

Figure 28:
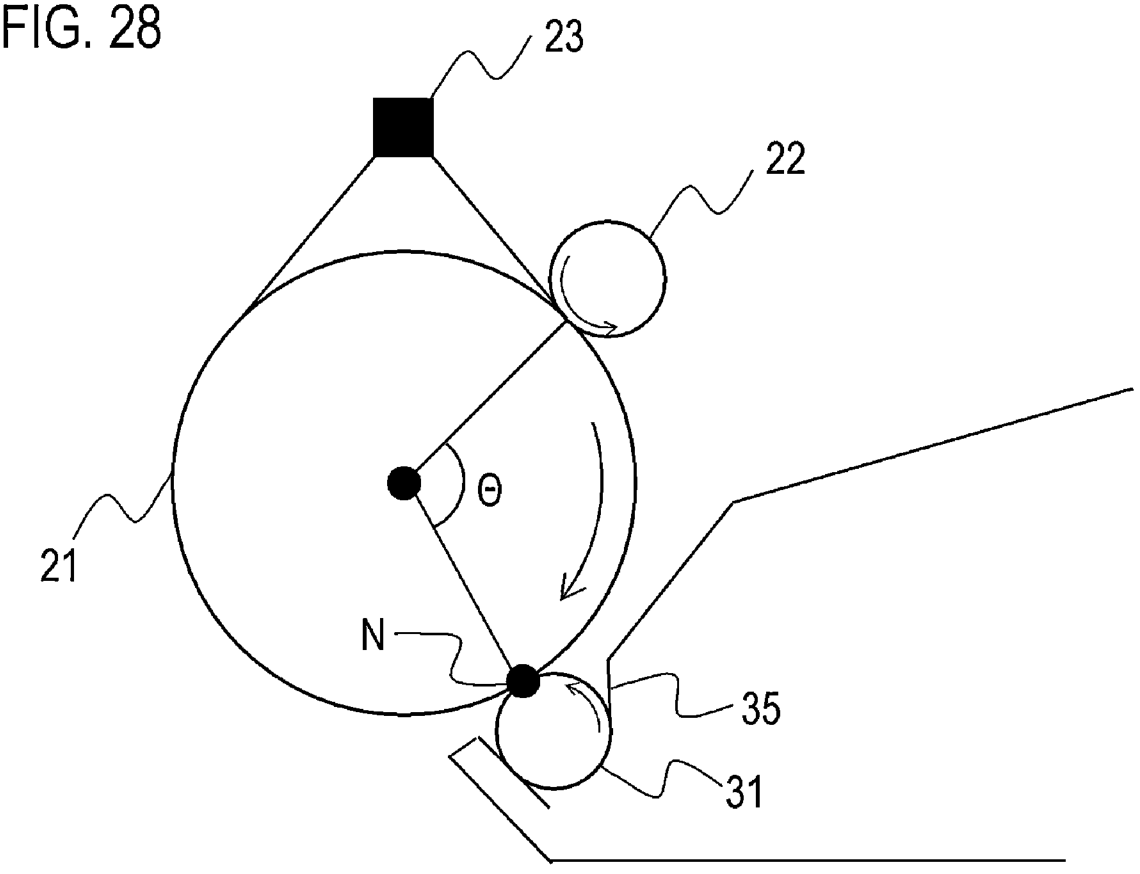
FIG. 28 is a diagram illustrating a positional relationship of parts that control a potential of a photosensitive drum 21 according to the eighth embodiment.

Explanation of High-Voltage Module Configuration and Process at the Time of Stopping in Eighth Embodiment FIG. 28 is a diagram illustrating a positional relationship of components disposed in the surroundings of the photosensitive drum 21 of the image forming apparatus 1. The pre-exposure device 23 is disposed above the photosensitive drum 21 to perform static elimination of the surface potential of the photosensitive drum 21 before charging. The charging roller 22 is disposed on the side downstream the pre-exposure device 23, and the photosensitive drum 21 is uniformly charged by applying the charging bias. It is assumed that the irradiation position of the pre-exposure device 23 is the side upstream from the charging roller 22 and light of the pre-exposure device 23 does not reach the side downstream from the charging roller 22. The developing roller 31 is disposed at a point located downstream from the charging roller 22 at a phase angle θ, and the developing bias is applied thereto such that the developer that the developing roller 31 bears does not leak out to the photosensitive drum 21. In order to prevent the developer from leaking out to the photosensitive drum 21, it is necessary to perform control such that the relationship of the charging bias at a nip N between the developing roller 31 and the photosensitive drum 21, the developing bias, and the potential of the developer depending on rubbing between the developing roller 31 and the developing blade 35 is constant.

Figure 29:
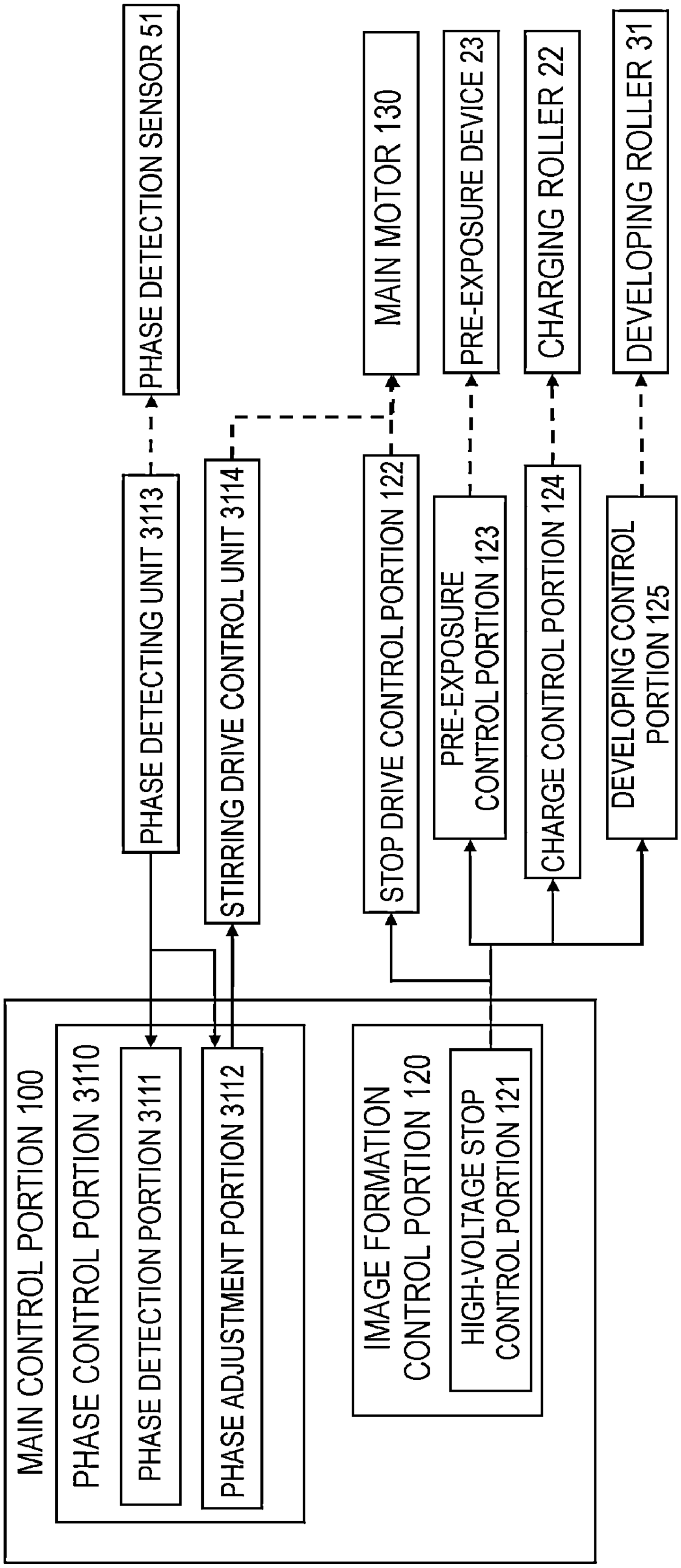
FIG. 29 is a block diagram of a main control portion 100 according to the eighth embodiment.

FIG. 29 is a block diagram illustrating a relationship between various components and the control portion explained in FIGS. 27 and 28.

The main control portion 100 includes a phase control portion 3110 and an image formation control portion 120.

The phase control portion 3110 includes a phase detection portion 3111 that controls the phase determination process P4 and a phase adjustment portion 3112. The phase detection portion 3111 detects a phase angle using a phase detecting unit 3113. The phase detecting unit 3113 detects the phase in accordance with an input from the phase detection sensor 51. The phase adjustment portion 3112 adjusts the phase angle of the stirring member 34 by controlling a stirring drive control unit 3114 on the basis of the input from the phase detecting unit 3113 similarly to the phase detection portion 3111. In the present embodiment, the stirring drive control unit 3114 is connected to the main motor 130.

On the other hand, the image formation control portion 120 includes a high-voltage stop control portion 121. The high-voltage stop control portion 121 includes a stop drive control portion 122 and controls the main motor 130 in the present embodiment. Also, the high-voltage stop control portion 121 includes a pre-exposure control portion 123, a charge control portion 124, and a developing control portion 125, which are connected to the pre-exposure device 23, the charging roller 22, and the developing roller 31, respectively. The pre-exposure control portion 123 receives a command from the high-voltage stop control portion 121 and switches ON (turning-on)/OFF (turning-off) of exposure of the pre-exposure device 23. The charge control portion (charging bias application portion) 124 receives a command from the high-voltage stop control portion 121 and controls application of the charging bias from a high-voltage power source, which is not illustrated, to the charging roller 22. The developing control portion (developing bias application portion) 125 receives a command from the high-voltage stop control portion 121 and controls application of the developing bias from the high-voltage power source, which is not illustrated, to the developing roller 31.

Figure 30:
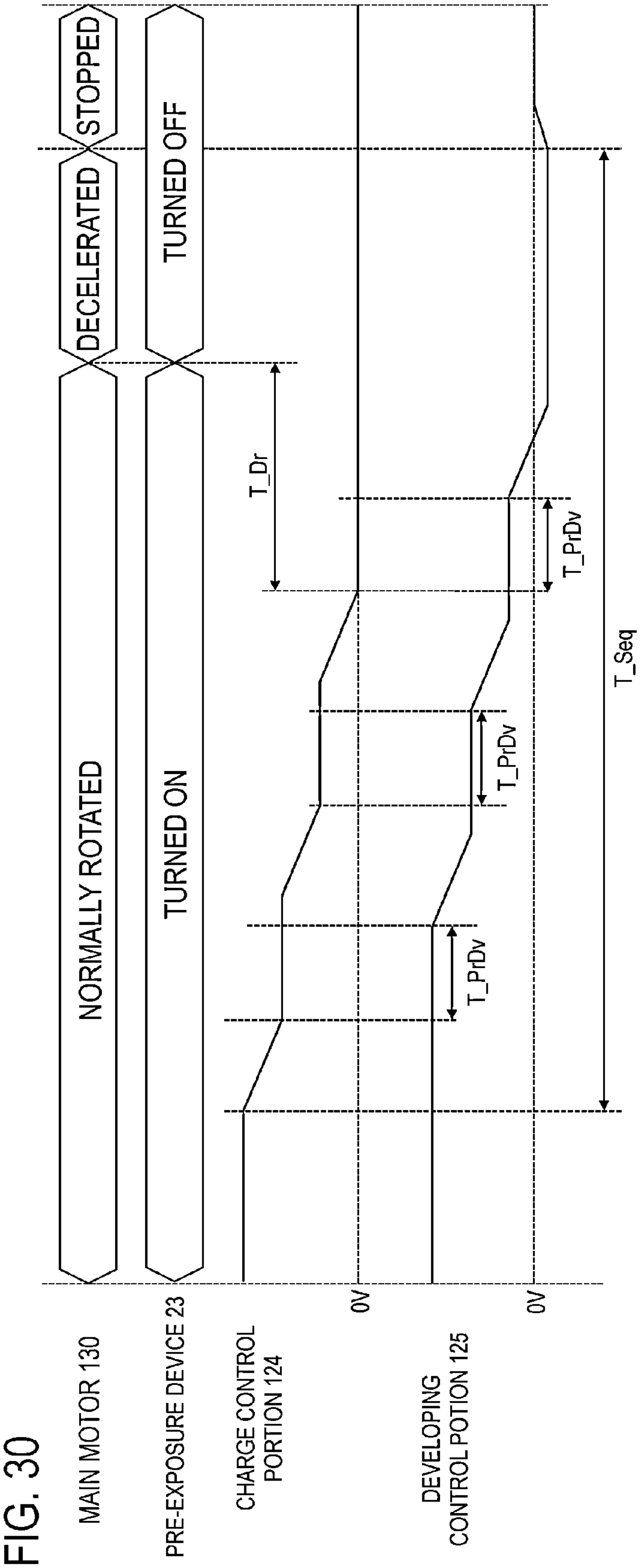
FIG. 30 is a timing chart for stop control of the photosensitive drum 21 according to the eighth embodiment.

A stopping method of the high-voltage stop control portion 121 using the above control unit will be explained with reference to FIG. 30. FIG. 30 is a timing chart illustrating the stop control of the high-voltage stop control portion 121.

In the situation before the stopping, the main motor 130 is normally rotating, the pre-exposure device 23 is turned on, and the charge control portion 124 and the developing control portion 125 output a negative potential at the time of image formation. The state at this time is an optimal state to prevent the developer from flowing out in a situation in which the main motor 130 is being driven, and it is preferable to maintain the state as long as possible until the stop.

The high-voltage stop control portion 121 starts to cause the potential of the charge control portion 124 to fall once a command to end the image forming operation is received. At this time, the falling width is determined such that the potential difference between the charging bias and the developing bias is equal to or less than a predetermined potential at the developing nip D. Although FIG. 30 illustrates an example in which three-step falling is performed, the control may be performed with the number of steps reduced or increased.

Subsequently, T_PrDv is waited from completion of the falling of the charging bias as a starting point, and the developing control portion 125 starts to cause the developing bias to fall. T_PrDv can be calculated from the phase angle θ of the charging and developing, and the distance between the charging and developing nips obtained from the diameter of the photosensitive drum 21, and a target speed of the driving in the image forming operation. The charge control portion 124 and the developing control portion 125 repeat the above operations, and the charge control portion 124 outputs 0 V, and the developing control portion 125 outputs a positive potential, that is, a potential with a polarity opposite to the regular charge polarity of the toner. This setting is just an example, and the setting potential of the charge control portion 124 may be equal to or less than a predetermined potential with which the potential of the charging bias is not applied to the photosensitive drum 21.

After the potential that the charge control portion 124 applies completely falls, the pre-exposure control portion 123 waits for elapse of the time T_Dr during which static elimination can be completely performed on the one cycle of the photosensitive drum 21 and then stops the pre-exposure device 23. The high-voltage stop control portion 121 waits for turning-off of the pre-exposure device 23 and issues a command to stop to the main motor 130. The developing control portion 125 waits for complete stopping of the main motor 130 and then stops the output of the positive potential, and the stop control of the high-voltage stop control portion 121 is completed. As described above, the time T_Seq until the command to stop the positive potential of the developing control portion 125 after the start of falling of the charge control portion 124 is required to complete stop of the high-voltage stop control portion 121.

As illustrated in FIGS. 27 and 30 hitherto, both the control in the phase adjustment process P5 and the stop control of the high-voltage stop control portion 121 are control with a time limit with respect to the stop of the main motor 130. A method of performing the two kinds of control in parallel will be explained.

Figure 31:
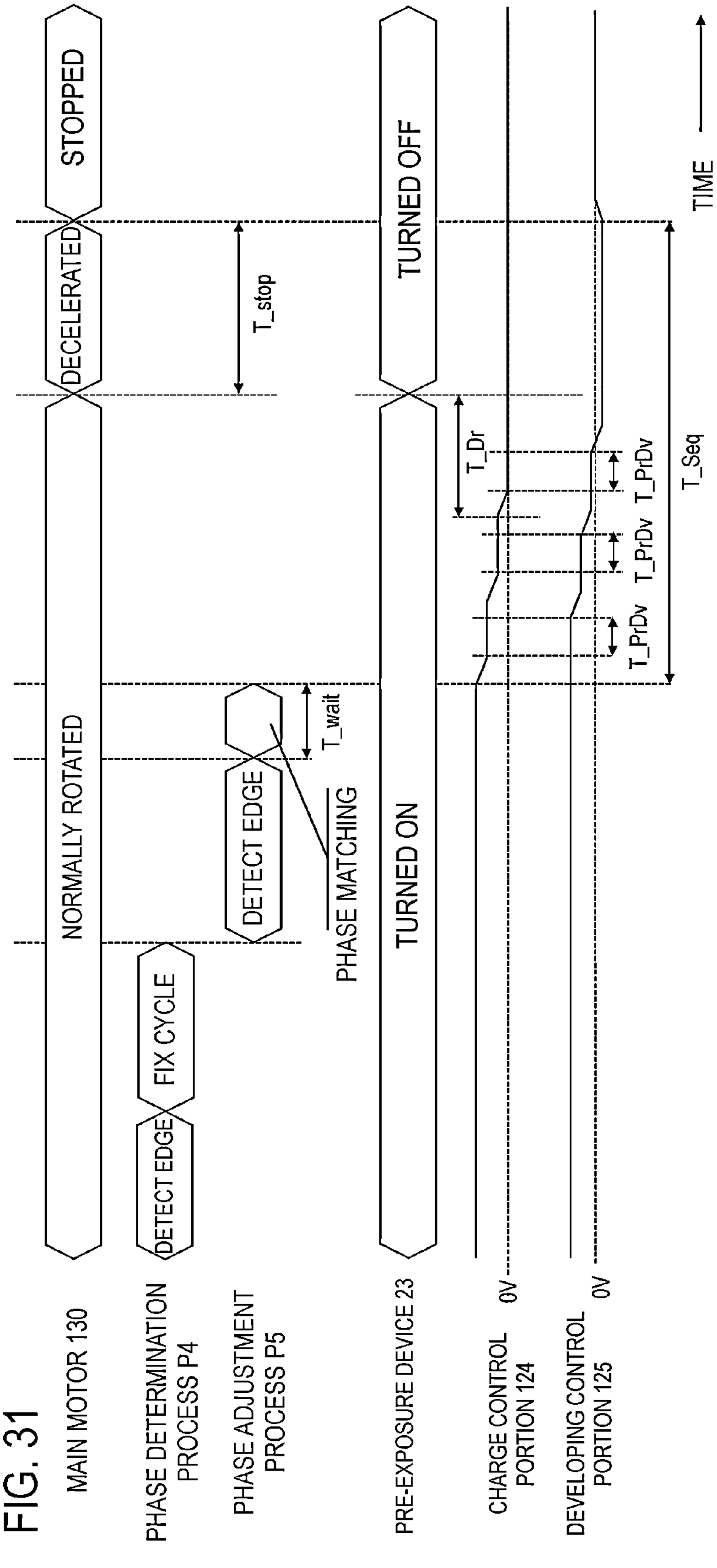
FIG. 31 is a timing chart illustrating a relationship between phase adjustment and stop processing according to the eighth embodiment.

FIG. 31 is a timing chart for explaining operations of performing the phase adjustment process P5 and the stop control of the high-voltage stop control portion 121 in parallel. Since the relationship of the phase determination process P4, the phase adjustment process P5, and the phase detection sensor 51 is the same as that in FIG. 27, the relationship is not illustrated in FIG. 31.

In the phase determination process P4, edge detection is performed to fix the cycle as explained in FIG. 27. In the phase adjustment process P5, edge detection is performed on the basis of the detection result of the phase determination process P4, and phase matching is started. At this time, the waiting time T_wait for the phase matching is controlled such that a start of the stop control of the high-voltage stop control portion 121 is waited instead of waiting for the start of the stopping of the main motor 130 as illustrated in FIG. 27. At this time, the photosensitive drum 21 rotates at a speed of the image forming operation for a period of time obtained by subtracting the time T_Stop required from the deceleration to the stopping of the main motor 130 from the time T_Seq required for the stop control of the high-voltage stop control portion 121. In the phase adjustment process P5, it is possible to calculate the phase to which the stirring member 34 will proceed from the aforementioned time difference and to obtain the phase matching time T_wait in a case where the phase matching is performed at the start of the stop control of the high-voltage stop control portion 121.

Ninth Embodiment

In a ninth embodiment, operations in a phase adjustment process P5 in a case where a plurality of stop processes are present in addition to the relationship between the high-voltage stop processing and the phase adjustment process P5 illustrated in the eighth embodiment will be explained. Since explanation regarding a time relationship between a phase determination process P4 and the phase adjustment process P5, a high-voltage module configuration, and a process at the time of stopping is the same as that in the eight embodiment, the explanation will be omitted.

Figure 32:
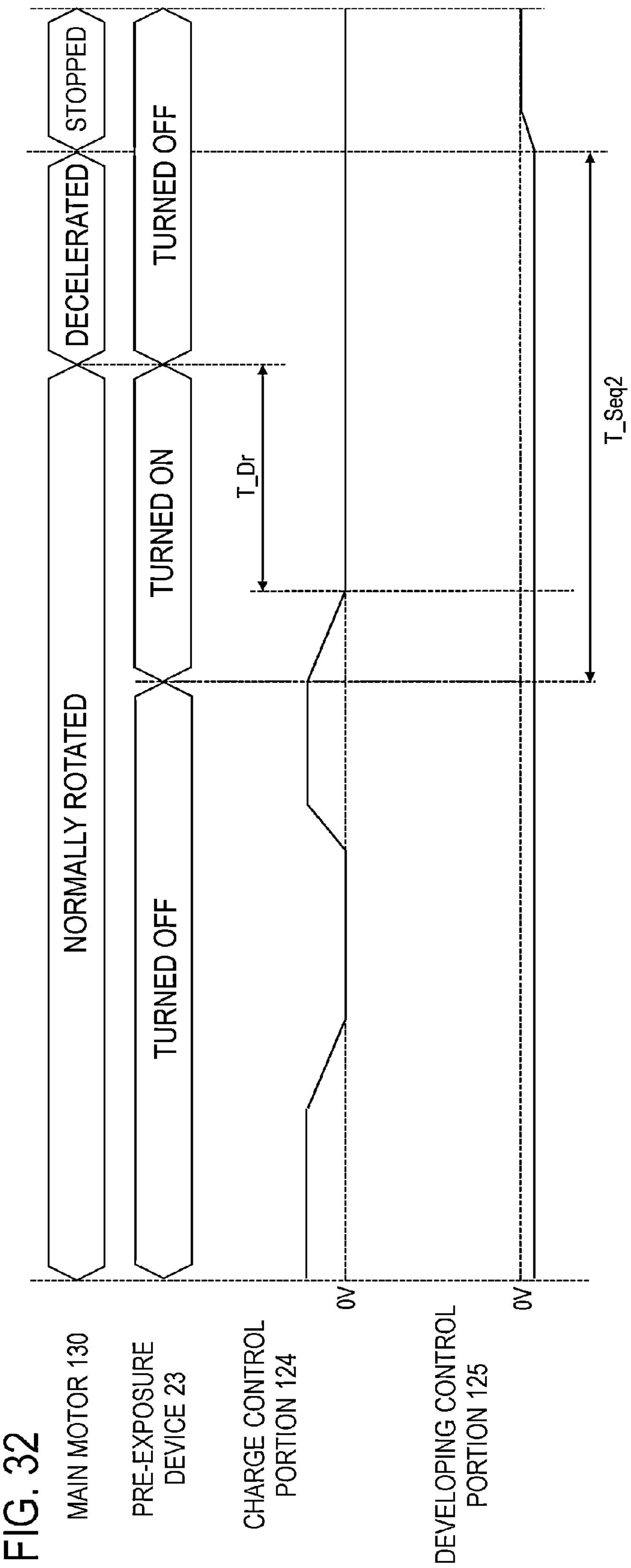
FIG. 32 is a timing chart for stop control of a second photosensitive drum 21 according to a ninth embodiment.

FIG. 32 is a second stopping method at a high voltage in the ninth embodiment. The stopping method in the present embodiment is stop processing performed after cleaning processing (cleaning control) or the like is performed in processing at the time of stop of image formation, for example. Examples of the cleaning processing include cleaning for the purpose of retransferring a developer adhering to a charging roller 22 to a developing roller 31 via a photosensitive drum 21. Specifically, the negative developer adhering to the charging roller 22 is transferred to the photosensitive drum 21 by turning ON/OFF a potential to be applied to the charging roller 22 at a predetermined cycle from a situation in which the photosensitive drum 21 is uniformly charged. Then, the negative developer transferred to the photosensitive drum 21 is retransferred to the developing roller 31 to which a positive potential is applied.

Through the latest cleaning, a charge control portion 124 holds a lower potential as compared with that when the image forming process is performed, and the pre-exposure device 23 is off. A developing control portion 125 outputs a positive potential. In other words, the charging bias is lower than the charging bias applied in the image forming operation, and the developing bias is a developing bias with a polarity opposite to a regular charge polarity of the toner, at the time of the start of the second stop control.

The pre-exposure device 23 is turned off, and the charge control portion 124 stops application at the time of the start of the stop processing. A time T_Dr necessary to rotate the photosensitive drum 21 once is waited from the stop of the application of the charge control portion 124, and the pre-exposure device 23 is then turned off. At the same time, a command to stop is issued for the main motor 130, and the developing control portion 125 waits for the stop time of the main motor 130 and then turns off the output of the positive potential. A section T_Seq2 until the output of the positive potential of the developing control portion 125 is turned off after the start of the stop control corresponds to a time different from T_Seq in FIG. 30.

Figure 33:
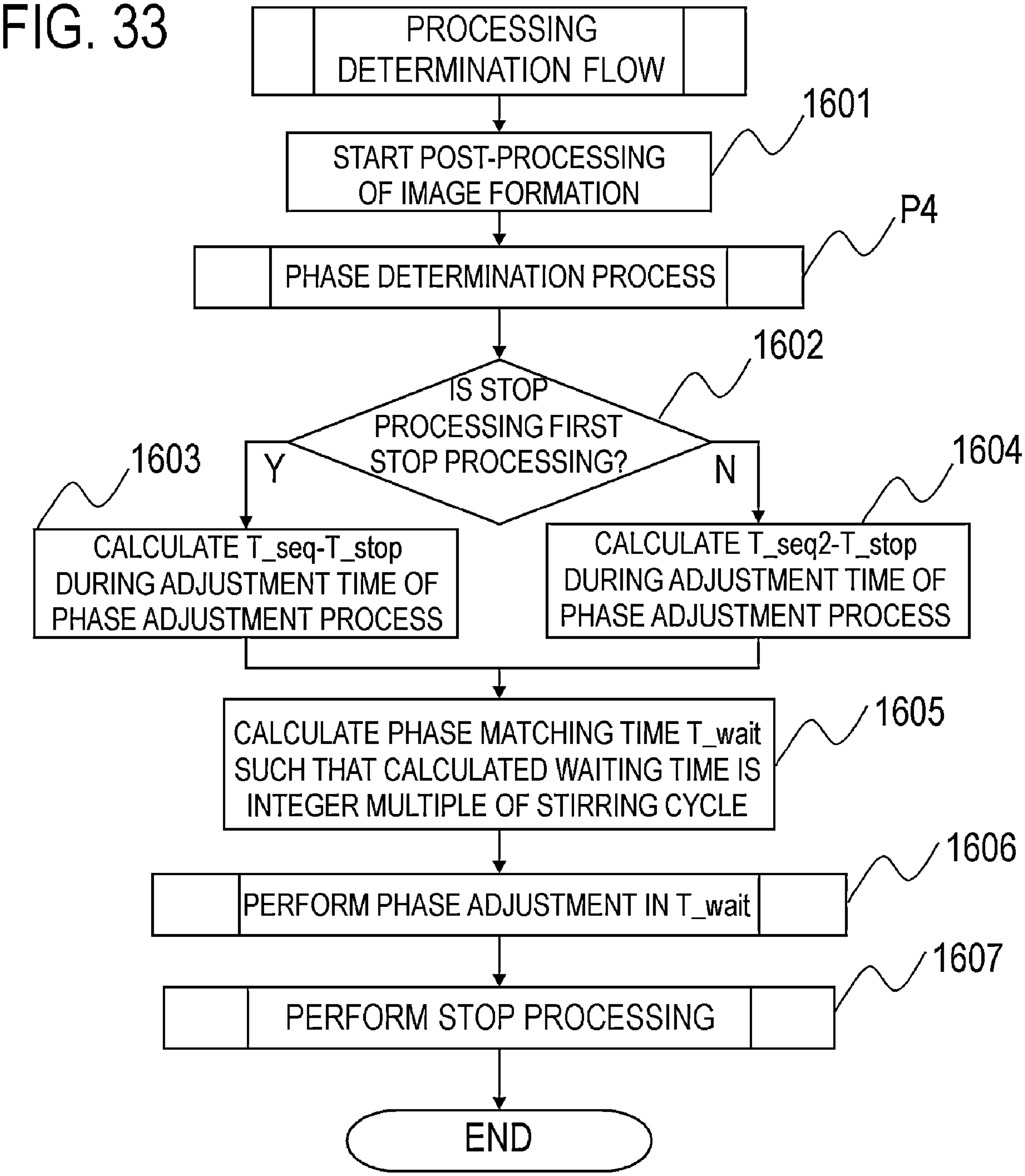
FIG. 33 is a control flowchart for selection of stop control and a phase adjustment process according to the ninth embodiment.

FIG. 33 is a flowchart for determining the adjustment time of the phase adjustment process P5 in the ninth embodiment. Once post-processing of image formation is started, the image formation control portion 120 selects and performs necessary post-processing (1601). The processing of the phase determination process P4 is as described above in the eighth embodiment and will be omitted. Through the selection of the post-processing, which of first stop processing and second stop processing the stop processing is needed at the time of stopping of the main motor 130 is determined (1602).

In a case where the first stop processing is performed, a time obtained by subtracting a time T_Stop required from deceleration to stop of the main motor 130 from a time T_Seq required for the first stop control is used as described above in the fourth embodiment, as the adjustment time to be considered for the phase adjustment process P5 (1603).

Also, in a case where the second stop control is performed in the stop processing, a time obtained by subtracting the time T_Stop required from deceleration to stop of the main motor 130 from a time T_Seq2 required for the second stop control is used as the adjustment time to be considered in the phase adjustment process P5 (1604).

A phase matching time (adjustment time) T_wait is calculated such that the calculated time is the minimum integer multiple of one stirring cycle of the stirring member 34 (1605), and the phase adjustment process P5 is performed in accordance with T_wait (1606). The main control portion 100 performs necessary stop processing after completion of the phase adjustment process P5 (1607).

Through the control as described above, it is possible to stop the main motor 130 while appropriately matching the phase of the stirring member 34 at the time of stopping even in a case where a plurality of stop processes are present. Note that the stop processing in the above explanation is not limited to the processing explained in the present embodiment, different stop processing may be performed, and third and fourth stop processing may be included. Even in a case where three or more stop processes are performed, it is possible to obtain the effects explained in the present embodiment by calculating a time taken for each stop process and calculating the adjustment time T_wait of the phase adjustment process in accordance with the time.

Tenth Embodiment

In a tenth embodiment, a method of calculating an adjustment time of a phase adjustment process P5 in a case where an image formation control portion 120 further extends post-processing will be described in regard to the method of calculating the adjustment time of the phase adjustment process P5 described in the eighth and ninth embodiments. In the tenth embodiment, acquisition (cycle acquisition process) of a cycle of one rotation of a stirring member 34 and acquisition (adjustment process) of a stop timing of a main motor 130 are executed during execution of the post-processing as an adjustment operation of the apparatus.

Figure 34:
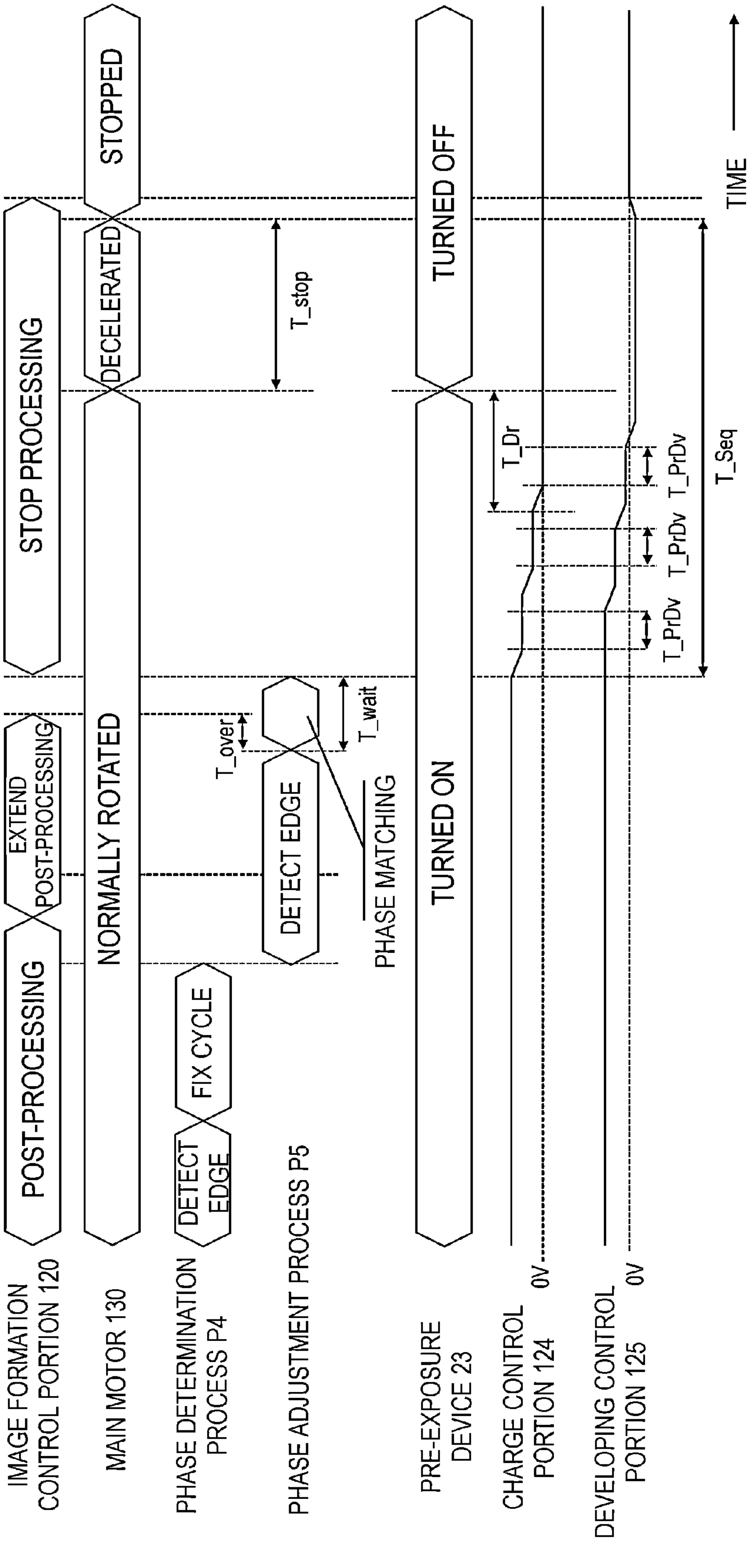
FIG. 34 is a timing chart illustrating a relationship of extension of post-processing, phase adjustment, and stop processing according to a tenth embodiment.

FIG. 34 is a timing chart illustrating a time relationship in a case where the image formation control portion 120 extends the post-processing in addition to a time relationship of the phase adjustment process and the stop control illustrated in FIG. 31. The image formation control portion 120 may perform post-processing including a cleaning operation as described in the ninth embodiment after the image forming operation. Also, the post-processing is extended for the purpose of uniformizing a temperature rise at an end portion of a fixing portion 70 when a recording material with a narrow width is conveyed, for example.

A main control portion 100 calculates an adjustment time T_wait of the phase from a time T_Seq required for the stop processing of the image formation control portion 120 in the phase adjustment process P5. At the timing when the extension of the post-processing of the image formation control portion 120 is completed, the main control portion 100 performs phase matching on the basis of an elapse time T_over from the detection performed immediately before by a phase detecting unit 3113 and provides a command to start the stop processing to the image formation control portion 120 in the phase adjustment process P5.

Figure 35:
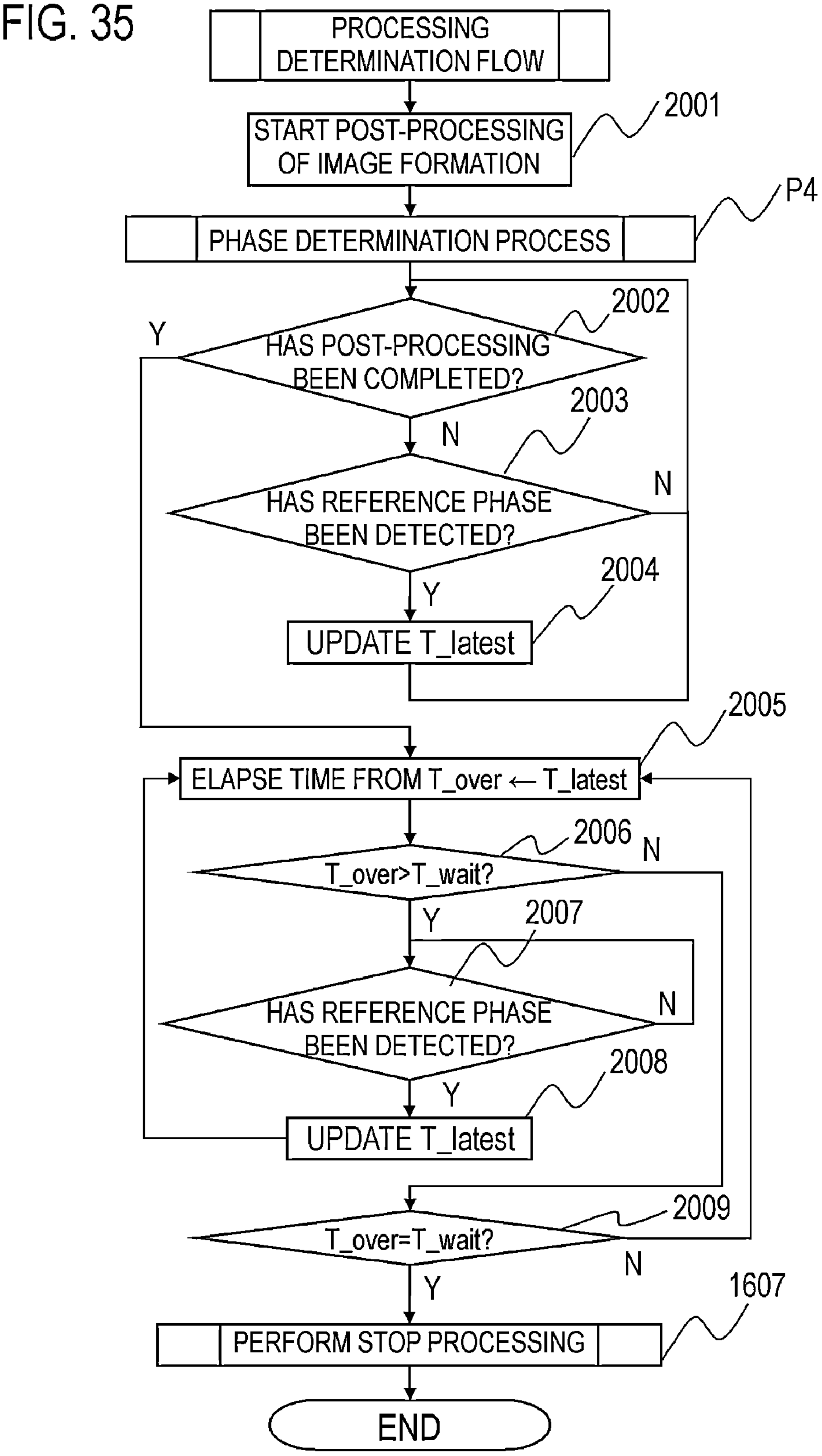
FIG. 35 is a control flowchart for the extension of the post-processing, the phase adjustment, and the stop processing according to the tenth embodiment.

FIG. 35 is a flowchart for explaining the processing in FIG. 34 in detail. Explanation similar to that in the ninth embodiment will be omitted. The image formation control portion 120 detects the phase in the phase determination process P4 once the post-processing is started (2001). Subsequently, whether or not the post-processing has been completed is determined (2002), the phase detecting unit 3113 checks detection of a reference phase in a case where the post-processing has not been completed (2003), and the latest detection time T_latest is updated in a case where there has been detection (2004). In a case where the post-processing has been completed, the main control portion 100 calculates T_over on the basis of an elapse time from the time T_latest at which the latest reference phase is detected (2005). Subsequently, whether or not T_over is a time longer than T_wait is determined (2006), and the reference phase is detected again in a case where T_over is longer than T_wait (2007). In a case where the reference phase is detected, T_latest is updated, and T_over is updated again (2008). In a case where T_over is less than T_wait, the phase adjustment process P5 returns to the update of T_over (2009). In a case where T_over and T_wait become equal, the main control portion 100 provides a command to start stop processing to the image formation control portion 120.

Through the control as described above, it is possible to minimize the time by which the driving is extended in the phase adjustment, to inactivate the main motor 130 while curbing an image defect in the stop processing, and to match the phase even in a case where the post-processing is extended.

Note that although the present embodiment has been described on the assumption that the reason for the extension of the post-processing is processing of uniformizing a temperature rise at the end portion of the fixing portion 70, the configuration of the present embodiment is not limited thereto. For example, selection may be made to wait for completion of processing of detecting the remaining amount of the developer or to wait for the longest factor from among the aforementioned several extension processes.

Eleventh Embodiment

A configuration capable of detecting a phase of a stirring member by a simple method in an image forming apparatus including an optical toner remaining amount detecting unit will be explained below. Note that description of configurations that are common to those in the first embodiment will be omitted.

A stirring member 34 is rotatably provided inside a toner accommodating chamber 32*d* of a developer container 32 in the present embodiment. Furthermore, a toner remaining amount detection sensor (developer remaining amount detection portion) 50 serving as an optical detecting unit is provided on an inner wall of the toner accommodating chamber 32*d*. The toner remaining amount detection sensor 50 includes an optical path of detection light inside the toner accommodating chamber 32*d* and detects the amount of toner accommodated in the toner accommodating chamber 32*d* on the basis of the amount of detection light passing through the optical path. Details of the configuration of the toner remaining amount detection sensor 50 will be described later in the section of a method of detecting a toner remaining amount.

Figure 36:
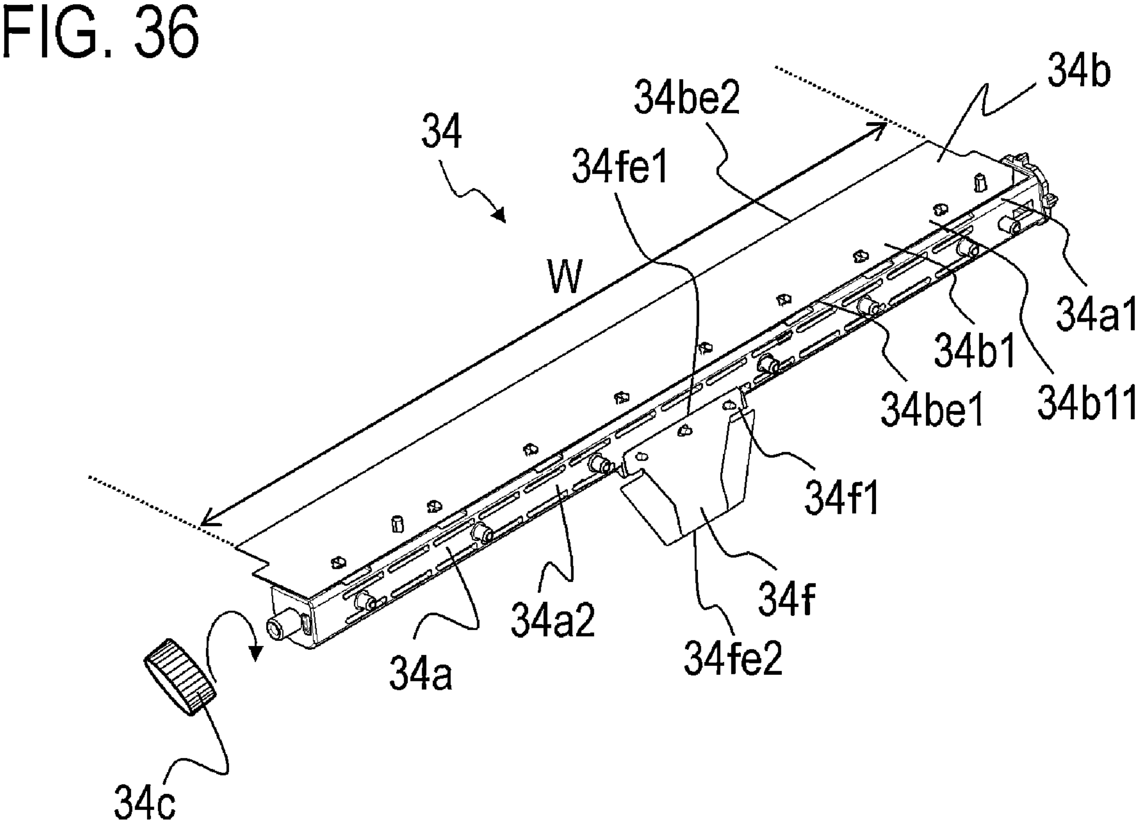
FIG. 36 is a perspective view of a stirring member 34.

FIG. 36 is a schematic perspective view illustrating a configuration of a stirring member. A stirring member 34 includes a stirring shaft (rotation member) 34*a* that extends in a longitudinal direction, a vane portion (first sheet) 34*b* that extends on the side further outward in the radial direction than the stirring shaft 34*a*, and a cleaning member (second sheet) 34*f* that extends on the side further outward in the radial direction than the stirring shaft 34*a* at a position that is different from the vane portion 34*b*. The cleaning member 34*f* is provided to clean the toner remaining amount detection sensor 50. In the present embodiment, the cleaning member 34*f* is provided at a position of 90° on the side downstream the vane portion 34*b*.

Specifically, the stirring shaft 34*a* includes a first attachment surface 34*al* that extends in a direction of a rotation axis and a second attachment surface 34*a*2 that extends in the direction of the rotation axis at a position different from the first attachment surface 34*al* around the rotation axis. The first attachment surface 34*al* and the second attachment surface 34*a*2 are two adjacent surfaces from among four surfaces of the stirring shaft 34*a* with a rectangular section aligned in the rotation direction, and are surfaces with vertical lines (normal lines) extending in mutually perpendicularly intersecting directions.

A vane portion (first sheet) 34*b*1 includes an attachment portion (first attachment portion) 34*b*11 that comes into contact with the first attachment surface 34*al*. The vane portion 34*b*1 includes one end portion (first end portion) 34*b*1*e*1 in a direction perpendicularly intersecting the rotation axis fixed to the stirring shaft 34*a* as a part of the attachment portion 34*b*11 and the other end portion (second end portion) 34*b*1*e*2 that is a free end and is able to come into contact with an inner wall surface of the toner accommodating chamber 32*d*.

The cleaning member (second sheet) 34*f* includes an attachment portion (second attachment portion) 34*f*1 that comes into contact with the second attachment surface 34*a*2. The cleaning member 34*f* includes one end portion (third end portion) 34*fe*1 in the direction perpendicularly intersecting the rotation axis fixed to the stirring shaft 34*a* as a part of the attachment portion 34*f*1 and the other end portion (fourth end portion) 34*fe*2 capable of coming into contact with the toner remaining amount detection sensor 50. More specifically, the cleaning member 34*f* is configured to come into contact with an optical path surface of the toner remaining amount detection sensor 50 to form an optical path of detection light inside the toner accommodating chamber 32*d* and clean the optical path surface.

When seen in the direction of the rotation axis of the stirring shaft 34*a*, the length of the vane portion 34*b* measured in the direction in which the vane portion 34*b* from the attachment portion 34*b*11 to the end portion is longer than the length of the cleaning member 34*f* measured in the direction in which the cleaning member 34*f* extends from the attachment portion 34*f*1 to the end portion. Also, the width of the cleaning member 34*f* is narrower than the width of the vane portion 34*b* in the longitudinal direction, which is the direction of the rotation axis of the stirring shaft 34*a*. In other words, the cleaning member 34*f* is provided to have a width corresponding to the longitudinal width of the toner remaining amount detection sensor 50, while the vane portion 34*b* is provided to have a width corresponding to the longitudinal width of the toner accommodating chamber 32*d*. Moreover, the longitudinal width of the vane portion 34*b* is narrower than the longitudinal width of the developing opening portion 39, and the short-side length of the vane portion 34*b* (the length of the vane portion 34*b* measured in the direction in which the vane portion 34*b* extends when seen in the direction of the rotation axis) is a length with which the vane portion 34*b* can enter the developing chamber 32*e* via the developing opening portion 39.

The stirring member 34 is turned around the stirring shaft 34*a* as a shaft center through motor driving via a gear 34*c*.

The vane portion 34*b* of the stirring member 34 in the present embodiment is made of polycarbonate with a thickness of 180 μm and has flexibility. The vane portion 34*b* stirs the toner in the developer container 32 while being bent and restored in accordance with the shape of the inner wall inside the developer container 32. Also, a width W of the vane portion 34*b* of the stirring member 34 in the longitudinal direction is set to be narrower than the width of the developing opening portion 39 in the longitudinal direction, and the vane portion 34*b* can enter the developing opening portion 39. The vane portion 34*b* also plays a role in feeding the toner toward the developing chamber 32*e* where the developing roller 31 and the supply roller 33 are present via the developing opening portion 39.

Also, the cleaning member 34*f* in the present embodiment plays a role in preventing the toner falling down to the toner remaining amount detection sensor 50 from contaminating the optical path and preventing toner remaining amount detection accuracy from being not able to be secured. As the cleaning member 34*f* in the present embodiment, a cleaning member 34*f* made of a polyimide sheet with a thickness of 200 m and with high abrasion resistance is used to sufficiently bear repeated rubbing of the optical path surface of the toner remaining amount detection sensor 50.

Control System of Image Forming Apparatus

Figure 38:
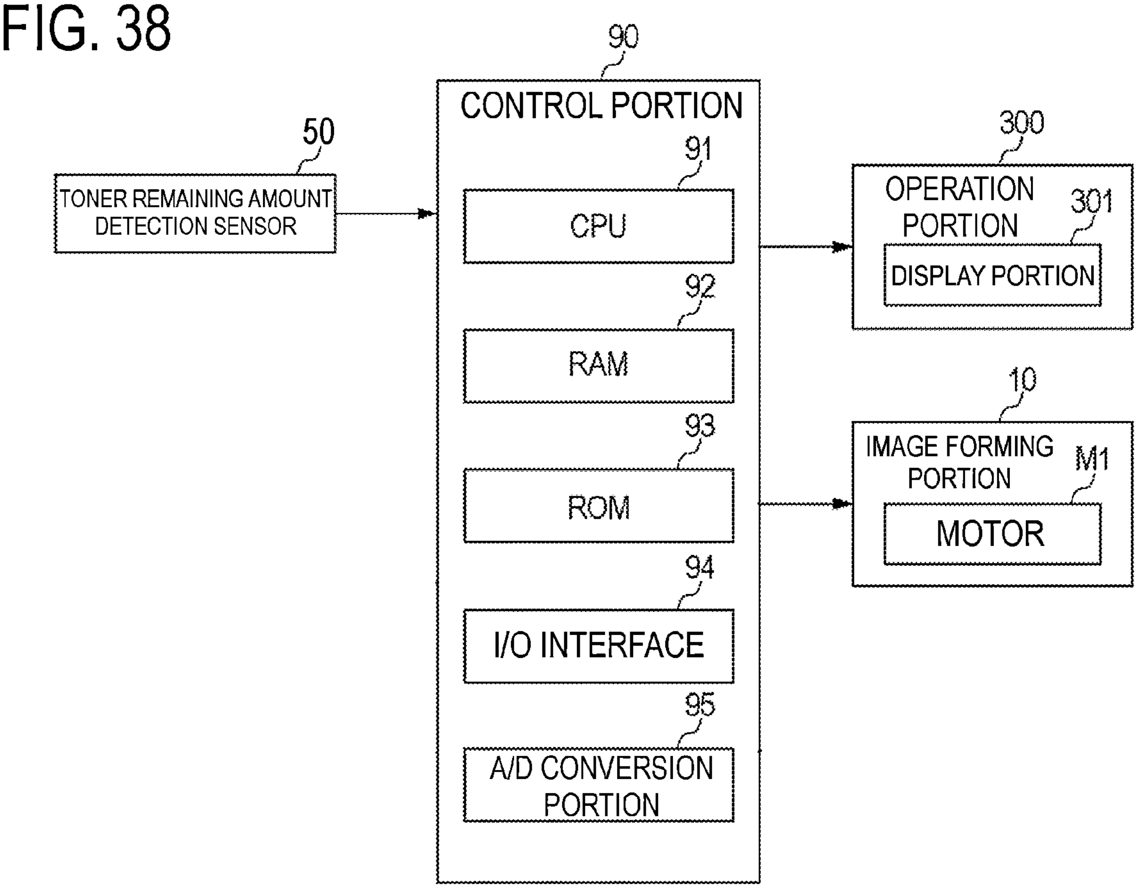
FIG. 38 is a block diagram illustrating a control system of the image forming apparatus 1.

FIG. 38 is a block diagram illustrating a control system of the image forming apparatus 1. The toner remaining amount detection sensor 50 is connected on the input side of a control portion 90.

Configuration of Toner Remaining Amount Detection Sensor 50 and Method of Detecting Toner Remaining Amount A configuration of the toner remaining amount detection sensor 50 and a method of detecting the toner remaining amount will be explained using FIGS. 12A to 12C, 37, and 38. FIGS. 12A to 12C are diagrams for explaining the light guide 600 of the toner remaining amount detection sensor 50. FIG. 12A is a sectional view when the plane B-Bx is seen from the back surface side of the developer container 32 installed inside the image forming apparatus 1 illustrated in FIG. 1. FIGS. 12B and 12C are perspective views of the light guide 600. Also, FIG. 37 is a circuit diagram illustrating an example of a circuit configuration of the toner remaining amount detection sensor 50, and FIG. 38 is a block diagram illustrating a control system of the image forming apparatus 1.

As illustrated in FIGS. 12A to 12C, the light guide 600 configuring the toner remaining amount detection sensor 50 is installed at the center portion in the longitudinal direction of the developer container 32 in the present embodiment. The light guide 600 includes a light entering portion 611 that takes light from a light emitting portion 50*a* into the light guide 600 outside the developer container 32, optical path surfaces 612 and 622 that generates an optical path Q inside the developer container 32, and a light exiting portion 621 that is for passing the light that has passed through the optical path Q inside the developer container 32 to a light receiving portion 50*b*. As the light guide 600, a light guide 600 made of polystyrene that is amorphous and has high transparency is used.

Figure 37:
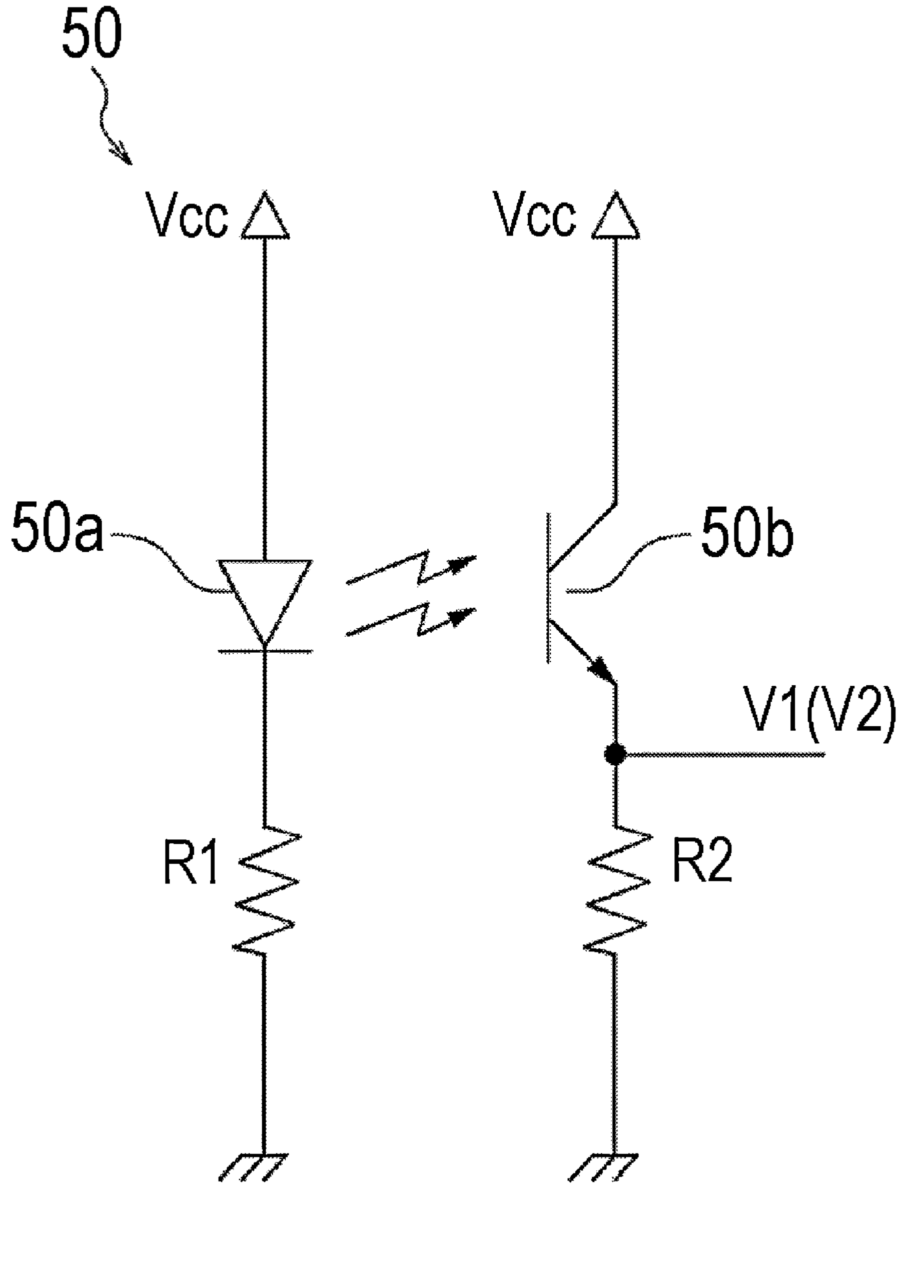
FIG. 37 is a diagram illustrating an example of a circuit configuration of a toner remaining amount detection sensor 50.

As illustrated in FIG. 37, the light emitting portion 50*a* uses an LED as a light emitting element, and the light receiving portion 50*b* uses a phototransistor that is brought into an ON state with light from the LED as a light receiving element. A switch, which is not illustrated, is provided between the light emitting portion 50*a* and a power source voltage Vcc, a voltage from the power source voltage Vcc is applied to the light emitting portion 50*a*, and the light emitting portion 50*a* is brought into a conductive state, by bringing the switch into an ON state. On the other hand, a switch, which is not illustrated, is also provided between the light receiving portion 50*b* and the power source voltage Vcc, and the light receiving portion 50*b* is brought into a conductive state with a current in accordance with the detected amount of light by bringing the switch into an ON state. Note that for the light emitting portion 50*a* and the light receiving portion 50*b*, a halogen lamp or a fluorescent lamp may be applied to the light emitting portion 50*a*, and a photodiode or an avalanche photodiode may be applied to the light receiving portion 50*b*, for example.

The power source voltage Vcc and a current restriction resistance R1 are connected to the light emitting portion 50*a*, and the light emitting portion 50*a* emits light with a current determined by the current restriction resistance R1. The light emitted from the light emitting portion 50*a* passes through the optical path Q as illustrated in FIG. 12B and is received by the light receiving portion 50*b*. The power source voltage Vcc is connected to a collector terminal of the light receiving portion 50*b*, and a detection resistance R2 is connected to an emitter terminal. The light receiving portion 50*b* that is a phototransistor receives the light emitted from the light emitting portion 50*a* and issues (outputs) a signal (current) with an intensity in accordance with the amount of received light. The signal is converted into a voltage V1 by the detection resistance R2 and is input to an A/D conversion portion 95 of the control portion 90 (see FIG. 38).

A CPU 91 of the control portion 90 determines whether or not the light receiving portion 50*b* has received light from the light emitting portion 50*a* on the basis of the input voltage level. The CPU 91 of the control portion 90 calculates the amount of toner (the amount of developer) in the developer container 32 on the basis of a length of time during which the light receiving portion 50*b* detects light when the toner in the developer container 32 is stirred for a specific period of time by the stirring member 34 and intensity of received light. In other words, a ROM 93 stores a table capable of outputting the toner remaining amount from the light receiving time and the light intensity when the toner is conveyed by the stirring member 34 in advance, and the control portion 90 predicts/calculates the toner remaining amount on the basis of an input to the A/D conversion portion 95 and the table.

More specifically, a time during which the optical path Q is blocked by the toner conveyed by the stirring member 34 when the stirring member 34 rotates once, that is, a time during which the light receiving portion 50*b* does not detect the light from the light emitting portion 50*a* changes depending on the toner remaining amount. Moreover, the intensity of the received light of the light receiving portion 50*b* also changes depending on the toner remaining amount.

In other words, when the toner remaining amount is small, the time during which the light receiving portion 50*b* receives light is extended as compared with a case where the toner remaining amount is large, and intensity of the light received by the light receiving portion 50*b* also increases. The control portion 90 can determine the toner remaining amount level on the basis of such a light receiving time and intensity of received light of the light receiving portion 50*b*.

Figures 39A, 39B:
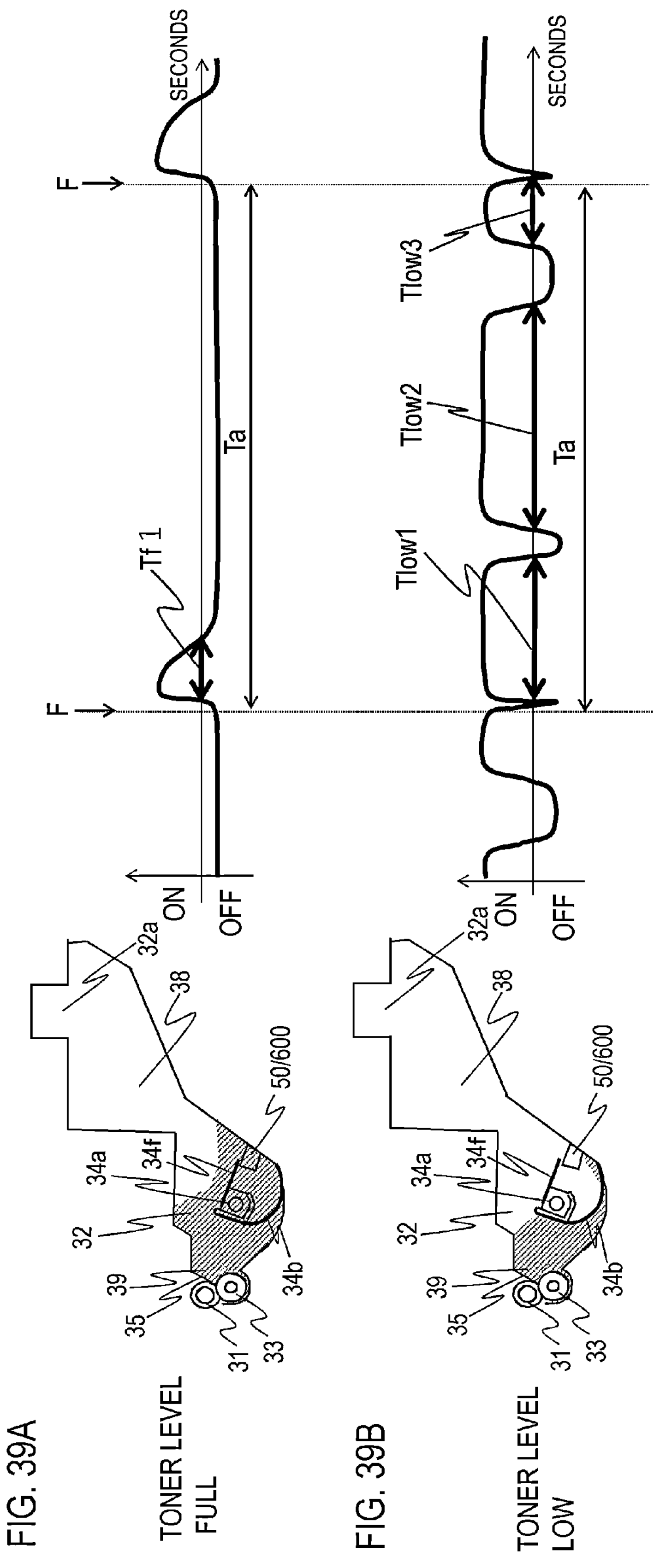
FIGS. 39A and 39B are diagrams illustrating voltage waveforms at a toner level FULL and a toner level Low.

Concerning Voltage Waveform Based on Light Receiving Signal of Light Receiving Portion 50*b* and Method of Detecting Remaining Amount A method of detecting the toner remaining amount according to the present embodiment will be explained using FIGS. 39A and 39B. FIGS. 39A and 39B are a sectional image diagram of the developer container 32 immediately before the cleaning member 34*f* passes through the toner remaining amount detection sensor 50 and a diagram illustrating a waveform of a voltage value obtained by converting the light receiving signal of the light receiving portion 50*b* by the A/D conversion portion 95. A timing F of a voltage value waveform corresponds to a timing immediately before the cleaning member 34*f* passes through the toner remaining amount detection sensor 50 in the sectional image diagram. FIG. 39A illustrates a case of a toner level FULL as a case where the amount of toner in the developer container 32 is large, and FIG. 39B illustrates a case of a toner level LOW as a case where the amount of toner in the developer container 32 is small. Note that the hatched portion in the sectional image diagram schematically represents the toner that is present in the developer container 32.

In the present embodiment, the maximum value of the voltage value after the light receiving signal of the light receiving portion 50*b* is converted into the voltage value by the A/D conversion portion 95 is assumed to be 3.3 V, a time during which a voltage of equal to or greater than 1 V is detected is defined as an ON time, and a time (period of time) during which a voltage of less than 1 V is detected is defined as an OFF time (OFF period). Then, a scheme of determining the toner remaining amount on the basis of the proportion of the ON time in the time Ta of one cycle at which the stirring member 34 rotates once is employed. In the present embodiment, the time Ta of one cycle at which the stirring member 34 rotates once is 1.0 seconds. Among these, the toner remaining amount is determined to be smaller as the proportion of the ON time increases, and the toner remaining amount is determined to be larger as the proportion of the ON time decreases.

The toner level FULL illustrated in FIG. 39A is a state where the amount of toner is large and a surface of the toner agent is constantly located above the light guide 600 of the toner remaining amount detection sensor 50. Therefore, the light receiving portion 50*b* receives light and an ON time Tf1 is achieved only at a timing when the cleaning member 34*f* cleans the optical path surfaces 612 and 622 of the light guide 600, and an OFF time is achieved immediately after the cleaning member 34*f* passes therethrough. This is because the toner that is present in the surroundings of the light guide 600 of the toner remaining amount detection sensor 50 immediately blocks the optical path Q. The ON time Tf1 in the present embodiment is 0.1 to 0.2 seconds (the arrow portion in the drawing), and the toner level is determined to be FULL when the ON time in one cycle time Ta (1.0 seconds) is 0.1 to 0.2 seconds.

At the toner level LOW illustrated in FIG. 39B, the amount of toner is small, a time during which the light guide 600 of the toner remaining amount detection sensor 50 is not blocked is longer, and thus the ON time is longer as compared with the case of the toner level FULL. In the present embodiment, a total time of the ON time at the toner level LOW corresponding to the arrow portions Tlow1 to Tlow3 in the drawing is 0.6 to 0.7 seconds. On the other hand, the OFF time is formed by a timing at which the cleaning member 34*f* passes, a timing at which the toner conveyed by the stirring member 34 blocks the light guide 600 of the toner remaining amount detection sensor 50, and the like. The phase detection of the stirring member 34 in the present embodiment is performed by reading the OFF time, and a specific method will be described in the section of "Detection of Voltage Waveform and Phase of Stirring Member Based on Light Receiving Signal of Light Receiving Portion 50*b*". In the present embodiment, the toner level is determined to be LOW when the ON time in the one cycle time Ta (1.0 seconds) is 0.6 to 0.7 seconds.

Detection of Voltage Waveform and Phase of Stirring Member Based on Light Receiving Signal of Light Receiving Portion 50*b*

In the present embodiment, the control portion 90 functions as a phase detecting unit that detects the phase of the stirring member 34 on the basis of a timing at which an OFF period when the amount of detection light of the toner remaining amount detection sensor 50 is below a predetermined amount of light occurs. The vane portion 34*b* of the stirring member 34 is configured to block an optical path of light emitted from the light emitting element of the toner remaining amount detection sensor 50 inside the toner accommodating chamber 32*d* once in one cycle at which the stirring member 34 rotates about the rotation axis once. The phase of the stirring member 34 can be detected on the basis of a timing at which the OFF time of the longest time occurs in a plurality of OFF periods during which the amount of detection light of the toner remaining amount detection sensor 50 is below a predetermined amount of light occurring in one cycle of the rotation of the stirring member 34. Here, the OFF period of the longest time is a period during which intensity of a signal issued by the light receiving element of the toner remaining amount detection sensor 50 is continuously below a threshold value for a longest period of time in one cycle of the stirring member 34. A plurality of periods during which the intensity of the signal issued by the light receiving element is continuously below the threshold value are included in one cycle of the stirring member 34. It is possible to detect the rotation phase of the stirring member 34 on the basis of an end timing of a first period of the longest period during which the intensity of the signal issued by the light receiving element is below the threshold value from among the plurality of periods. Note that only one second period during which the intensity of the signal of the light receiving element is above the threshold value may be included, and the remaining long time may correspond to a period during which the intensity of the signal is below the threshold value in a case where the toner remaining amount is large. In such a case, it is possible to detect the rotation phase of the stirring member 34 on the basis of a start timing of the second period during which the signal intensity is above the threshold value.

The OFF period of the longest time includes a period during which the vane portion 34*b* of the stirring member 34 blocks the optical path of the detection light of the toner remaining amount detection sensor 50. In other words, the plurality of OFF periods also include an OFF period (second OFF period) including a period during which the cleaning member 34*f* blocks the optical path of the detection light, for example, and the OFF period (first OFF period) including a period during which the vane portion 34*b* blocks the optical path of the detection light is longer than the OFF period.

Details of a change timing of each voltage value waveform and a specific method of detecting the phase of the stirring member 34 in the present embodiment will be explained using FIGS. 40A to 40E. In the present embodiment, phase detection of the stirring member 34 is performed on the basis of a voltage value waveform for determining the toner remaining amount level as described above. A feature of the method of detecting a phase in the present embodiment is that the voltage waveform based on the light receiving signal of the light receiving portion 50*b* includes an OFF time Toffa that is longer than an OFF time Toff1 at a timing at which the cleaning member 34*f* passes and Toff2 which is equal to or less than 0.1 seconds and occurs in the form of noise.

FIGS. 40B to 40E illustrate voltage waveform and sectional image diagrams in a state at the toner level LOW as an example. The hatched portion in the sectional image diagrams represents the toner that is present in the developer container 32. Details of the change timings of the voltage waveforms at other toner remaining amount levels will be described later in the section of "Concerning Detection of Toffa and Phase in Cases of Other Toner Remaining Amounts".

Figures 40A, 40B, 40C, 40D, 40E:
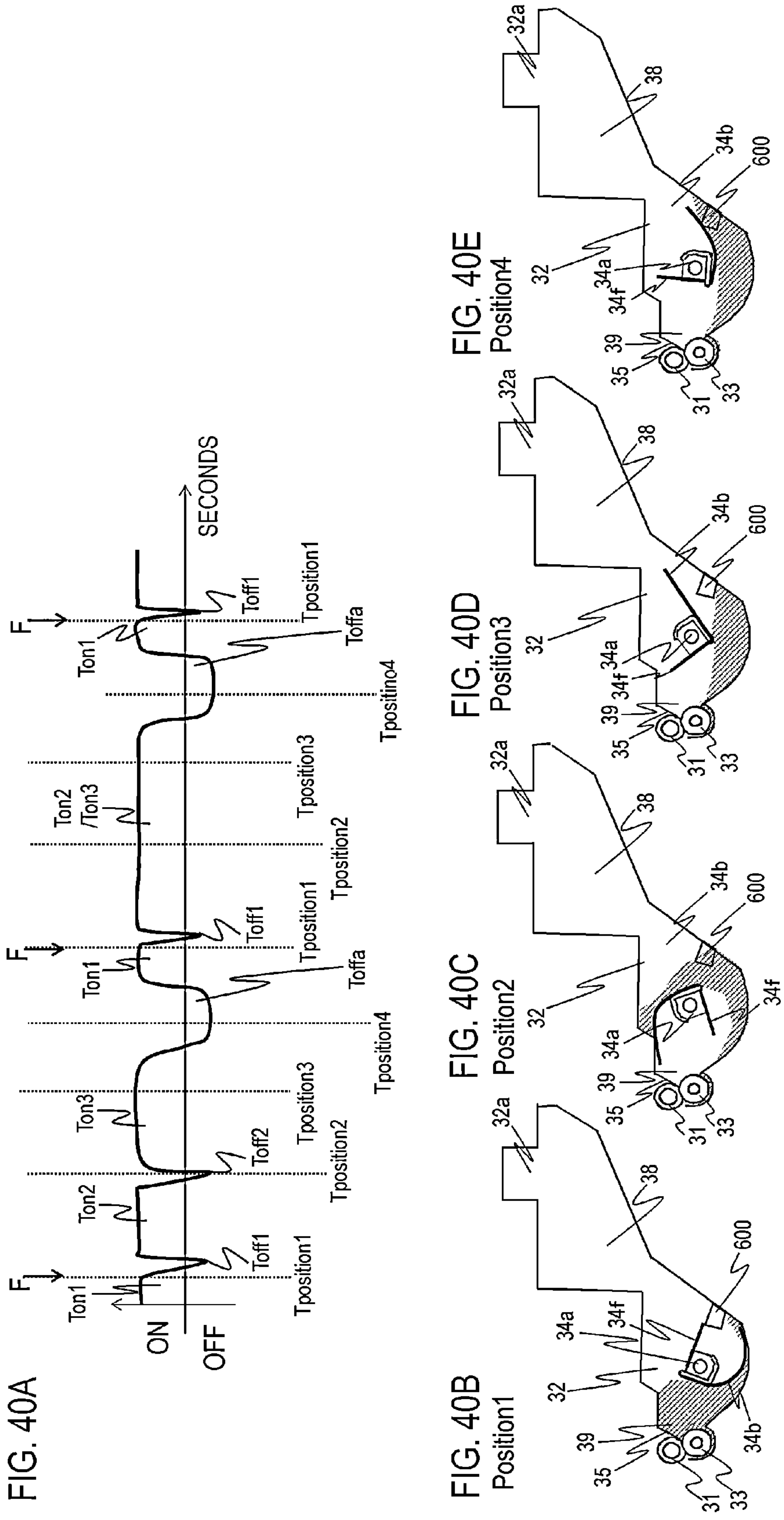
FIGS. 40A to 40E are sectional views illustrating a voltage waveform at the toner level Low and a phase of the stirring member at each timing.

FIG. 40A illustrates a voltage waveform based on the light receiving signal of the light receiving portion 50*b*, and FIGS. 40B to 40E illustrate how the toner in the developer container 32 is like at each timing at which the light receiving signal changes.

FIG. 40B illustrates a state immediately before the cleaning member 34*f* cleans the light guide 600. The voltage waveform corresponds to a timing Tposition1. As illustrated in FIG. 40B, the amount of toner is small, and the light guide 600 is not blocked with the toner, and the voltage waveform is thus in the ON state (Ton1) at the toner level LOW. Once the cleaning member 34*f* passes, a time Toff is instantaneously (equal to or less than 0.1 seconds) achieved by the cleaning member 34*f* itself blocking the light (Toff1). Next, the ON time continues until a timing Tposition2 at which the toner blocks the light guide 600 (Ton2).

FIG. 40C illustrates a state at a timing when the rotation of the vane portion 34*b* proceeds from the state in FIG. 40B and the toner conveyed on the vane portion 34*b* drops in the downward direction due to a gravity and passes through the light guide 600. This corresponds to a timing Tposition3 in the voltage waveform. In regard to this timing, the timing at which the toner starts to slip down and the amount of the toner slipping down differ every time. For example, there are a case where the light guide 600 is instantaneously (equal to or less than 0.1 seconds) blocked and an OFF time is detected (Toff2) and a case where the toner does not completely block the light guide 600 and the ON time is detected as it is.

FIG. 40D illustrates a state at a timing where the toner on the vane portion 34*b* has completely dropped and most of the toner in the developer container 32 is present at the bottom portion. This corresponds to a timing Tposition4 in the voltage waveform. The surface of the toner agent is located below the light guide 600, and the light guide 600 is not blocked even in a state where most of the toner in the developer container 32 is present at the bottom portion at the toner amount at the toner level LOW. Therefore, the ON time continues (Ton3).

FIG. 40E illustrates a timing at which the light guide 600 is blocked with the toner by the vane portion 34*b* cutting into the surface of the toner agent and lifting the surface of the toner agent. This corresponds to a timing T(e) in the voltage waveform. The OFF time (Toffa) occurring at this timing is not an OFF time in the form of instantaneous noise of equal to or less than 0.1 seconds like Toff1 and Toff2 and is the longest OFF time in one cycle of the rotation of the vane portion 34*b*.

Here, the longest OFF time in one cycle of the rotation of the stirring member 34 is defined as a time Toffa. In the present embodiment, the time Toffa is about 0.2 to 0.4 seconds with the toner amount at the toner level LOW. Note that the time Toffa changes depending on the amount of toner. Cases of other amounts of toner will be explained later.

Finally, once the vane portion 34*b* passes through the light guide 600 and starts to feed the toner at the bottom portion of the developer container 32 to the developing opening portion 39, the toner blocking the light guide 600 drops to the bottom portion of the developer container 32, and there becomes no toner blocking the light guide 600. Therefore, the OFF time Toffa ends and returns to the ON time (Ton1). The state in FIG. 40B in which the cleaning member 34*f* passes is recovered again and is repeated.

Here, Toff1 occurring at the timing when the cleaning member 34*f* cleans the light guide 600 is a voltage change occurring due to the cleaning member 34*f* passing and occurs every cycle. Therefore, it may be possible to detect the phase of the stirring member 34 with reference to the timing at which the cleaning member 34*f* passes through the light guide 600 depending on the configuration and the toner remaining amount in the developer container. However, it is difficult to distinguish Toff1 occurring at the timing at which the cleaning member 34*f* cleans the light guide 600 from Toff2 at which the light is blocked when the toner on the vane portion 34*b* drops onto the light guide 600, and further, an OFF time occurring as noise such as an instantaneous OFF time caused by the toner flying inside the developer container 32 due to impact caused by the toner dropping to the bottom portion of the developer container 32 until the state in FIG. 40D is achieved from the state in FIG. 40C.

Thus, the OFF time Toffa from a timing before the vane portion 34*b* passes through the light guide 600 to a timing immediately after the vane portion 34*b* passes through the light guide 600 is used as an OFF time that is a long OFF time that can be easily distinguished from the OFF time occurring as noise, to detect the phase of the stirring member 34 in the present embodiment. As described above, the OFF time Toffa from the timing before the vane portion 34*b* passes through the light guide 600 to the timing immediately after the vane portion 34*b* passes through the light guide 600 is a time from the timing at which the vane portion 34*b* cuts into the surface of the toner agent and lifts the surface of the toner agent and the light guide 600 is thereby blocked with the toner to a timing at which the vane portion 34*b* passes through the light guide 600. Toffa is longer than Toff1 and Toff2 and stably forms the OFF time every cycle, and it is thus possible to stably detect the phase of the stirring member 34. In this manner, it is possible to detect the phase of the vane portion 34*b* by detecting the longest OFF time Toffa in one cycle of the stirring member 34 from the voltage waveform based on the received signal from the light receiving portion 50*b*.

Figures 41A, 41B, 41C, 41D:
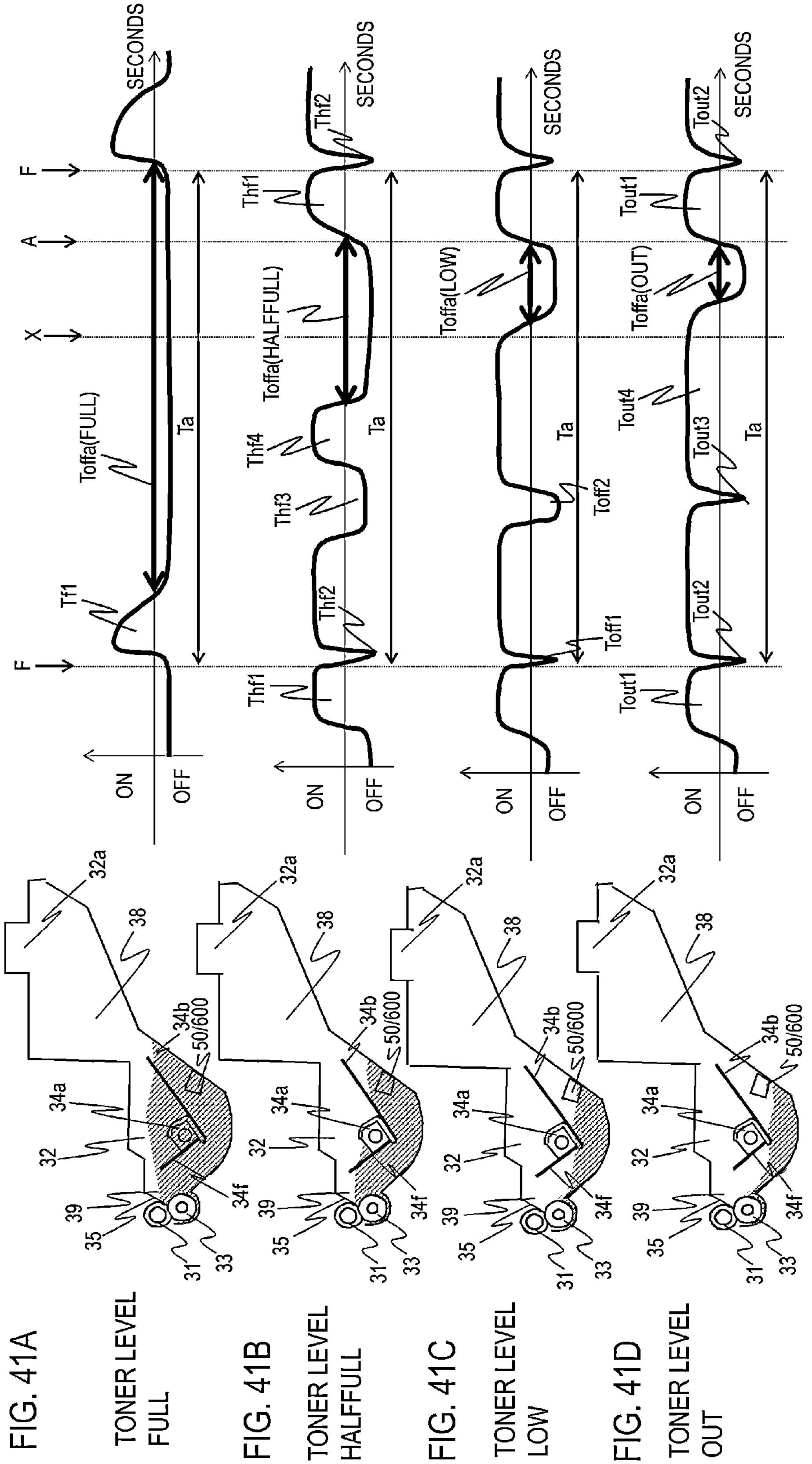
FIGS. 41A to 41D are diagrams illustrating a voltage waveform at each toner level.

Concerning Detection of Toffa and Phase in Cases of Other Toner Remaining Amounts FIGS. 41A to 41D illustrate voltage waveforms based on the received signal from the light receiving portion 50*b* at each toner level corresponding to various toner remaining amounts and sectional views inside the developer container 32 before the vane portion 34*b* passes through the light guide 600 (the timing X in the drawing of the voltage waveforms). FIG. 41A illustrates a voltage waveform at the toner level FULL, FIG. 41B illustrates a voltage waveform at the toner level HALFFULL, FIG. 41C illustrates a voltage waveform at the toner level LOW, and FIG. 41D illustrates a voltage waveform at the toner level OUT. Note that in the present embodiment, the toner level OUT represents the remaining amount by which am image failure such as fogging is unlikely to occur even if transformation or burying of an additive occurs and charge performance is degraded in the toner due to the repeated image forming process, rather than a state where the toner becomes completely empty. The toner level FULL corresponds to the amount of toner of the maximum capacity of the developer container 32. The toner level HALFFULL corresponds to the amount of toner when half the amount obtained by subtracting the amount at the toner level OUT from the amount at the toner level FULL has been consumed. The toner level LOW corresponds to the amount of toner when 95% of the amount obtained by subtracting the amount at the toner level OUT from the amount at the toner level FULL has been consumed, that is, the remaining 5%.

Also, Table 1 shows, in a list, OFF times occurring during a time Ta of one cycle of the stirring member at each toner level.

TABLE 1

List of OFF times at each toner level

| Toner level | Toffa | | |
|---|---|---|---|
| FULL | 0.8 to 0.9 seconds | — | — |
| HALFFULL | 0.5 to 0.7 seconds | Thf2: 0.1 seconds | Thf3: 0.3 seconds |
| LOW | 0.25 seconds | Toff1: 0.1 seconds | Toff2: 0.15 seconds |
| OUT | 0.2 seconds | Tout2: 0.1 seconds | Tout3: 0.1 seconds |

The toner level FULL in FIG. 41A is a state where the amount of toner is large and the surface of the toner agent is constantly above the light guide 600. Therefore, although the light receiving portion 50*b* receives light and ON time Tf1 is achieved only at the timing at which the cleaning member 34*f* cleans the optical path surfaces 612 and 622 of the light guide 600, the toner that is present in the surroundings of the light guide 600 immediately blocks the optical path Q, and the OFF time is achieved after the cleaning member 34*f* passes.

The longest OFF time Toffa (FULL) in one cycle of the stirring member 34 at the toner level FULL is 0.8 to 0.9 seconds in the present embodiment. In a case where Toffa is equal to or greater than 0.8 seconds in 1.0 seconds which is the time Ta of one cycle of the stirring member 34, only the ON time in one cycle can be determined to occur at the timing F of the cleaning. It is possible to determine that the timing F of the ON time is the timing at which the cleaning member 34*f* passes through the light guide 600.

At the toner level HALFFULL in FIG. 41B, the surface of the toner agent is located above the light guide 600 in a state where a most part of the toner is present at the bottom portion in the developer container 32. However, in a state where the vane portion 34*b* have sent out the toner at the bottom portion to the developing opening portion 39, a state where the amount of toner blocking the light guide 600 is small is achieved. Therefore, an ON time Thf1 is achieved at the timing at which the toner is sent out to the developing opening portion 39 by the vane portion 34*b*. Thereafter, although the cleaning member 34*f* instantaneously blocks the light guide 600 and an OFF time Thf2 is detected since the cleaning member 34*f* passes through the light guide 600, the ON time is immediately recovered.

Next, when the toner placed on the vane portion 34*b* drops to the bottom portion of the developer container 32 while blocking the optical path Q of the light guide 600, an OFF time Thf3 is detected. After the toner drops to the bottom portion, there is a case where there becomes no toner blocking the optical path Q while dropping and an ON time Thf4 is formed, or there is a case where light blocking is continued due to the toner or the like flying due to landing on the bottom portion.

Once the toner completely drops to the bottom portion of the developer container 32, the surface of the toner agent comes above the light guide 600, the toner blocks the light guide 600, the OFF time is thus achieved, and an OFF time Toffa (HALFFULL) is formed until a timing immediately after the vane portion 34*b* passes through the light guide 600. Once the vane portion 34*b* passes through the light guide 600 and starts to send out the toner at the bottom portion of the developer container 32 to the developing opening portion 39, a state where the amount of toner blocking the light guide 600 is small is achieved, and the ON time Thf1 is achieved.

The longest OFF time Toffa (HALFFULL) in one cycle of the stirring member 34 at the toner level HALFFULL is 0.5 seconds in the present embodiment. However, in a case where Thf4 does not occur, and the OFF time at Thf3 continues, Toffa (HALFFULL) is achieved at and after Thf3, and the longest OFF time Toffa (HALFFULL) in one cycle of the stirring member 34 at the toner level HALFFULL is 0.7 seconds in the present embodiment. The phase of the stirring member 34 does not depend on the length of Toffa, and it is possible to determine that the timing A at which switching from the OFF time Toffa to ON occurs is the timing at which the vane portion 34*b* passes through the light guide 600.

Since the toner level LOW in FIG. 41C is as described above, detailed description will be omitted. Similarly to the toner level HALFFULL, the OFF time Toffa is formed from a timing before the vane portion 34*b* passes through the light guide 600 to a timing immediately after the vane portion 34*b* passes through the light guide 600. However, since the timing at which the toner starts to block the light guide 600 by the vane portion 34*b* lifting the surface of the toner agent is later than that at the toner level HALFFULL, Toffa (LOW) is shorter than Toffa (HALFFULL).

The longest OFF time Toffa (LOW) in one cycle of the stirring member 34 at the toner level LOW is 0.25 seconds in the present embodiment. As for the phase of the stirring member 34, it is possible to determine that the timing at which the switching from the OFF time Toffa (LOW) to ON is achieved is the timing at which the vane portion 34*b* passes through the light guide 600.

At the toner level OUT in FIG. 41D, the surface of the toner agent is located below the light guide 600, and the light guide 600 is not blocked, even in a state where a most part of the toner in the developer container 32 is present at the bottom portion. Since a state where the amount of toner blocking the light guide 600 is small is achieved similarly to those at the toner level HALFFULL and at the toner level LOW in the state where the vane portion 34*b* has sent out the toner at the bottom portion to the developing opening portion 39, an ON time Tout1 is achieved. Although once the cleaning member 34*f* instantaneously blocks the light guide 600, an OFF time Tout2 is detected, the ON time is immediately recovered.

Next, the light guide 600 is blocked at a timing at which the toner on the vane portion 34*b* drops, and an OFF time Tout3 is detected. Since the amount of toner is small as a whole, the amount of toner placed on the vane portion 34*b* is also small, and the dropping timing occurs later than those at the toner level HALFFULL and at the toner level LOW. Also, the light guide 600 may not be completely blocked, and the OFF time may not be achieved at this timing. Although the toner or the like flying inside the developer container 32 may instantaneously block the light guide 600 until all the toner completely drops to the bottom portion of the developer container 32, an ON time Tout4 continues in most cases. Since the surface of the toner agent is below the light guide 600 at the toner level OUT even after the toner completely drops to the bottom portion of the developer container 32, the ON time Tout4 is continued.

Thereafter, the present embodiment includes the time Toffa during which the vane portion 34*b* lifts the surface of the toner agent to block the light guide 600. Once the vane portion 34*b* passes through the light guide 600 and starts to send out the toner at the bottom portion of the developer container 32 to the developing opening portion 39, a state where the amount of toner blocking the light guide 600 is small is achieved, and the ON time Tout1 is thus achieved.

The longest OFF time Toffa (OUT) in one cycle of the stirring member 34 at the toner level HALFFULL is 0.2 seconds in the present embodiment. As for the phase of the stirring member 34, it is possible to determine that the timing A at which switching from the OFF time Toffa (OUT) to ON is achieved is the timing at which the vane portion 34*b* passes through the light guide 600.

Sequence Diagram of Detection of Toffa and Determination of Phase of Stirring Member 34

Figure 42:
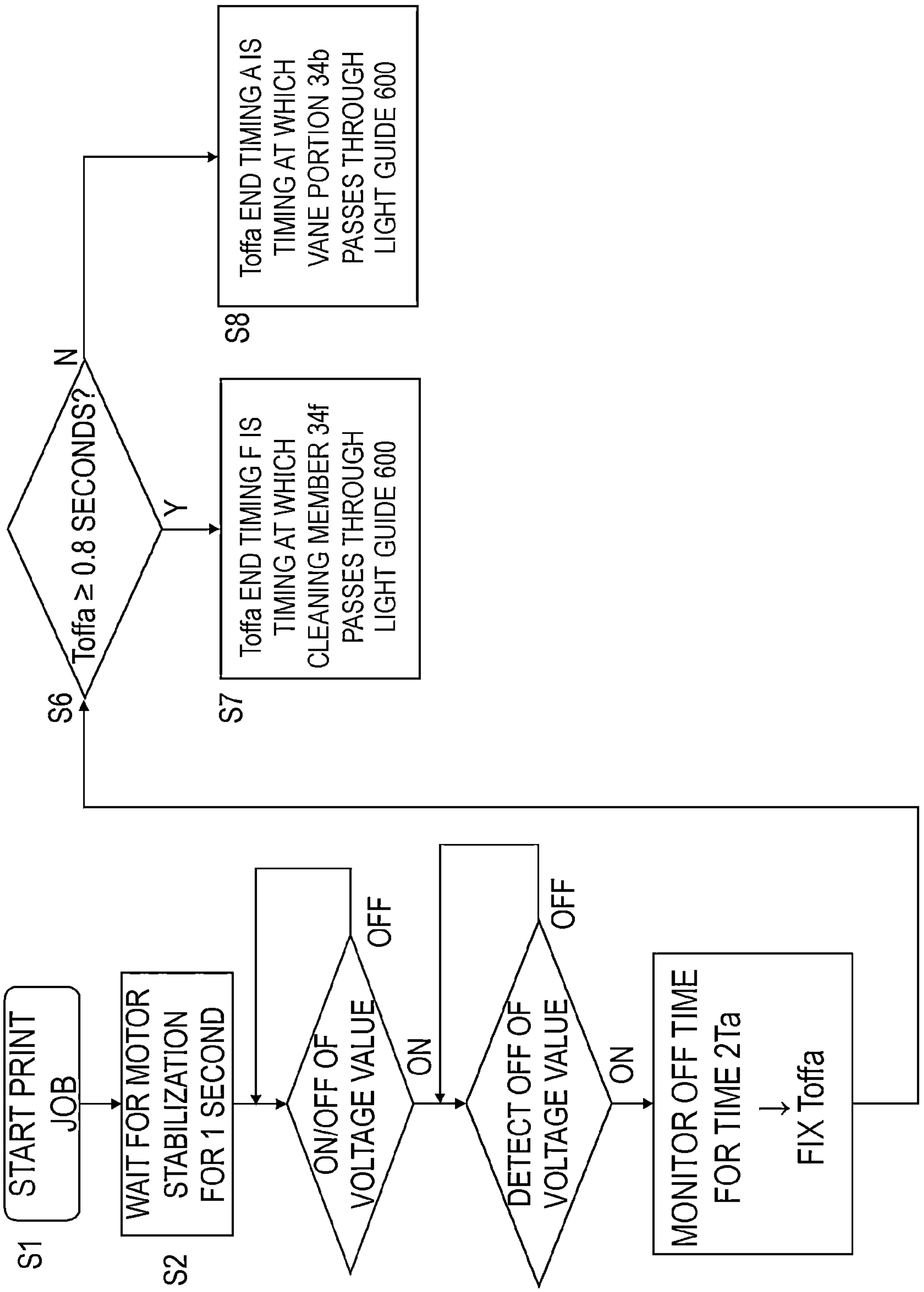
FIG. 42 is a flowchart of phase detection.
Figure 43A:
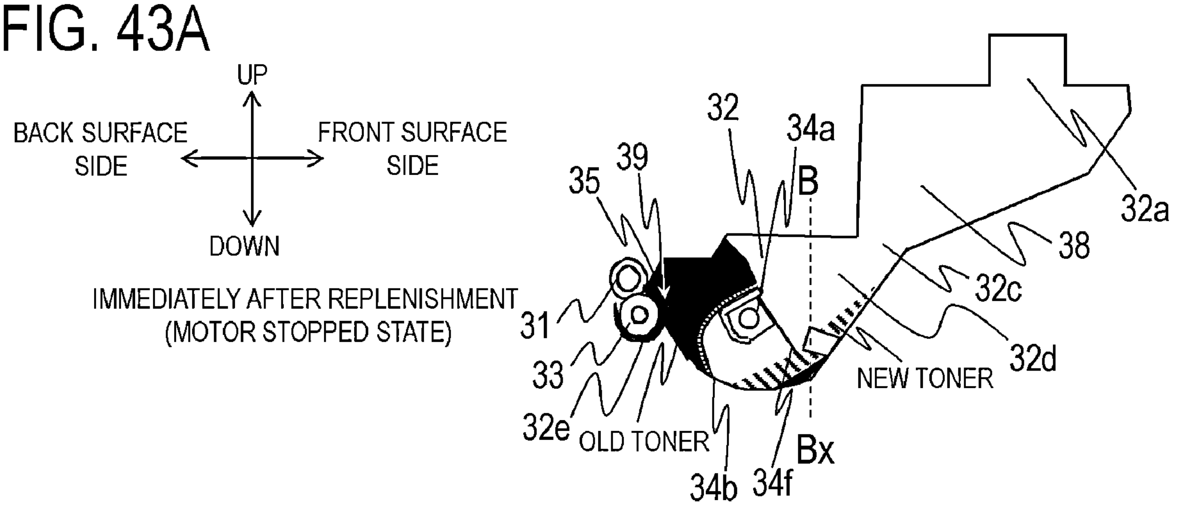
FIGS. 43A to 43D are diagrams illustrating a phase of the stirring member 34 at the time of replenishment and toner mixed states achieved by later stirring.
Figure 43B:
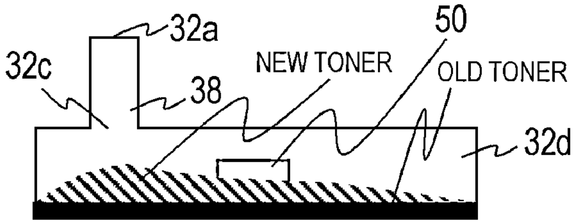
Figure 43C:
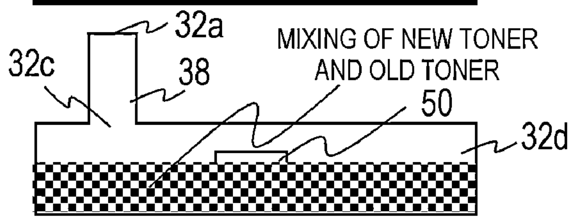
Figure 43D:
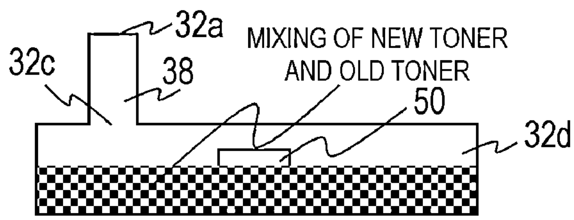
Figure 44A:
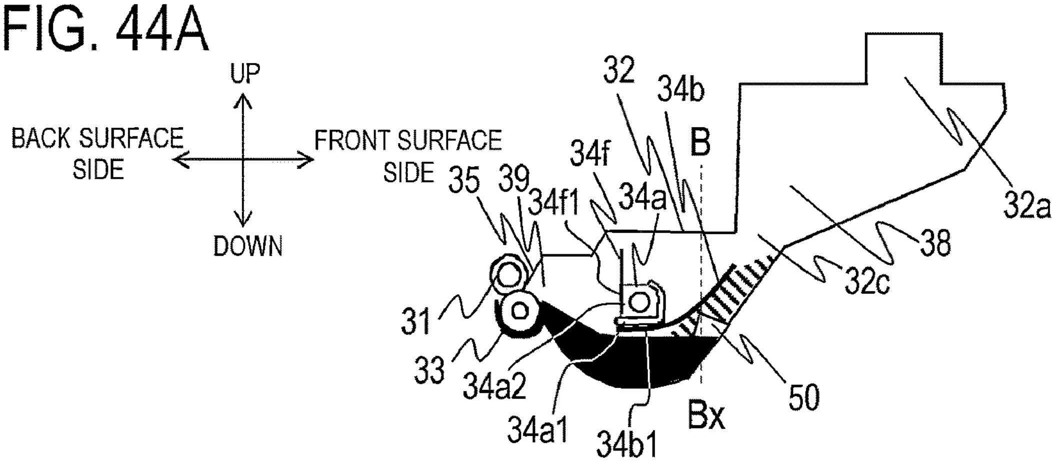
FIGS. 44A to 44D are diagrams illustrating a phase of the stirring member 34 at the time of replenishment and toner mixed states achieved by later stirring.
Figure 44B:
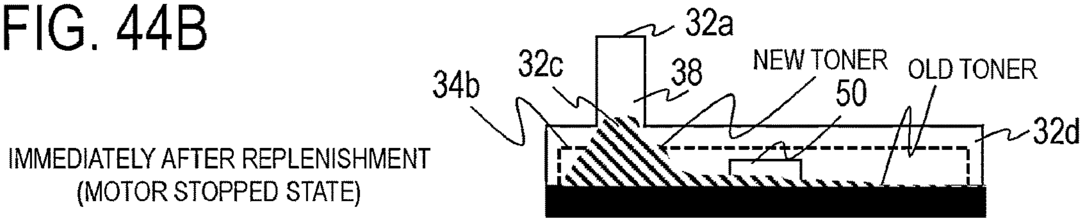
Figure 44C:
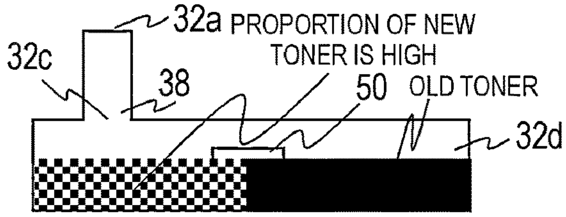
Figure 44D:
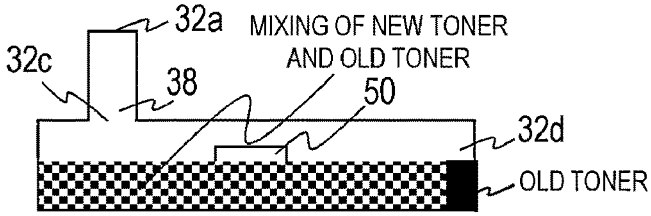

FIG. 42 illustrates an example of a sequence for detecting Toffa and determining a phase of the stirring member 34 in the present embodiment.

In S1, a print job is started. In S2, stabilization of a speed of the drive motor is waited for 1 second. Note that the time during which the stabilization of the speed of the drive motor is waited may not be 1 second.

In S3 and S4, a timing at which the OFF time is started during repetition of the ON time and the OFF time. In S3, in a case where a voltage value after the light receiving signal of the light receiving portion 50*b* is converted into the voltage value by the A/D conversion portion 95 (hereinafter, referred to as a voltage value) is less than 1 V and the OFF time is being continued at the timing at which the drive motor is stabilized, a timing at which the voltage becomes equal to or greater than 1 V and the ON time is achieved next time is waited. In a case where the voltage value becomes equal to or greater than 1 V and the ON time is achieved, or in a case where the ON time is originally being continued, the processing proceeds to S4. In S4, a timing at which the voltage value becomes less than 1 V and the OFF time is detected next time is detected, and the processing proceeds to S5.

In S5, a time Toff during which the OFF time continues without interruption is stored in the CPU 91 of the control portion 90. This is performed for the time 2Ta corresponding to two cycles of the rotation of the stirring member 34. The longest time Toff in the time 2Ta is stored as Toffa in the CPU 91.

In S6 and S7, the phase of the stirring member 34 is determined as follows in accordance with the time Toffa. In the present embodiment, in a case where Ta is 1.0 seconds, and Toffa in Ta is equal to or greater than 0.8 seconds, it is possible to determine that the only ON time in one cycle occurs at the timing F of the cleaning. Therefore, the processing proceeds to S7 when Toffa is equal to or greater than 0.8 seconds in S6, and it is determined that the ON timing at which Toffa ends is the timing at which the cleaning member 34*f* passes through the light guide 600. In a case where Toffa is less than 0.8 seconds, the processing proceeds to S8. The OFF time Toffa of less than 0.8 seconds means a time from a timing before the vane portion 34*b* passes through the light guide 600 to a timing immediately after the vane portion 34*b* passes through the light guide 600, and it is determined that the ON timing at which Toffa ends is a timing at which the vane portion 34*b* passes through the light guide 600.

Concerning Phase Control of Stirring Member and Toner Remaining Amount Detection Performance at the Time of Replenishment of New Toner Here, an example in which it is possible to shorten a time taken for toner remaining amount detection determination will be explained as an example of a purpose for performing phase detection by using FIGS. 43A to 43D and 44A to 44D. Specifically, a mixed state of a toner replenished from the toner pack 40 (hereinafter, a new toner) and a toner that is present in the developer container 32 before the replenishment (hereinafter, an old toner) is made to approach a uniform state more quickly by controlling the phase of the stirring member 34 at the time of replenishment of the toner from the toner pack 40.

Transformation of the toner and burying of an additive may occur because the toner is continuously stirred in the developer container 32 or through a repeated image forming process particularly in a cleanerless configuration as in the present embodiment. Therefore, there is a trend that charge performance of the old toner is lower than that of the new toner.

On the other hand, the surfaces 612 and 622 of the light guide 600 inside the developer container 32 are charged due to repeated rubbing between the toner and the stirring member 34. For this reason, the new toner with higher charge performance is more likely to adhere to the surfaces 612 and 622 of the light guide 600, a state where the surfaces 612 and 622 of the light guide 600 are constantly blocked by the toner is achieved, and toner remaining amount detection accuracy is thus likely to be degraded.

Therefore, in a case where the mixed state between the old toner in the developer container 32 and the new toner after the replenishment is not uniform, the toner is likely to adhere to the surface 612 and the surface 622 of the light guide 600 due to a part where a large amount of new toner is present in a localized manner, and remaining amount detection accuracy may be degraded.

However, in a case where the mixed state of the old toner in the developer container 32 and the new toner after the replenishment becomes uniform, the part where a large amount of new toner is present in a localized manner is eliminated, and it is possible to achieve a state where the concentration of the new product toner with respect to the total amount of toner is low as a whole. Therefore, it is possible to curb adhesion of the new product toner to the surfaces 612 and 622 of the light guide 600.

In other words, if the new toner after the replenishment is brought into a state where mixing with the old toner in the developer container is almost uniform, it is possible to curb degradation of remaining amount detection accuracy.

FIGS. 43A to 43D and 44A to 44D represent how the new toner (hatched portion) replenished from the toner pack 40 and the old toner (solid portion) in the developer container 32 are like in the present embodiment in an image seen from the section side and in an image seen from the front surface side. These represent how the new toner actually enters the space when observed from the front surface side by preparing a transparent developer container and using a yellow toner as the new toner of the toner pack 40 and a black toner as the old toner in the transparent developer container 32.

The expression "immediately after the replenishment" described here means a timing before the stirring member 34 rotates. Also, the image diagram seen from the front surface side also shows states immediately after the replenishment, 5 seconds (after 5 rotations of the stirring member 34), and 20 seconds (after 20 rotations of the stirring member 34) after the stirring member 34 starts to rotate. The solid portion indicates a part where the proportion of the old toner is high, the hatched portion indicates a part where the proportion of the new toner is high, and the dot portion indicates a part where the new toner and the old toner are satisfactorily mixed.

FIGS. 43A to 43D illustrate a case where the new toner is replenished when the position of the distal end of the vane portion 34*b* of the stirring member 34 at the time of the replenishment is at the furthest location from the introduction port 32*c*. FIGS. 44A to 44D illustrate a case where the new toner is replenished when the position of the distal end of the vane portion 34*b* of the stirring member 34 at the time of the replenishment is located on the side of the introduction port 32*c*.

As illustrated in FIGS. 43A to 43D, in a case where the position of the distal end of the vane portion 34*b* is at the furthest location from the introduction port 32*c* at the time of the replenishment of the new toner, the new toner is ejected to a sufficiently broad space. Then, the new toner spreads like landslide in the longitudinal direction as well while dropping to the bottom surface in the developer container 32. In other words, the replenished new toner reaches the entire region in the longitudinal direction. This is because the old toner in the developer container 32 is in a state where the old toner is pushed to the side of the developing opening portion 39, there is thus substantially no old toner on the bottom surface of the developer container 32, and a state where a broad space is open when seen from the introduction port 32*c* has been achieved.

However, on the other hand, in a case where the position of the distal end of the vane portion 34*b* is located on the side of the introduction port 32*c* at the time of the replenishment of the new toner as illustrated in FIGS. 44A to 44D, the new toner is ejected to a narrow space at one time, and the new toner thus remains immediately below the replenishing port 32*a* in the toner replenishing path from the replenishing port 32*a* in the projecting portion 38 to the introduction port 32*c*.

As illustrated in FIGS. 44A to 44D, in the state where the new toner remains near the introduction port 32*c* in the longitudinal direction inside the developer container 32, it takes time of equal to or greater than 20 seconds (20 rotations of the stirring member 34) for the new toner to reach the entire longitudinal region even when the stirring member 34 is driven.

In other words, in the case as illustrated in FIGS. 44A to 44D, the state where the new toner remains on the side of the introduction port 32*c* is not solved, and the part where the proportion of the new toner is high is present at the timing of 5 seconds later (5 rotations of the stirring member 34) (wave line portion). When the state where the part where the proportion of the new toner is high is present at the center portion where the toner remaining amount detection sensor 50 is located in this manner, the new toner adheres to the surfaces 612 and 622 of the light guide 600 inside the developer container 32, and remaining amount detection accuracy is degraded. It is necessary to perform the remaining amount detection after elapse of 20 seconds or more during which the new toner reaches the entire longitudinal region, and a user is made to wait for a state where the image forming apparatus 1 can be used after the replenishment of the new toner.

Thus, since the replenishment is performed when the position of the distal end of the vane portion 34*b* is at the furthest location from the introduction port 32*c* as illustrated in FIGS. 43A to 43D, the phase of the stirring member 34 is controlled as follows in the present embodiment. In other words, the phase of the stirring member 34 (vane portion 34*b*) is detected from the voltage waveform based on the received signal of the light receiving portion 50*b* of the toner remaining amount detection sensor 50 and controls the phase of the stirring member 34 (vane portion 34*b*) at the timing before the replenishment.

In a state illustrated in FIGS. 43A to 43D, the new toner instantaneously enters the developer container 32 in a spreading manner in the longitudinal direction at the timing immediately after the replenishment, and the new toner and the old toner are thus uniformized in about 5 seconds (5 rotations of the stirring member 34). It is possible to curb a phenomenon that the new toner adheres to the light guide 600 even at the timing of 5 seconds, the remaining amount detection accuracy is unlikely to be degraded, and it is thus possible to shorten the time during which the user is made to wait after the replenishment.

Effects and Advantages of Present Embodiment

According to the present embodiment, the OFF time at the timing at which the cleaning member 34*f* passes and an OFF time Toffa that is longer than the OFF time occurring in the form of noise are provided and detected in the waveform of the optical detection signal of the toner remaining amount detection sensor 50. It is thus possible to recognize the phase of the stirring member 34.

In the present embodiment, the timing at which the light guide 600 is blocked by the toner by the vane portion 34*b* cutting into the surface of the toner agent and lifting the surface of the toner agent is a start timing of the OFF time Toffa. Then, the OFF time Toffa is continued until a timing immediately after the vane portion 34*b* passes through the light guide 600. The time Toffa is longer than the OFF time occurring in the form of noise, the OFF time is stably formed every rotation, and it is thus possible to stably detect the phase of the stirring member 34.

It is possible to recognize the phase of the stirring member 34 and to thereby achieve the following matters, for example.

For example, replenishment is performed when the position of the distal end of the vane portion 34*b* is at the furthest location from the introduction port 32*c* at the time of replenishment of the new toner from the toner pack 40. Since the new toner instantaneously enters the developer container 32 in a spreading manner in the longitudinal direction at the timing immediately after the replenishment by the replenishment being performed when the position of the distal end of the vane portion 34*b* is at the furthest location from the introduction port 32*c*, there is an effect that it is possible to shorten the time taken to uniformly mix the new toner and the old toner. Since it is possible to curb the phenomenon that the new toner adheres to the light guide 600 through uniformization of the mixed state of the new toner and the old toner, it is possible to curb degradation of remaining amount detection accuracy. It is possible to perform the toner remaining amount detection without making the user wait until after the replenishment.

For example, stopping for a long period of time in a state where the cleaning member 34*f* abuts the light guide 600 is avoided. If the cleaning member 34*f* is left for a long period of time in a state where the cleaning member 34*f* abuts the light guide 600, it is considered that the shape of the cleaning member 34*f* is fixed in a deformed state due to deformation over time. Such a deformed cleaning member 34*f* may have a degraded cleaning ability, the toner entering the part between the cleaning member 34*f* and the light guide 600 may stick to the light guide 600, and the remaining amount detection accuracy may be degraded. The degradation of remaining amount detection accuracy is curbed by stopping the motor drive at a position where the cleaning member 34*f* does not abut the light guide 600.

As described above, according to the present embodiment, it is possible to accurately recognize the phase of the stirring member 34 and to thereby freely select the phase when the motor drive is stopped.

Also, not only reflection of the result of detecting the phase of the stirring member 34 to the stop position of the motor drive but also a control change for the image forming apparatus may be performed using the phase of the stirring member 34 at the time of stopping according to the present embodiment. In a case where the new toner is replenished when the position of the distal end of the vane portion 34*b* is located near the introduction port 32*c*, it takes time to uniformly mix the new toner and the old toner as compared with a case where the toner is replenished at another location, and toner remaining amount detection accuracy may be degraded. Thus, in a case where replenishment is performed when the position of the distal end of the vane portion 34*b* is located near the introduction port 32*c*, it is preferable to adjust the timing at which the toner remaining detection determination is performed. In other words, a time Tk required for the new toner and the old toner to be uniformly mixed may be obtained in advance, and the timing at which the toner remaining amount detection determination is performed may be set after the time Tk elapses after the replenishment.

In addition, in a case where stopping in a state where the cleaning member 34*f* abuts the light guide 600 is detected, a voltage value based on the light receiving signal of the light receiving portion 50*b* and a conversion formular for the toner remaining amount detection determination may be adjusted by expecting a state where the cleaning member 34*f* is deformed and a probability that the state where the light guide 600 is contaminated by the toner continues for a while.

Others

As a reason that it takes time for the new toner to be mixed with the old toner, a relationship between how broad the toner accommodating chamber 32*d* of the developer container 32 is and how broad the toner path of the projecting portion 38 is (how broad the introduction port 32*c* opening in the inner wall surface of the toner accommodating chamber 32*d* is) is also conceivable. It is possible to state that this problem is likely to occur when the width of the projecting portion 38 (introduction port 32*c*) is small with respect to the entire longitudinal length of the toner accommodating chamber 32*d*.

In the present embodiment, a configuration in which the introduction port 32*c* is opened at a position near a side of one end of the toner accommodating chamber 32*d* in the longitudinal direction as described above is adopted as a configuration with which it is possible to replenish the toner from the apparatus upper surface in consideration of usability and as a configuration with which the replenishing port does not block the laser light for exposure. In the present embodiment, the longitudinal length of the toner accommodating chamber 32*d* is 230 mm, the longitudinal width (inner diameter) of the introduction port 32*c* is 40 mm, and the length from the longitudinal center of the toner accommodating chamber 32*d* to the width center of the introduction port 32*c* is 86 mm. In regard to the longitudinal position of the introduction port 32*c* with respect to the toner accommodating chamber 32*d*, there is a concern that the new toner is unlikely to reach both longitudinal end portions depending on the phase of the stirring member 34 even with the configuration in which the introduction port 32*c* is opened at the longitudinal center of the toner accommodating chamber 32*d*, for example. In other words, the configuration that may cause the above problem is not limited to the above configuration illustrated in the present embodiment.

Also, in a case where a sufficient distance is secured between the distal end of the vane portion 34*b* and the introduction port 32*c* even when there is a sufficiently wide vertical width (height direction) of the toner accommodating chamber 32*d* and the distal end of the vane portion 34*b* is located in the first quadrant, that is, in a case where there is a space which the new toner can enter in a spreading manner in the longitudinal direction on the side further outward than the trajectory that the stirring member 34 (the distal end of the vane portion 34*b*) follows, the aforementioned problem regarding the time required for mixing of the new toner and the old toner is unlikely to occur. However, in order to provide such a space, it is necessary to have a wide vertical width for the toner accommodating chamber 32*d*, and there is a concern that the size of the apparatus main body increases. The developer container 32 in the present embodiment is configured such that the introduction port 32*c* is opened at the same height as the region with which the distal end of the vane portion 34*b* can come into contact in the upper surface of the inner wall surface of the toner accommodating chamber 32*d* and the size of the apparatus main body does not increase in the apparatus up-down direction. In other words, according to the present embodiment, it is possible to shorten the time required to mix the new toner and the old toner in the configuration of the small-sized developer container 32 with which it is not possible to secure a sufficient distance between the distal end of the vane portion 34*b* of the stirring member 34 located in the first quadrant and the introduction port 32*c*.

Twelfth Embodiment

Figure 45A:
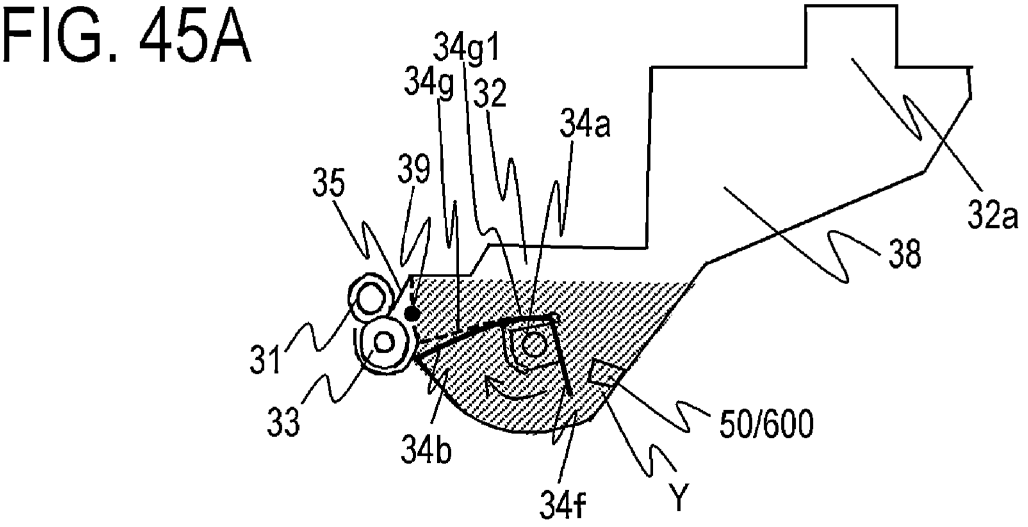
FIGS. 45A to 45C are sectional views of a developer container 32 according to a twelfth embodiment.
Figure 45B:
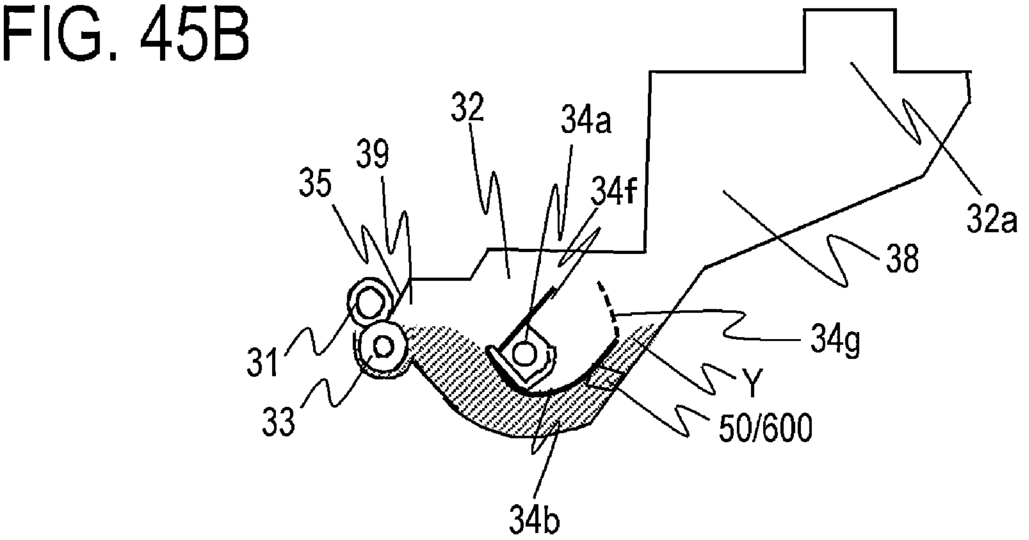
Figure 45C:
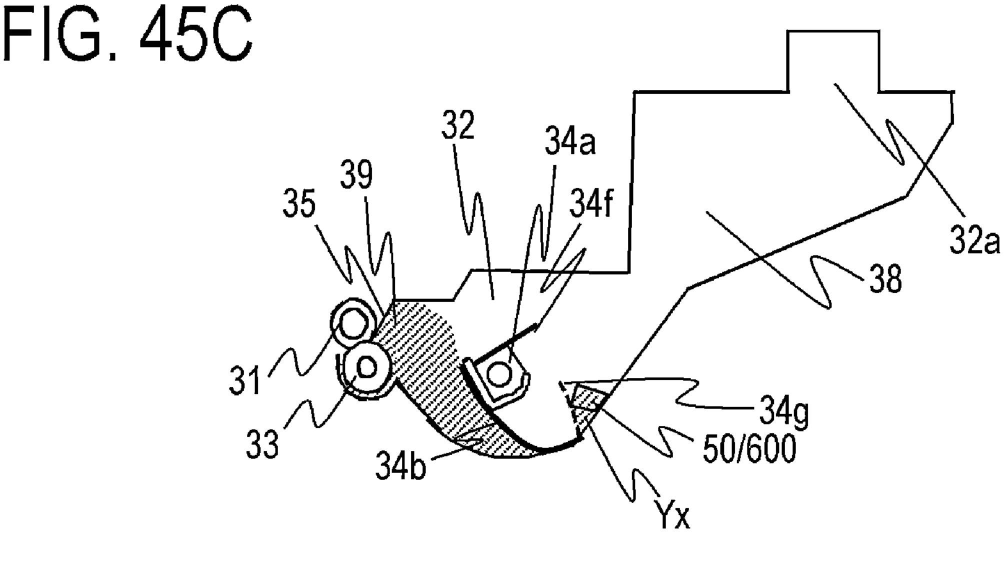

Next, a twelfth embodiment of the present invention will be explained. FIGS. 45A to 45C are sectional views of a developer container 32 according to the twelfth embodiment. In the twelfth embodiment, a T seal 34*g* (the broken line in the drawing) as a sheet member that follows and rotates with a vane portion 34*b* and is longer in a radial direction and softer than the vane portion 34*b* is installed. A longest Toffa in one cycle (Ta time) of a stirring member 34 can be extended as compared with a case where the T seal 34*g* is not installed, by the T seal 34*g* being installed. It is possible to obtain a system that is capable of having further significant contrast with an OFF time of equal to or less than 0.1 seconds that occurs in the form of noise, is strong against noise, and is capable of stably detecting the phase of the stirring member 34.

Note that the configurations other than that the installation of the T seal 34*g* are the same as the configurations of the image forming apparatus explained in the first embodiment, and description of the common configurations will be omitted.

The T seal 34*g* in the twelfth embodiment also serves as a sealing member that is for covering a developing opening portion 39 and sealing a toner in a toner accommodating chamber to prevent an unused image forming apparatus 1 from leaking with the toner during logistics in the present embodiment.

The T seal (third sheet) 34*g* is attached to a stirring shaft 34*a* to overlap the vane portion 34*b*. The T seal (third sheet) 34*g* has one end portion (fifth end portion) in the direction of the rotation axis included in an attachment portion (third attachment portion) 34*g*1 attached to the stirring shaft 34*a* and the other end portion side (sixth end portion side) bonded to the inner wall of a toner accommodating chamber 32*d* to seal the developing opening portion 39 when the image forming apparatus or the developer container 32 is new. When seen in the direction (longitudinal direction) of the rotation axis of the stirring shaft 34*a*, the short-side length of the T seal 34*g* measured from an attachment portion 34*g*1 in the direction in which the T seal 34*g* extends from one end portion to the other end portion is longer than the length of the vane portion 34*b*. Also, the longitudinal width of the T seal 34*g* is wider than the longitudinal width of the vane portion 34*b*.

The T seal 34*g* obtained by laminating an easy-peel film made of multiplayer polystyrene on a PET sheet with a thickness of about 45 μm, for example, is used. As the easy peel film, AE300 manufactured by Sumika Plastech Co., Ltd., for example, is used.

FIG. 45A is a schematic sectional view of the developer container 32 in the unused image forming apparatus 1. The T seal 34*g* has a wider width in the longitudinal direction than the developing opening portion 39, completely covers the developing opening portion 39 with the easy-peel-side surface, and performs sealing to prevent the toner in the developer container 32 from leaking out to the side of the developing roller 31 and the supply roller 33 in the unused image forming apparatus 1. The T seal 34*g* is attached to the stirring shaft 34*a* of the stirring member 34 and peels off from the developing opening portion 39 in a winding-up manner through rotation of the stirring shaft 34*a* when a power source of the image forming apparatus 1 is turned on for the first time at a user's place and a motor starts to rotate. The T seal 34*g* is configured such that the T seal 34*g* rotates along with the vane portion 34*b* while following the stirring shaft 34*a* of the stirring member 34 as it is.

FIG. 45B represents a schematic sectional view of the developer container 32 immediately before the distal end of the vane portion 34*b* passes through the light guide 600 when the amount of toner in the developer container 32 has decreased near a toner level LOW. When the vane portion 34*b* enters the surface of the toner agent, a part where the surface of the toner agent is lifted (the portion Y in the drawing) occurs.

FIG. 45C is a schematic sectional view of the developer container 32 immediately after the distal end of the vane portion 34*b* passes through the light guide 600, which is a state achieved after the state in FIG. 45B further proceeds. Although the toner at the portion Y illustrated in FIG. 45B is not conveyed by the vane portion 34*b* and drops toward a bottom portion of the developer container 32 due to gravity, the twelfth embodiment has a configuration including the T seal 34*g*, and the optical path of the light guide 600 is blocked with a toner Yx with the T seal 34*g* working as a support. Therefore, the OFF time continues with the toner Yx even after the vane portion 34*b* passes through the light guide 600.

Figures 46A, 46B:
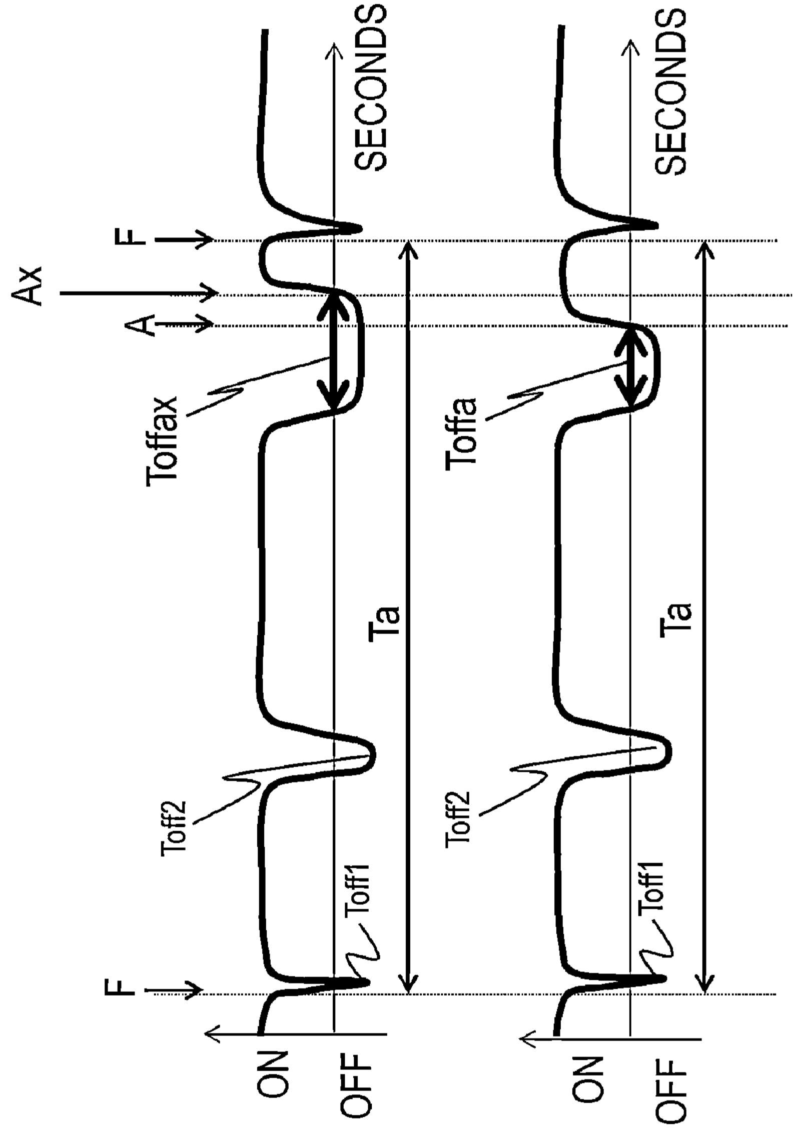
FIGS. 46A and 46B are diagrams illustrating voltage waveforms according to the twelfth embodiment.

FIG. 46A is a voltage waveform based on a light receiving signal of a light receiving portion 50*b* in the twelfth embodiment. For comparison, FIG. 46B illustrates a voltage waveform in the eleventh embodiment. The longest OFF time Toffax in one cycle (Ta time) of the stirring member 34 in the twelfth embodiment is longer than Toffa in the eleventh embodiment. Since there becomes no toner blocking the light guide 600 after a timing A at which the vane portion 34*b* passes through the light guide 600, ON time is reached in the eleventh embodiment. However, the toner Y blocking the light guide 600 is present by the T seal 34*g* being installed even after the vane portion 34*b* passes through the light guide 600, and the OFF time is continued in the twelfth embodiment. In other words, the OFF time continues until a timing Ax with a slight delay from the timing A at which the vane portion 34*b* passes through the light guide 600, and the Toffax time is extended in the twelfth embodiment. The longest continuous OFF time Toffax in one cycle of the stirring member 34 at the toner level LOW is 0.3 seconds in the twelfth embodiment.

Even with the configuration in which the OFF time (Toff1, Toff2, and the like in the drawing) repeatedly occurs by the optical path of the light guide 600 being blocked a plurality of times in one cycle of the stirring member 34 with the cleaning member 34*f*, the toner conveyed by the vane portion 34*b*, or the like as in the present embodiment, it is possible to obtain a system that is strong against noise and is capable of stably detecting the phase of the stirring member 34 by providing a longer characteristic OFF time than the other OFF times.

Thirteenth Embodiment

Figure 47:
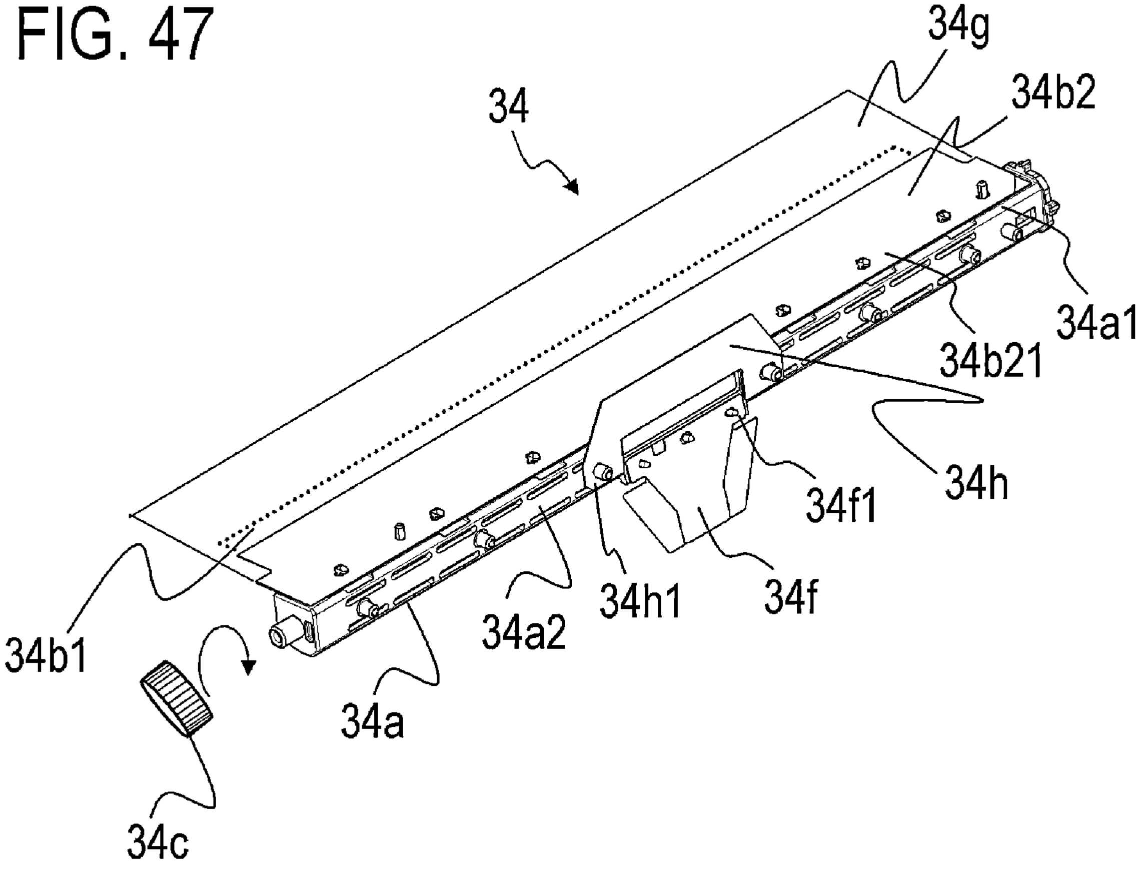
FIG. 47 is a perspective view of a stirring member 34 according to a thirteenth embodiment.

Next, a thirteenth embodiment of the present invention will be explained. FIG. 47 is a perspective view of a stirring member 34 according to the thirteenth embodiment. In the thirteenth embodiment, two vane portions 34*b* are present. The first vane portion 34*b*1 is a member similar to the vane portion 34*b* illustrated in the eleventh and twelfth embodiments. A T seal 34*g* and a second vane portion 34*b*2 which is the second one are installed such that they overlap the first vane portion 34*b*1. The T seal 34*g* is illustrated in a state where it is stretched straight.

The second vane portion 34*b*2 has a shorter length in a radial direction than the first vane portion 34*b*1. While the first vane portion 34*b*1 plays a role in entering a developing opening portion 39 and conveying a toner to a developing portion, the second vane portion 34*b*2 is set to have a length with which the second vane portion 34*b*2 can enter a part immediately below a light guide 600 and plays a role in scraping off the toner that is likely to remain immediately below the light guide 600.

Also, in the present embodiment, an auxiliary member (fourth sheet) 34*h* is installed over a cleaning member 34*f*, at a position of a phase of 180° with respect to the cleaning member 34*f*, and at the center portion in the longitudinal direction where an optical path of the light guide 600 is installed. The auxiliary member 34*h* plays a role in curbing noise generation during an ON time after the cleaning member 34*f* cleans the light guide 600.

The auxiliary member 34*h* is attached to the stirring shaft 34*a* such that the auxiliary member 34*h* overlaps a cleaning member 34*f*. When seen in the longitudinal direction, the direction in which the auxiliary member 34*h* extends from the stirring shaft 34*a* is a direction opposite to the direction in which the cleaning member 34*f* extends from the stirring shaft 34*a*. Also, one end portion (seventh end portion) of the auxiliary member 34*h* in a direction of a rotation axis is included in an attachment portion (fourth attachment portion) 34*h*1 attached to the stirring shaft 34*a*, and the auxiliary member 34*h* is configured such that the length from one end portion to the other end portion (eighth end portion) is shorter than the cleaning member 34*f*. Specifically, the auxiliary member 34*h* is configured to have a length with which the optical path of the light guide 600 is not blocked. Moreover, the longitudinal width of the auxiliary member 34*h* is about the same as the longitudinal width of the cleaning member 34*f* and is narrower than the longitudinal width of the vane portion 34*b*. The auxiliary member 34*h* may be configured of a sheet that is similar to those of the vane portion 34*b* and the cleaning member 34*f*.

Figure 50A:
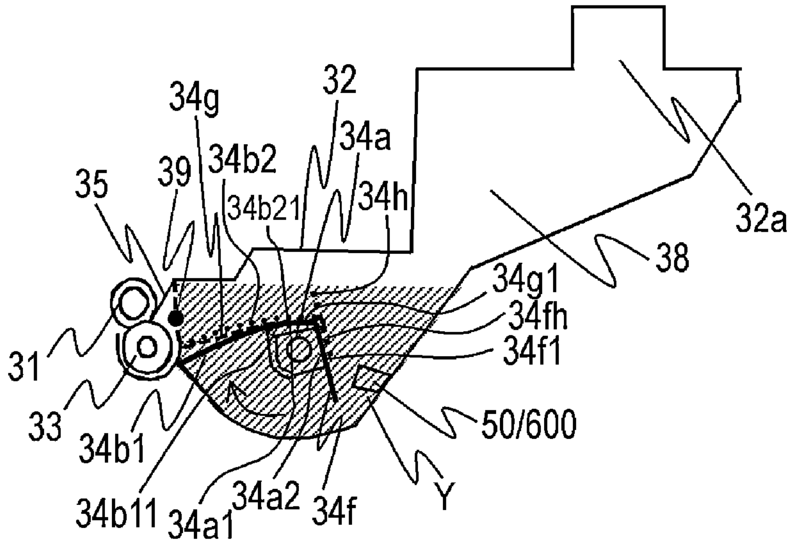
FIGS. 50A to 50C are sectional views of a developer container 32 according to the thirteenth embodiment.
Figure 50B:
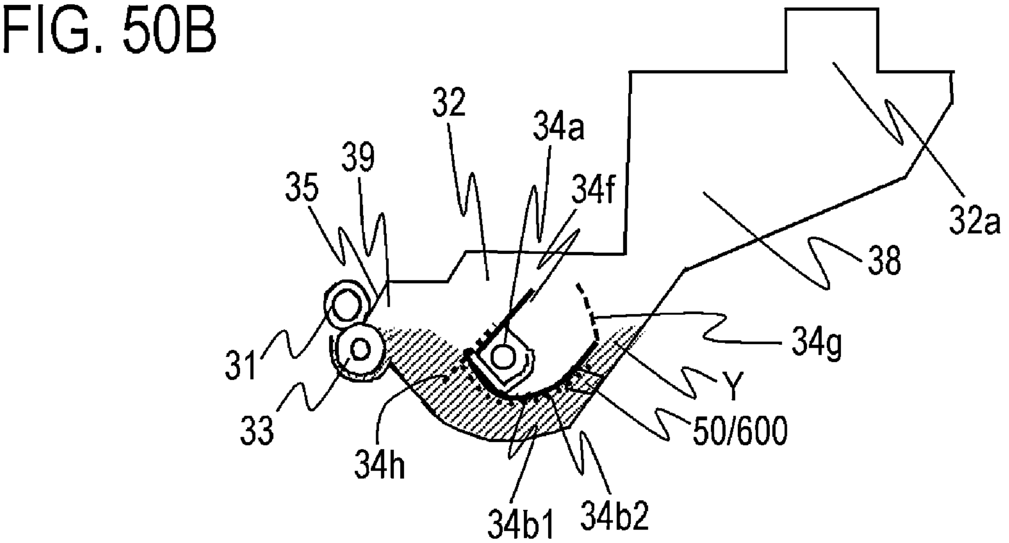
Figure 50C:
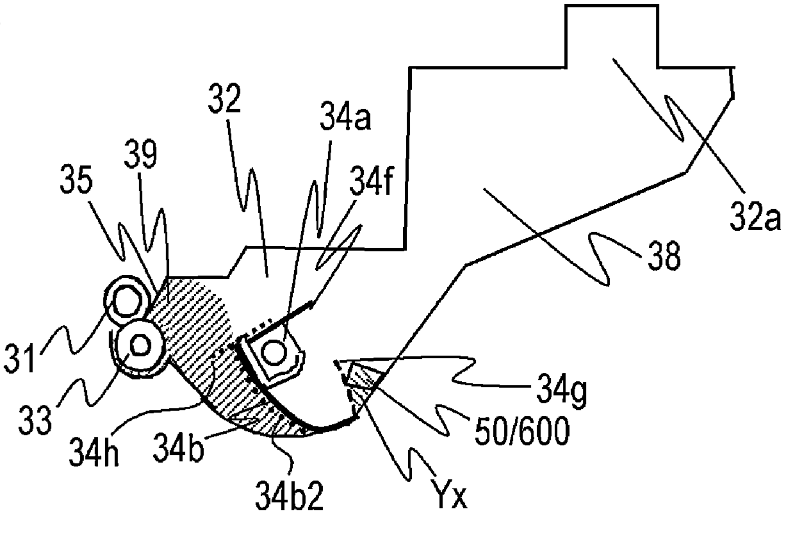

FIGS. 50A to 50C are sectional views of a developer container 32 according to the thirteenth embodiment. FIG.

50A is a schematic sectional view of the developer container 32 in the unused image forming apparatus 1. FIG. 50B is a schematic sectional view of the developer container 32 immediately before a distal end of the vane portion 34*b* passes through the light guide 600 when the amount of toner in the developer container 32 has decreased near a toner level LOW. FIG. 50C is a schematic sectional view of the developer container 32 immediately after the distal end of the vane portion 34*b* passes through the light guide 600, which is a state achieved after the state in FIG. 50B further proceeds.

Figure 48A:
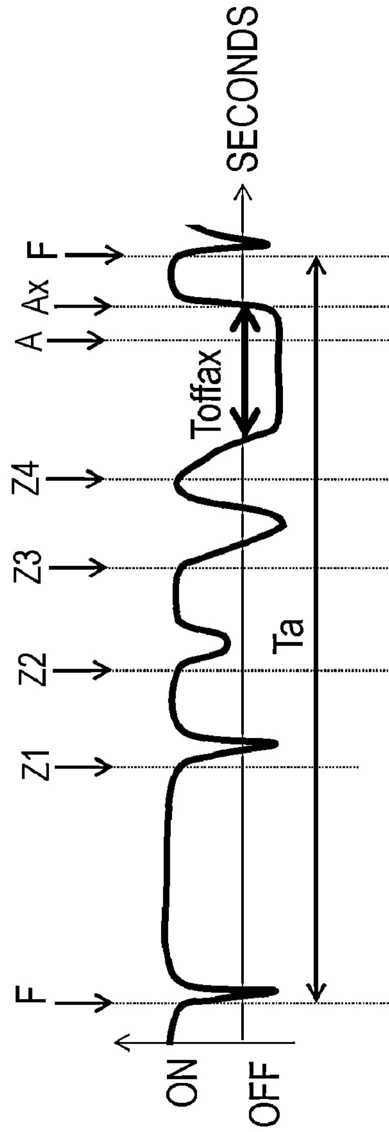
FIGS. 48A to 48C are diagrams illustrating voltage waveforms according to the thirteenth embodiment.
Figure 48B:
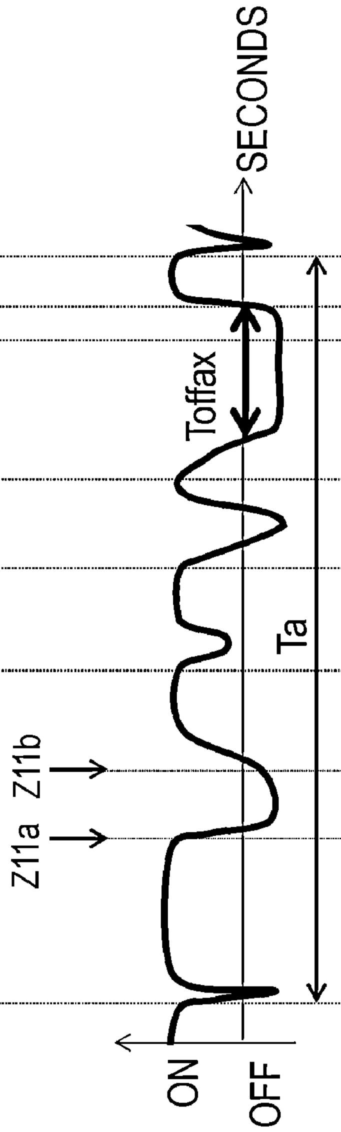
Figure 48C:
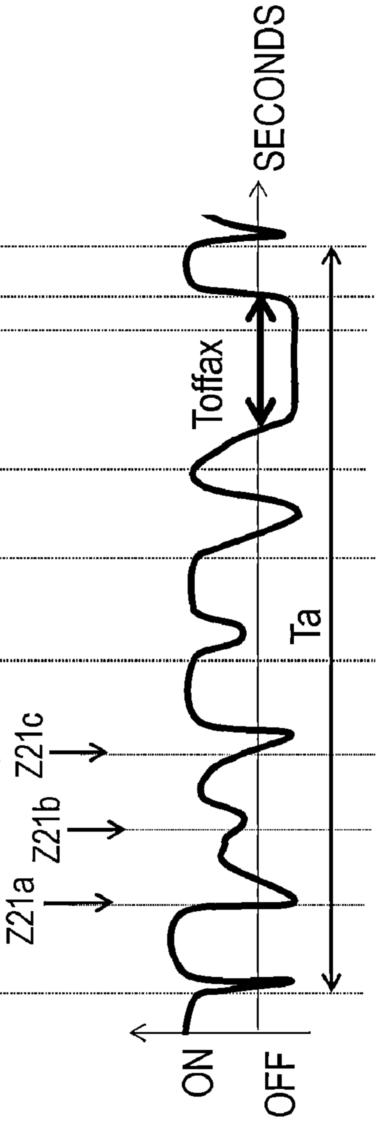

FIG. 48A illustrates an example of a voltage waveform based on a light receiving signal of a light receiving portion 50*b* in the toner level LOW in the thirteenth embodiment. The role of the auxiliary member 34*h* will be explained below. FIGS. 48B and 48C illustrate two patterns of voltage waveforms in configurations of comparative examples in which the auxiliary member 34*h* is not installed for comparison.

As described above, the toner remaining amount in the developer container 32 is determined by a proportion of the ON time in one cycle time Ta of the stirring member 34 in the present embodiment. The ON time after the passing of the cleaning member 34*f* is continued until the toner conveyed by the second vane portion 34*b*2 drops toward the light guide 600 and blocks the optical path. However, the amount of toner dropping from the second vane portion 34*b*2 and the timing at which the toner starts to drop differ on a moment-to-moment basis. Therefore, a waveform as illustrated in FIG. 48B or 48C randomly appears in the configurations of the comparative examples in which the auxiliary member 34*h* is not installed.

FIG. 48B illustrates a voltage waveform in a case where most of the toner carried by the second vane portion 34*b*2 drops from the second vane portion 34*b*2 at one time, for example, in the configuration of the comparative example in which the auxiliary member 34*h* is not installed. After a timing F at which the cleaning member 34*f* passes through the light guide 600, the toner on the second vane portion 34*b*2 drops while flying to the side of the light guide 600 installed on a wall surface of the developer container 32. In this case, the toner that directly blocks the optical path of the light guide 600 is present, and an OFF time is achieved at the timing of Z11*a* in the drawing. After the toner completely drops to the bottom portion of the developer container 32 at one time, the toner flying around the light guide 600 is gradually settled from the timing of Z11*b* in the drawing, and the OFF time is gradually returned to the ON time.

On the other hand, FIG. 48C illustrates a voltage waveform in a case where the toner carried by the second vane portion 34*b*2 gradually drops while following a part near the stirring shaft 34*a* little by little. After the timing F at which the cleaning member 34*f* passes through the light guide 600, there is no toner directly blocking the optical path of the light guide 600, and the ON time is almost reached. However, the toner flying around the light guide 600 is constantly present from the timing Z21*a* at which the toner starts to drop to Z21*c* at which the toner finishes dropping. Therefore, the optical path of the light guide 600 may be instantaneously blocked, and timings (Z21*a*, Z21*b*, Z21*c*) at which the voltage drops in the form of noise occur during the ON time.

Here, FIG. 48A is a voltage waveform in the thirteenth embodiment in which the auxiliary member 34*h* is installed. Since the auxiliary member 34*h* is installed in the present embodiment, the toner on the second vane portion 34*b*2 drops to the auxiliary member 34*h* once at the center portion in the longitudinal direction. Therefore, the toner on the second vane portion 34*b*2 does not directly block the optical path of the light guide 600 after the timing F at which the cleaning member 34*f* passes through the light guide 600, and the ON time continues for a longer period of time as compared with the comparative examples illustrated in FIGS. 48B and 48C. The timing at which the toner blocks the optical path of the light guide 600 when the toner on the auxiliary member 34*h* drops to the bottom portion of the developer container 32 is Z1, and the ON time continues until then. Noise generation as in FIG. 48C is eliminated.

There is a timing Z2 at which the voltage of the voltage waveform drops at a timing at which the second vane portion 34*b*2 passes through the light guide 600 after the timing Z1 at which the toner on the auxiliary member 34*h* blocks the optical path of the light guide 600. The toner on the second vane portion 34*b*2 has already dropped to the bottom portion of the developer container 32 by this timing. Although there is thus substantially no toner blocking the optical path of the light guide 600, the voltage slightly drops when the second vane portion 34*b*2 itself passes through the optical path portion of the light guide 600. Thereafter, the OFF time occurs at a timing Z3 when the toner entering the part between the second vane portion 34*b*2 and the first vane portion 34*b*1 and conveyed falls down to the optical path of the light guide 600. Once the toner drops to the bottom portion of the developer container 32, the OFF time is returned to the ON time. Then, a timing at which the first vane portion 34*b*1 enters a surface of the toner agent remaining on the bottom portion of the developer container 32 and lifts the surface of the toner agent to thereby start blocking the light guide 600 is Z4. In the present embodiment, the T seal 34*g* is also included, OFF time continues until a timing Ax with a slight delay from a timing A at which the first vane portion 34*b*1 passes through the light guide 600, and a Toffax time is extended. The longest continuous OFF time Toffax in one cycle of the stirring member 34 at the toner level LOW is 0.3 seconds in the present embodiment.

Note that the determination of the toner remaining amount level is performed on the basis of the proportion of the ON time in one cycle of the stirring member 34 in the present embodiment as well. Since there is not a large difference between ON times in the voltage waveforms in FIGS. 48B and 48C in the configurations of the comparative example in which the auxiliary member 34*h* is not installed, randomly setting the voltage waveform as in FIG. 48B or 48C does not significantly affect toner remaining amount detection accuracy.

However, it is possible to further curb the influences of unexpected noise generation when the voltage waveform is stabilized as in FIG. 48A. According to the present embodiment, it is possible to curb occurrence of the OFF time of equal to or less than 0.1 seconds that randomly occurs in the form of noise and to provide a clear ON time after the timing F at which the cleaning member 34*f* passes through the light guide 600 with the configuration in which the auxiliary member 34*h* is provided. Furthermore, the T seal 34*g* is included, and it is possible to cause the OFF time to continue even after the timing A at which the first vane portion 34*b*1 passes through the light guide 600 and to provide a clear long OFF time Toffax.

It is thus possible to obtain a system capable of stably performing toner remaining amount level detection and phase detection of the stirring member 34 by curbing noise generation and forming long and clear ON time and OFF time in this manner.

Although the method of performing the phase detection on the basis of the OFF time Toffa during which the light guide 600 is blocked by the toner conveyed by the vane portion 34*b* has been adopted in the present embodiment, the present invention is not limited thereto. For example, the phase may be detected by detecting the number of times the OFF state or the ON state is achieved in one rotation of the stirring member 34, a pattern in which ON and OFF are characteristically repeated, or the like.

Figure 49:
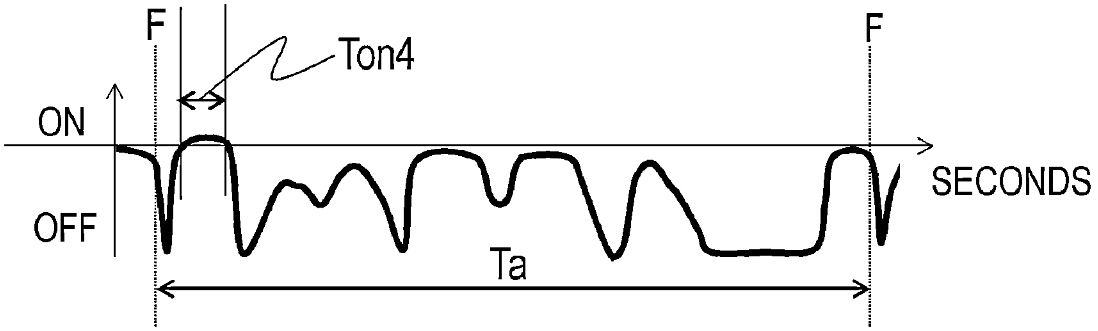
FIG. 49 is a diagram illustrating a voltage waveform according to another embodiment.

Also, although the scheme of determining the ON time and the OFF time using 1 V as a threshold value in regard to the voltage value after the light receiving signal of the light receiving portion 50*b* is converted into a voltage value by the A/D conversion portion 95 and detecting the phase of the stirring member 34 has been explained in the present embodiment, the present invention is not limited thereto. For example, FIG. 49 illustrates a case where the threshold value for the ON time and the OFF time is set to 3 V on the assumption of the same waveform as the voltage waveform in the configuration of the comparative example illustrated in FIG. 48C. In such a case, the ON time occurs only immediately after the timing F at which the cleaning member 34*f* cleans the light guide 600. This is because there is not a little toner flying inside the developer container 32, the optical path of the light guide 600 may be contaminated, and the amount of received light of the light receiving portion 50*b* shows the maximum value only during an ON time Ton4 immediately after the timing F at which the cleaning member 34*f* cleans the light guide 600. In other words, it is possible to detect the phase if the timing F immediately before the ON time Ton4 is shown is a timing at which the cleaning member 34*f* of the stirring member 34 passes through the light guide 600 with this configuration. A characteristic part of the voltage waveform may be able to be detected, and the phase detection of the stirring member 34 may be able to be performed, by appropriately changing the determination threshold value for the ON time and the OFF time.

Note that members accompanying the stirring member 34 illustrated hitherto in the embodiments are examples. For example, there is a case where the optical path of the light guide 600 is unlikely to be contaminated with the toner and the cleaning member 34*f* is not needed and a case where a plurality of vane portions 34*b* are present. Even if the voltage waveform based on the light receiving signal of the light receiving portion 50*b* changes depending on such different member disposition, addition of members, and the like of the stirring member, it is possible to detect the phase of the stirring member 34 by detecting the characteristic ON time and OFF time in one cycle of the stirring member 34.

The configurations and the control methods in the aforementioned embodiments can be combined with each other as long as possible.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2023-142601, filed on Sep. 1, 2023, No. 2023-142614, filed on Sep. 1, 2023, No. 2023-142613, filed on Sep. 1, 2023, and No. 2023-142615, filed on Sep. 1, 2023, which are hereby incorporated by reference herein in their entirety.

What is claimed is:

1. An image forming apparatus on which a toner container is able to be mounted comprising:
a photosensitive drum;
a developing roller that supplies toner to the photosensitive drum;
a mounting portion on which the toner container is able to be mounted such that a part of the toner container is exposed to outside of the image forming apparatus, the mounting portion being provided with a replenishing port for replenishment of the toner in the toner container;
a frame member that includes a developing chamber in which the developing roller is disposed and an accommodating chamber that communicates with the developing chamber and accommodates the toner, the accommodating chamber being provided with an accommodating chamber opening capable of communicating with the replenishing port;
a stirring member that is provided in the accommodating chamber, the stirring member including a rotation shaft that rotates about a rotation axis and a sheet having a first end portion that is one end portion in a direction perpendicularly intersecting the rotation axis and is fixed to the rotation shaft and a second end portion that is the other end portion and is able to come into contact with an inner wall of the accommodating chamber, the stirring member being configured to stir the toner accommodated in the accommodating chamber while rotating; and
a control portion that controls rotation of the stirring member,
wherein a two-dimensional coordinate system is configured of a first virtual line that passes through the rotation axis and extends in a horizontal direction and a second virtual line that passes through the rotation axis and extends in a gravity direction in a case of being seen in a direction of the rotation axis, and in the two-dimensional coordinate system, at least a part of the accommodating chamber opening is disposed in a first quadrant or a second quadrant, and
wherein the control portion controls the stirring member to stop rotating in a state where at least a part of the second end portion of the sheet is located in a quadrant that is different from a quadrant in which the accommodating chamber opening is disposed in the coordinate system by a timing at which the toner passes through the accommodating chamber opening in a case where the toner is replenished from the toner container to the accommodating chamber.

2. The image forming apparatus according to claim 1,
wherein the accommodating chamber opening is disposed in the first quadrant in the coordinate system in a case of being seen in the direction of the rotation axis, and
wherein the control portion controls the stirring member to stop rotating in a state where the part of the sheet is located in a third quadrant in the coordinate system by the timing.

3. The image forming apparatus according to claim 1,
wherein the accommodating chamber opening is disposed in the first quadrant in the coordinate system in a case of being seen in the direction of the rotation axis, and the stirring member is controlled to stop rotating in a state where the part of the sheet is located in the second quadrant or a fourth quadrant.

4. The image forming apparatus according to claim 1,
wherein the accommodating chamber opening is disposed in one of the first quadrant and the second quadrant in the coordinate system in a case of being seen in the direction of the rotation axis, and the photosensitive drum is disposed in the other quadrant.

5. The image forming apparatus according to claim 1, wherein the stirring member includes the sheet as a first sheet and further includes a second sheet that is different from the first sheet, wherein the second sheet has a third end portion that is one end portion in a direction perpendicularly intersecting the rotation axis and is fixed to the rotation shaft at a position that is different from a position of the first end portion of the first sheet around the rotation axis and a fourth end portion that is the other end portion and is able to come into contact with the inner wall of the accommodating chamber, and wherein the control portion controls the stirring member to stop rotating in a state where both at least a part of the second end portion of the first sheet and a part of the second sheet including at least the fourth end portion are located in a quadrant that is different from a quadrant in which the accommodating chamber opening is located in the coordinate system by the timing.

6. The image forming apparatus according to claim 5, wherein the rotation shaft includes a first attachment surface and a second attachment surface, wherein a vertical line of the first attachment surface and a vertical line of the second attachment surface perpendicularly intersect each other, wherein the first sheet is attached to the rotation shaft such that a part including the first end portion is in contact with the first attachment surface, and wherein the second sheet is attached to the rotation shaft such that a part including the third end portion is in contact with the second attachment surface.

7. The image forming apparatus according to claim 1, further comprising:

a remaining amount detection portion that is provided to project from the inner wall of the accommodating chamber and detects an amount of the toner accommodated in the accommodating chamber, wherein the stirring member includes the sheet as a third sheet, the first end portion as a fifth end portion, and the second end portion as a sixth end portion and further includes a fourth sheet that is different from the third sheet, wherein the fourth sheet has a seventh end portion that is one end portion in the direction perpendicularly intersecting the rotation axis and is fixed to the rotation shaft and an eighth end portion that is the other end portion and is able to come into contact with the inner wall of the accommodating chamber, wherein the rotation shaft has an attachment surface that extends in the direction of the rotation axis, wherein the fourth sheet is attached to the rotation shaft such that a fourth attachment portion that is a part including the seventh end portion is in contact with the attachment surface, wherein the third sheet is attached to the rotation shaft such that a third attachment portion that is a part including the fifth end portion overlaps the fourth attachment portion, wherein the remaining amount detection portion is located in a quadrant below a quadrant in which at least a part of the accommodating chamber opening is located in the coordinate system, wherein a third length of the third sheet from the third attachment portion to the sixth end portion measured in a direction in which the third sheet extends is shorter than a fourth length of the fourth sheet from the fourth attachment portion to the eighth end portion measured in a direction in which the fourth sheet extends when seen in the direction of the rotation axis of the rotation shaft, and wherein the control portion controls the stirring member to stop rotating in a state where at least a part of the third sheet including the sixth end portion is located in the quadrant in which the remaining amount detection portion is located in the coordinate system by the timing.

8. The image forming apparatus according to claim 7, wherein the third length is a length that allows the sixth end portion to enter a recessed portion formed between a lower end of the remaining amount detection portion and the inner wall of the accommodating chamber.

9. The image forming apparatus according to claim 1, wherein the accommodating chamber opening is located at an end portion of the accommodating chamber in the direction of the rotation axis.

10. The image forming apparatus according to claim 9, further comprising:

an exposure unit that exposes the photosensitive drum, wherein the replenishing port is located above an optical path of laser light of the exposure unit in a case of being seen in the direction of the rotation axis, and wherein the accommodating chamber opening is located below the optical path of the laser light of the exposure unit in a case of being seen in the direction of the rotation axis.

11. The image forming apparatus according to claim 10, wherein the replenishing port and the accommodating chamber opening are located between the photosensitive drum and the exposure unit in a direction perpendicularly intersecting the rotation axis, the photosensitive drum and the exposure section being aligned in the direction.

12. The image forming apparatus according to claim 11, wherein the accommodating chamber opening is located at a same height as a region in which the second end portion of the sheet is able to come into contact on an upper surface of an inner wall surface of the accommodating chamber.

13. The image forming apparatus according to claim 1, further comprising:

an opening/closing member that is able to be located at an open position at which the mounting portion is exposed to outside of the image forming apparatus and a closed position at which the mounting portion is not exposed; and a sensor that detects an opening/closing state of the opening/closing member, wherein the control portion controls the stirring member to stop rotating in a state where at least a part of the second end portion of the sheet is located in a quadrant that is different from a quadrant in which the accommodating chamber opening is located in the coordinate system by a timing at which the toner passes through the accommodating chamber opening once the sensor detects that the opening/closing member is at the open position after an image forming operation ends.

14. The image forming apparatus according to claim 1, further comprising:

a sensor that detects whether or not the toner container has been mounted on the mounting portion, wherein the control portion controls the stirring member to stop rotating in a state where at least a part of the second end portion of the sheet is located in a quadrant that is different from a quadrant in which the accommodating chamber opening is disposed in the coordinate system by a timing at which the toner passes through the accommodating chamber opening once the sensor detects that the toner container has been mounted on the mounting portion.

15. An image forming apparatus on which a toner container is able to be mounted comprising:

a photosensitive drum;

a developing roller that supplies a toner to the photosensitive drum;

a mounting portion on which the toner container is able to be mounted such that a part of the toner container is exposed to outside of the image forming apparatus, the mounting portion being provided with a replenishing port for replenishment of the toner in the toner container;

a frame member that includes a developing chamber in which the developing roller is disposed and an accommodating chamber that communicates with the developing chamber and accommodates the toner, the accommodating chamber being provided with an accommodating chamber opening capable of communicating with the replenishing port;

a stirring member that is provided in the accommodating chamber, the stirring member including a rotation shaft that rotates about a rotation axis and a sheet having a first end portion that is one end portion in a direction perpendicularly intersecting the rotation axis and is fixed to the rotation shaft and a second end portion that is the other end portion and is able to come into contact with an inner wall of the accommodating chamber, the stirring member being configured to stir the toner accommodated in the accommodating chamber while rotating;

a control portion that controls rotation of the stirring member;

an opening/closing member that is able to be located at an open position at which the mounting portion is exposed to outside of the image forming apparatus and a closed position at which the mounting portion is not exposed; and a sensor that detects an opening/closing state of the opening/closing member, wherein the control portion controls the stirring member to stop rotating in a state where the second end portion of the sheet is at a predetermined position by a timing at which the toner passes through the accommodating chamber opening when the toner is replenished from the toner container to the accommodating chamber in response to the sensor detecting that the opening/closing member is at the open position.

16. The image forming apparatus according to claim 15, further comprising:

a restriction mechanism that is able to be in a non-restricted state where replenishment of the toner from a toner replenishing container is allowed and a restricted state where the replenishment is not allowed, wherein in a case where the sensor detects that the opening/closing member is at the open position, the control portion stops rotation of the stirring member in the state where the second end portion of the sheet is at the predetermined position by the timing while the restriction mechanism is maintained in the restricted state, and in a case where the rotation of the stirring member is stopped, then the control portion switches the restriction mechanism from the restricted state to the non-restricted state.

17. The image forming apparatus according to claim 16, wherein the toner container includes a shutter that is able to be located at a closed position at which inside is not continuous with the replenishing port and an open position at which the inside is continuous with the replenishing port, and wherein the restriction mechanism is configured to restrict a lock releasing operation of the toner container to cause the shutter to move from the closed position to the open position in the restricted state and allow the lock releasing operation in the non-restricted state.

18. The image forming apparatus according to claim 15, wherein at least a part of the accommodating chamber is disposed in a first quadrant or a second quadrant in a two-dimensional coordinate system that is configured of a first virtual line that passes through the rotation axis and extends in a horizontal direction and a second virtual line that passes through the rotation axis and extends in a gravity direction in a case of being seen in the direction of the rotation axis, and wherein the predetermined position is a position at which at least a part of the second end portion of the sheet is located in a quadrant that is different from a quadrant in which at least a part of the accommodating chamber opening is disposed in the coordinate system.

19. The image forming apparatus according to claim 18, wherein the accommodating chamber opening is disposed in the first quadrant in the coordinate system when seen in the direction of the rotation axis, and wherein the control portion controls the stirring member to stop rotating in a state where the part of the sheet is located in a third quadrant in the coordinate system by the timing.

20. The image forming apparatus according to claim 18, wherein the accommodating chamber opening is disposed in the first quadrant in the coordinate system when seen in the direction of the rotation axis, and wherein the control portion controls the stirring member to stop rotating in a state where the part of the sheet is located in the second quadrant or a fourth quadrant in the coordinate system by the timing.

21. The image forming apparatus according to claim 18, wherein the accommodating chamber opening is located in one of the first quadrant and the second quadrant in the coordinate system, and the photosensitive drum is located in the other quadrant.

22. The image forming apparatus according to claim 18, wherein the accommodating chamber opening is located at an end portion of the accommodating chamber in the direction of the rotation axis.

23. The image forming apparatus according to claim 22, further comprising:

an exposure unit that exposes the photosensitive drum, wherein the replenishing port is located above an optical path of laser light of the exposure unit in a case of being seen in the direction of the rotation axis, and wherein the accommodating chamber opening is located below the optical path of the laser light of the exposure unit in a case of being seen in the direction of the rotation axis.

24. The image forming apparatus according to claim 23, wherein the replenishing port and the accommodating chamber opening are located between the photosensitive drum and the exposure unit in a direction perpendicularly intersecting the rotation axis, the photosensitive drum and the exposure unit being aligned in the direction.

25. The image forming apparatus according to claim 24, wherein the accommodating chamber opening is located at a same height as a region in which the second end portion of the sheet is able to come into contact on an upper surface of an inner wall surface of the accommodating chamber.

26. The image forming apparatus according to claim 15, wherein the opening/closing member is configured to be able to be located at an open position at which the replenishing port is exposed to outside and a closed position at which the replenishing port is not exposed to the outside.

27. The image forming apparatus according to claim 15, wherein the opening/closing member is configured to be able to be located at an open position at which a conveyance path of a recording material is exposed to outside of the image forming apparatus and a closed position at which the conveyance path is not exposed.

28. The image forming apparatus according to claim 15, further comprising:

a phase detecting unit that detects a rotation phase of the second end portion of the sheet, wherein the control portion controls the stirring member to stop rotating in a state where the second end portion is at the predetermined position by the timing on the basis of the rotation phase detected by the phase detecting unit in a case where the sensor detects that the opening/closing member is in the open state.

29. The image forming apparatus according to claim 28, wherein the phase detecting unit detects the rotation phase after the sensor detects that the opening/closing member is in the open state.

30. The image forming apparatus according to claim 28, wherein the phase detecting unit detects the rotation phase in advance before the sensor detects that the opening/closing member is in the open state.

31. An image forming apparatus on which a toner container is able to be mounted comprising:

a photosensitive drum;

a developing roller that supplies toner to the photosensitive drum;

a mounting portion on which the toner container is able to be mounted such that a part of the toner container is exposed to outside of the image forming apparatus, the mounting portion being provided with a replenishing port for replenishment of the toner in the toner container;

a frame member that includes a developing chamber in which the developing roller is disposed and an accommodating chamber that communicates with the developing chamber and accommodates the toner, the accommodating chamber being provided with an accommodating chamber opening capable of communicating with the replenishing port;

a stirring member that is provided in the accommodating chamber, the stirring member including a rotation shaft that rotates about a rotation axis and a sheet having a first end portion that is one end portion in a direction perpendicularly intersecting the rotation axis and is fixed to the rotation shaft and a second end portion that is the other end portion and is able to come into contact with an inner wall of the accommodating chamber, the stirring member being configured to stir the toner accommodated in the accommodating chamber while rotating;

a sensor that detects whether or not the toner container has been mounted on the replenishing port; and a control portion that controls rotation of the stirring member;

wherein the control portion controls the stirring member to stop rotating in a state where the second end portion of the sheet is at a predetermined position by a timing at which the toner passes through the accommodating chamber opening in a case where the toner is replenished from the toner container to the accommodating chamber in response to the sensor detecting that the toner container has been mounted on the replenishing port.

32. The image forming apparatus according to claim 31, further comprising:

a restriction mechanism that is able to be in a non-restricted state where replenishment of toner from a toner replenishing container is allowed and a restricted state where the replenishment is not allowed, wherein in a case where the sensor detects that the toner container has been mounted on the replenishing port, the control portion stops rotation of the stirring member in the state where the second end portion of the sheet is at the predetermined position by the timing while the restriction mechanism is maintained in the restricted state, and in a case where the rotation of the stirring member is stopped, then the control portion switches the restriction mechanism from the restricted state to the non-restricted state.

33. An image forming apparatus on which a toner container is able to be mounted comprising:

a photosensitive drum that rotates;

a charging roller that comes into contact with a surface of the photosensitive drum and rotates;

a charging bias application portion that applies a charging bias to the charging roller;

a developing roller that bears a toner and rotates and supplies the toner to the photosensitive drum;

a developing bias application portion that applies a developing bias to the developing roller;

a mounting portion on which the toner container is able to be mounted such that a part of the toner container is exposed to outside of the image forming apparatus, the mounting portion being provided with a replenishing port for replenishment of toner in the toner container;

a frame member that includes a developing chamber in which the developing roller is disposed and an accommodating chamber that communicates with the developing chamber and accommodates the toner, the accommodating chamber being provided with an accommodating chamber opening capable of communicating with the replenishing port;

a stirring member that is provided in the accommodating chamber, the stirring member including a rotation shaft that rotates about a rotation axis and a sheet having a first end portion that is one end portion in a direction perpendicularly intersecting the rotation axis and is fixed to the rotation shaft and a second end portion that is the other end portion and is able to come into contact with an inner wall of the accommodating chamber, the stirring member being adapted to stir the toner accommodated in the accommodating chamber while rotating;

a phase detecting unit that detects a rotation phase of the stirring member;

a single motor that supplies a drive force to cause each of the photosensitive drum, the charging roller, the developing roller, and the stirring member to rotate; and a control portion that controls each of the charging bias application portion, the developing bias application portion, and the motor, wherein the image forming apparatus executes first stop control of causing the motor to stop rotating after an image forming operation ends and second stop control of causing each of the charging bias application portion and the developing bias application portion to stop bias application in accordance with a stop timing at which the motor stops rotating through the first stop control, and wherein the control portion starts the second stop control after a standby time elapses from a detection timing such that the rotation phase of the stirring member at the stop timing is a rotation phase within a predetermined range, on the basis of the rotation phase of the stirring member detected at the detection timing after the image forming operation ends and a time required for the second stop control.

34. The image forming apparatus according to claim 33, wherein the control portion executes, before starting the first stop control, a cycle acquisition process of acquiring a cycle of one rotation of the stirring member on the basis of the rotation phase detected by the phase detector, and an adjustment process of acquiring the standby time on the basis of the cycle acquired in the cycle acquisition process and the time required for the second stop control.

35. The image forming apparatus according to claim 34, wherein the second stop control is started after the image forming operation ends and an adjustment operation for the apparatus is executed, and wherein the cycle acquisition process and the adjustment process are executed during execution of the adjustment operation.

36. The image forming apparatus according to claim 34, wherein the second stop control is control of causing each of the charging bias application portion and the developing bias application portion to stop while a potential difference with which movement of the toner from the developing roller to the photosensitive drum is restricted is maintained between the photosensitive drum and the developing roller until the first stop control ends.

37. The image forming apparatus according to claim 36, wherein in the second stop control, the charging bias application portion and the developing bias application portion gradually reduce the charging bias and the developing bias, respectively, while the potential difference between the charging bias and the developing bias applied in the image forming operation is maintained.

38. The image forming apparatus according to claim 37, wherein in the second stop control, the developing bias application portion applies a developing bias with a polarity opposite to a regular charge polarity of the toner after the developing bias becomes zero and then continues to apply the developing bias with the opposite polarity until the motor stop rotating.

39. The image forming apparatus according to claim 36, wherein the charging bias is lower than the charging bias applied in the image forming operation in a case where the second stop control is started, wherein the developing bias is a developing bias with a polarity opposite to a regular charge polarity of the toner in a case where the second stop control is started, and wherein the developing bias application portion continues to apply the developing bias with the opposite polarity until the motor stops rotating.

40. The image forming apparatus according to claim 39, wherein the second stop control is started after cleaning control of transferring the toner adhering to the charging roller onto the developing roller again via the photosensitive drum is performed after the image forming operation ends.

41. The image forming apparatus according to claim 36, further comprising:

a static eliminate unit that performs static elimination on a surface of the photosensitive drum before the surface is charged with the charging roller to which the charging bias is applied, wherein in the second stop control, the static eliminate unit continues the static elimination on the surface of the photosensitive drum until static elimination is performed around one circuit of a peripheral surface of the photosensitive drum after the charging bias becomes zero, and wherein the control portion stops power distribution to the motor after the static eliminate unit stops the static elimination.

42. The image forming apparatus according to claim 33, wherein a two-dimensional coordinate system is configured of a first virtual line that passes through the rotation axis and extends in a horizontal direction and a second virtual line that passes through the rotation axis and extends in a gravity direction in a case of being seen in the direction of the rotation axis, at least a part of the accommodating chamber opening being located in a first quadrant or a second quadrant in the two-dimensional coordinate system, and wherein a position of the second end portion of the sheet is located in a case where the first stop control ends is included in a quadrant that is different from a quadrant in which the accommodating chamber opening is located in the coordinate system.

43. The image forming apparatus according to claim 42, wherein the accommodating chamber opening is disposed in the first quadrant in the coordinate system when seen in the direction of the rotation axis, and wherein the control portion starts the first stop control and the second stop control after the standby time elapses such that the second end portion of the sheet is stopped in a third quadrant in a case where the first stop control ends.

44. The image forming apparatus according to claim 42, wherein the accommodating chamber opening is disposed in the first quadrant in the coordinate system in a case of being seen in the direction of the rotation axis, and wherein the control portion starts the first stop control and the second stop control after the standby time elapses such that the second end portion of the sheet is stopped in the second quadrant or a fourth quadrant in a case where the first stop control ends.

45. The image forming apparatus according to claim 33, wherein an end timing of the first stop control and an end timing of the second stop control coincide with each other.

46. The image forming apparatus according to claim 33, wherein in the second stop control, the developing bias application portion ends the application of the developing bias after the charging bias application portion ends the application of the charging bias.

47. An image forming apparatus comprising:
an image bearing member;
a developer bearing member that bears a developer for developing an electrostatic latent image formed on the image bearing member;
a frame member that includes a developing chamber in which the developer bearing member is disposed and an accommodating chamber that communicates with the developing chamber and accommodates the developer;
a stirring member that is provided inside of the accommodating chamber, the stirring member including a rotation shaft that rotates about a rotation axis and a sheet having a first end portion that is one end portion in a direction of the rotation axis and is fixed to the rotation shaft and a second end portion that is the other end portion and is a free end, the stirring member being configured to stir the developer by the sheet rotating along with the rotation shaft; and
a sensor that includes a light emitting element that emits light toward the inside of the accommodating chamber and a light receiving element that receives light that has been emitted by the light emitting element, has passed through the inside of the accommodating chamber, and has been output to outside of the accommodating chamber, the sensor issuing a signal with an intensity in accordance with the amount of light received by the light receiving element,
wherein the sheet of the stirring member is configured to block an optical path of light emitted from the light emitting element in the inside of the accommodating chamber once in one cycle in which the stirring member rotates about the rotation axis once, and
wherein the image forming apparatus includes a phase detecting unit that detects a rotation phase of the stirring member with reference to a period during which the intensity of the signal is continuously below a threshold value for a longest time in the one cycle.

48. The image forming apparatus according to claim 47, wherein a plurality of first periods during which the intensity of the signal is continuously below the threshold value is included in the one cycle, and
wherein the phase detecting unit detects the rotation phase of the stirring member on the basis of an end timing of a first period when the period during which the intensity of the signal is below the threshold value is the longest from among the plurality of first periods.

49. The image forming apparatus according to claim 48, wherein in a case where only one second period during which the intensity of the signal is above the threshold value is included in the one cycle,
the phase detecting unit detects the rotation phase of the stirring member on the basis of a start timing of the second period.

50. The image forming apparatus according to claim 49, wherein the first periods include a period during which the stirring member blocks the optical path.

51. The image forming apparatus according to claim 49, wherein the stirring member includes the sheet as a first sheet and a second sheet including a third end portion that is one end portion in the direction of the rotation axis and is fixed to the rotation shaft and a fourth end portion that is the other end portion and is a free end,
wherein the second sheet comes into contact with an optical path surface through which the light emitted from the light emitting element passes in an inner wall surface of the accommodating chamber by rotating along with the rotation shaft to thereby clean the optical path surface,
wherein the plurality of first periods include a first OFF period including a period during which the first sheet blocks the optical path and a second OFF period including a period during which the second sheet blocks the optical path,
wherein the first OFF period is longer than the second OFF period, and
wherein the phase detecting unit detects the rotation phase of the stirring member on the basis of a timing at which the first OFF period occurs.

52. The image forming apparatus according to claim 51, wherein the rotation shaft includes:
a first attachment surface to which the first end portion of the first sheet is attached; and
a second attachment surface to which the third end portion of the second sheet is attached, and
wherein a vertical line of the first attachment surface and a vertical line of the second attachment surface perpendicularly intersect each other.

53. The image forming apparatus according to claim 52, wherein in a case of being seen in the direction of the rotation axis,
a length of the first sheet measured in a direction in which the first sheet extends from the first end portion to the second end portion is longer than a length of the second sheet measured in a direction in which the second sheet extends from the third end portion to the fourth end portion.

54. The image forming apparatus according to claim 53, wherein in the direction of the rotation axis,
a width of the second sheet is narrower than a width of the first sheet.

55. The image forming apparatus according to claim 54, wherein the stirring member includes a third sheet that is attached to the rotation shaft such that the third sheet overlaps the first sheet, the third sheet being bonded to the inner wall of the accommodating chamber such that a fifth end portion that is one end portion in the direction of the rotation axis is fixed to the rotation shaft and a side of a sixth end portion that is the other end portion seals an opening portion that establishes communication between the developing chamber and the accommodating chamber in a case where the frame member is a new product.

56. The image forming apparatus according to claim 55, wherein in a case of being seen in the direction of the rotation axis,
a length of the third sheet measured in a direction in which the third sheet extends from the fifth end portion to the sixth end portion is longer than the length of the first sheet.

57. The image forming apparatus according to claim 56, wherein a width of the third sheet in the direction of the rotation axis is wider than a width of the first sheet in the direction of the rotation axis.

58. The image forming apparatus according to claim 57, wherein a width of the first sheet in the direction of the rotation axis is narrower than the width of the opening portion in the direction of the rotation axis, and wherein the length of the first sheet is a length that allows entrance to the developing chamber via the opening portion.

59. The image forming apparatus according to claim 58, wherein the stirring member includes a fourth sheet that is attached to the rotation shaft such that the fourth sheet overlaps the second sheet, the fourth sheet having a seventh end portion that is one end portion in the direction of the rotation axis and is fixed to the rotation shaft, a length from the seventh end portion to an eighth end portion that is the other end portion being a length that does not block the optical path.

60. The image forming apparatus according to claim 59, wherein in a case of being seen in the direction of the rotation axis of the rotation shaft, a direction in which the second sheet extends from the third end portion to the fourth end portion and a direction in which the fourth sheet extends from the seventh end portion to the eighth end portion are mutually opposite directions.

61. The image forming apparatus according to claim 60, wherein a width of the fourth sheet in the direction of the rotation axis is narrower than a width of the first sheet in the direction of the rotation axis.

* * * * *